US012757080B2

(12) United States Patent
Eklöf et al.

(10) Patent No.: US 12,757,080 B2
(45) Date of Patent: Oct. 6, 2026

(54) SECONDARY CELL GROUP (SCG) DEACTIVATION AT MOBILITY

(71) Applicant: Telefonaktiebolaget LM Ericsson (publ), Stockholm (SE)

(72) Inventors: Cecilia Eklöf, Täby (SE); Liwei Qiu, Täby (SE); Icaro Leonardo Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 628 days.

(21) Appl. No.: 18/268,295

(22) PCT Filed: Dec. 20, 2021

(86) PCT No.: PCT/SE2021/051289
§ 371 (c)(1),
(2) Date: Jun. 19, 2023

(87) PCT Pub. No.: WO2022/154710
PCT Pub. Date: Jul. 21, 2022

(65) Prior Publication Data
US 2024/0056910 A1 Feb. 15, 2024

Related U.S. Application Data

(60) Provisional application No. 63/137,449, filed on Jan. 14, 2021.

(51) Int. Cl.
*H04W 36/00* (2009.01)
*H04W 36/08* (2009.01)

(52) U.S. Cl.
CPC . *H04W 36/0061* (2013.01); *H04W 36/00692* (2023.05); *H04W 36/00698* (2023.05); *H04W 36/087* (2023.05)

(58) Field of Classification Search
CPC ....... H04W 36/0061; H04W 36/00692; H04W 36/00698; H04W 36/08; H04W 36/087;
(Continued)

(56) References Cited

U.S. PATENT DOCUMENTS

| | | | | |
|---|---|---|---|---|
| 2021/0243590 | A1* | 8/2021 | Jin | H04L 5/0053 |
| 2022/0053390 | A1* | 2/2022 | Kim | H04W 36/00695 |
| 2023/0397297 | A1* | 12/2023 | Zhang | H04W 76/15 |

FOREIGN PATENT DOCUMENTS

| | | |
|---|---|---|
| WO | 2020096396 A1 | 5/2020 |
| WO | 2022031214 A1 | 2/2022 |

OTHER PUBLICATIONS

CATT ("Inter-mode exchange of UAI for SCG during handover", 3GPP TSG-RAN WG2 Meeting #111 electronic, R2-2006988, Aug. 17-28, 2020) (Year: 2020).*
(Continued)

*Primary Examiner* — Ji-Hae Yea
(74) *Attorney, Agent, or Firm* — Sage Patent Group

(57) ABSTRACT

A method performed by a source Master Node (MN) includes transmitting a request for handover for a user equipment (UE) with deactivated secondary cell group (SCG) to a target MN, wherein the request is transmitted with user plane traffic load information. The method includes receiving, from the target MN, a response including a Handover Command including a reconfiguration message containing reconfiguration WithSync with the UE target configuration and an indication of activated or deactivated SCG. The method includes transmitting the reconfiguration message containing the reconfiguration WithSync to the UE with the UE target configuration.

20 Claims, 25 Drawing Sheets

(58) Field of Classification Search
CPC ... H04W 76/27; H04W 92/20; H04W 36/083; H04W 36/085; H04W 36/13
See application file for complete search history.

(56) References Cited

OTHER PUBLICATIONS

ZTE Corporation, Sanechips ("Framework of SCG deactivation and activation", 3GPP TSG-RAN WG2 Meeting #111 electronic, R2-2006900, Aug. 17-28, 2020) (Year: 2020).*
International Search Report and Written Opinion of the International Searching Authority, PCT/SE2021/051289, mailed Mar. 30, 2022, 18 pages.
3GPP TS 37.340 v16.4.0 (Dec. 2020); 3rd Generation Partnership Project; Technical Specification Group Radio Access Network; Evolved Universal Terrestrial Radio Access (E-UTRA) and NR; Multi-connectively; Stage 2 (Release 16); 84 pages.
Huawei (Rapporteur), "[AT112-e][230][eDCCA] Progressing FFS points of efficient SCG activation and deactivation (Huawei)," 3GPP TSG-RAN WG2#112-e, R2-2010733, Online, Nov. 2-13, 2020, 22 pages.
Ericsson, "Support of SCG activation/de-activation mechanism," 3GPP TSG-RAN WG3 Meeting #110, R3-206497, Online, Nov. 2-12, 2020, 7 pages.
Huawei, "Further Multi-RAT Dual-Connectivity enhancements," 3GPP TSG RAN meeting #90e, RP-202624, Electronic Meeting, Dec. 7-11, 2020, 11 pages.
Ericsson, "Mobility and RRM for deactivated SCG," 3GPP TSG-RAN WG2 #113e, Tdoc 2101094 (R2-2101094), Electronic meeting, Jan. 25-Feb. 5, 2021, 14 pages.
Ericsson, "SCG deactivation procedures," 3GPP TSG-RAN WG2 #113bis-e, Tdoc R2-2103807, Electronic meeting, Apr. 12-20, 2021, 10 pages.
Ericsson, "Support of SCG activation/de-activation," 3GPP TSG-RAN WG3 #111-e, R3-210403, Jan. 25-Feb. 4, 2021, 6 pages.
3GPP TS 37.340 v16.3.0 (Sep. 2020); 3rd Generation Partnership Project; Technical Specification Group Radio Access Network; Evolved Universal Terrestrial Radio Access (E-UTRA) and NR; Multi-connectivity; Stage 2 (Release 16); 83 pages.
3GPP TS 38.300 v16.1.0 (Mar. 2020); 3rd Generation Partnership Project; Technical Specification Group Radio Access Network; NR; NR and NG-RAN Overall Description; Stage 2 (Release 16); 133 pages.
3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.
Qualcomm Incorporated, "Introducing suspension of SCG," 3GPP TSG RAN WG2 Meeting #107, R2-1908679, Prague, Czech, Aug. 26-30, 2019, 4 pages.
ETSI MCC, Report of 3GPP TSG RAN2 meeting #107bis, R2-1914301, Chongqing, China, Oct. 14-18, 2019, 283 pages.
ETSI MCC, Report of 3GPP TSG RAN2 meeting #112-e, R2-2100001, Online, Nov. 2-13, 2020, 283 pages.
ETSI MCC, Report of 3GPP TSG RAN2 meeting #111-e, R2-2102242, Online, Aug. 17-28, 2020, 318 pages.
China Telecom, "Views on NR Rel -17," 3GPP TSG RAN Meeting #84, RP-190919, Newport Beach, USA, Jun. 3-6, 2019, 36 pages.

* cited by examiner

SECONDARY CELL GROUP (SCG) DEACTIVATION AT MOBILITY

CROSS REFERENCE TO RELATED APPLICATIONS

This application is a 35 U.S.C. § 371 national stage application of PCT International Application No. PCT/SE2021/051289 filed on Dec. 20, 2021, which in turn claims domestic priority to U.S. Provisional Patent Application No. 63/137,449, filed on Jan. 14, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Carrier Aggregation (CA)

When CA is configured, the user equipment (UE) only has one radio resource control (RRC) connection with the network. Further, at RRC connection establishment/re-establishment/handover, one serving cell provides the non access stratum (NAS) mobility information, and at RRC connection re-establishment/handover, one serving cell provides the security input. This cell is referred to as the Primary Cell (PCell). In addition, depending on UE capabilities, Secondary Cells (SCells) can be configured to form together with the PCell a set of serving cells. Thus, when carrier aggregation is configured for the UE, the set of serving cells used by the UE always consists of one PCell and one or more SCells.

The reconfiguration, addition, and removal of SCells can be performed by RRC. At intra-radio access technology (intra-RAT) handover (HO), RRC can also add, remove, or reconfigure SCells for usage with the target PCell. When adding a new SCell, dedicated RRC signalling is used for sending all required system information of the SCell. Thus, while in connected mode, UEs need not acquire broadcasted system information directly from the SCells.

3rd Generation Partnership Project (3GPP) Dual Connectivity

In 3GPP Rel-12, the LTE (long term evolution) feature Dual Connectivity (DC) was introduced, to enable the UE to be connected in two cell groups, each controlled by an LTE access node (eNB), labelled as the Master eNB (MeNB) and the Secondary eNB (SeNB). The UE still only has one RRC connection with the network. In 3GPP, the Dual Connectivity (DC) solution has since then been evolved and is now also specified for new radio (NR) as well as between LTE and NR. Multi-connectivity (MC) is the case when there are more than 2 nodes involved. With introduction of 5G (5th Generation), the term MR-DC (Multi-Radio Dual Connectivity, see also 3GPP TS 37.340 V16.3.0) was defined as a generic term for all dual connectivity options which includes at least one NR access node. Using the MR-DC generalized terminology, the UE is connected in a Master Cell Group (MCG), controlled by the Master Node (MN), and in a Secondary Cell Group (SCG) controlled by a Secondary Node (SN).

Further, in MR-DC, when dual connectivity is configured for the UE, within each of the two cell groups, MCG and SCG, carrier aggregation may be used. In this case, within the MCG, controlled by the master node (MN), the UE may use one PCell and one or more SCell(s). And within the Secondary Cell Group, SCG, controlled by the secondary node (SN), the UE may use one Primary SCell (PSCell, also known as the primary SCG cell in NR) and one or more SCell(s). This combined case is illustrated in FIG. 1. In NR, the primary cell of a master or secondary cell group is sometimes also referred to as the Special Cell (SpCell). Hence, the SpCell in the MCG is the PCell and the SpCell in the SCG is the PSCell.

There are different ways to deploy 5G network with or without interworking with LTE (also referred to as E-UTRA (Evolved-Universal Terrestrial Radio Access) and evolved packet core (EPC). In principle, NR and LTE can be deployed without any interworking, denoted by NR standalone (SA) operation, also referred to as Option 2. In other words, the gNB in NR can be connected to the 5G core network (5GC) and the eNB in LTE can be connected to the EPC with no interconnection between the two, also referred to as Option 1.

On the other hand, the first supported version of NR uses dual connectivity, denoted as EN-DC (E-UTRAN-NR Dual Connectivity), also referred to as Option 3, as depicted in FIG. 2. In such a deployment, dual connectivity between NR and LTE is applied, where the UE is connected with both the LTE radio interface (via LTE Uu in the figure) to an LTE access node and the NR radio interface (via NR Uu in the figure) to an NR access node. Further, in EN-DC, the LTE access node acts as the master node (in this case known as the Master eNB, MeNB), controlling the master cell group, MCG, and the NR access node acts as the secondary node (in this case sometimes also known as the Secondary gNB, SgNB), controlling the secondary cell group, SCG. The SgNB may not have a control plane connection to the core network (EPC) which instead is provided to the MeNB via the SC-C/U interface and in this case the NR SgNB via the S1-U interface. The NR SgNB communicates with the LTE MeNB via the X2 interface. This is also called as "Non-standalone NR" or, in short, "NSA NR". Notice that in this case the functionality of an NR cell is limited and would be used for connected mode UEs as a booster and/or diversity leg. However, an RRC_IDLE UE cannot camp on these NR cells.

With introduction of 5GC, other options may be also valid. As previously, mentioned, option 2 supports standalone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes).

Note that there are also other variants of dual connectivity between LTE and NR which have been standardized as part of NG-RAN connected to 5GC. For example, under the MR-DC umbrella, the variants include:

EN-DC (Option 3): LTE is the master node and NR is the secondary node (EPC CN employed, as depicted in FIG. 2 as described above).

NE-DC (Option 4): NR is the master node and LTE is the secondary node (5GCN employed).

NGEN-DC (Option 7): LTE is the master node and NR is the secondary node (5GCN employed).

NR-DC (variant of Option 2): Dual connectivity where both the master node, MN, controlling the MCG, and the secondary node, SN, controlling the SCG, are NR (5GCN employed, as depicted in FIG. 3).

In FIG. 3, the UE communicates with the NR MN and the NR SN via the NR Uu interface. The NR MN communicates with the 5GC via the NG-C/U interfaces and to the NR SN via the Xn interface. The NR SN communicates with the 5GC via the NG-U interface.

As migration for these options may differ from different operators, it is possible to have deployments with multiple options in parallel in the same network e.g. there could be eNB base station supporting option 3, 5 and 7 and NR base station supporting 2 and 4 in the same network. In combination with dual connectivity solutions between LTE and NR, it is also possible to support CA (Carrier Aggregation) in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC, or both.

While DC is standardized for both LTE and E-UTRA-NR DC (EN-DC), LTE DC and EN-DC are designed differently when it comes to which nodes control what. For example, LTE DC is a centralized solution while EN-DC is a decentralized solution.

FIG. 4 shows the schematic control plane architecture looks like for LTE DC, EN-DC and NR-DC. In the LTE DC, the UE communicates with both a LTE master node and LTE secondary node via the LTE Uu interface. In LTE-DC, the RRC decisions are always coming from the MN (MN to UE). Note however, the SN still decides the configuration of the SN, since it is only the SN itself that has knowledge of what kind of resources, capabilities etc. it has. The LTE master node communicates with the LTE secondary node via the X2-C interface and with the EPC (not shown) via the S1-C interface The main difference LTE DC and EN-DC and NR-DC is that in EN-DC and NR-DC, the SN has a separate NR RRC entity. This means that the SN can also control the UE LTE RRC MeNB state or UE NR RRC master node state via RRC messaging, which can sometimes be without the knowledge of the MN. However, often the SN need to coordinate with the MN. In the EN-DC, the UE is communicating with the LTE master node via the LTE Uu interface and with the NR secondary node via the NR Uu interface. The LTE master node communicates with the NR secondary node via the X2-C interface and with the EPC (not shown) via the S1-C interface. In the NR-DC, the UE is communicating with both a NR master node and NR secondary node via the NR Uu interface. The NR master node communicates with the NR secondary node via the Xn-C interface and with the 5GC (not shown) via the NG-C interface.

For EN-DC and NR-DC, the major changes compared to LTE DC are:

The introduction of split bearer from the SN (known as SCG split bearer)

The introduction of split bearer for RRC

The introduction of a direct RRC from the SN (also referred to as SCG SRB (Signaling Radio Bearer))

FIG. 5 shows, from the network perspective, the user plane protocol architecture in MR-DC with EPC (EN-DC) where the MN is an LTE node and the SN is an NR node. The network can configure either E-UTRA packet data convergence protocol (PDCP) or NR PDCP for MN terminated MCG bearers while NR PDCP is always used for all other bearers. This is illustrated in FIG. 5 by the E-UTRA/NR PDCP configuration connected to the MCG bearer on the MN and all other bearers connected with the NR PDCP configuration. E-UTRA (Evolved Universal Terrestrial Radio Access Network) RLC/MAC (radio link control/medium access control) is used in the MN while NR radio link control/medium access control (RLC/MAC) is used in the SN.

FIG. 6 shows, from the network perspective, the user plane protocol architecture in MR-DC with 5GC (NGEN-DC, NE-DC and NR-DC). In MR-DC with 5GC, NR PDCP is always used for all bearer types. In NGEN-DC, E-UTRA RLC/MAC is used in the MN while NR radio link control/medium access control (RLC/MAC) is used in the SN. In NE-DC, NR RLC/MAC is used in the MN while E-UTRA RLC/MAC is used in the SN. In NR-DC, NR RLC/MAC is used in both MN (MN RLC and MN MAC) and SN (SN RLC and SN MAC). The quality of service (QoS) flows for the bearers are connected via the service data adaptation protocol (SDAP).

Packet Duplication

Packet data convergence protocol (PDCP) packet duplication, also known as Packet Duplication or PDCP duplication, is a feature that can be used to support ultra-reliable low latency (URLLC) use-cases. PDCP duplication is configurable in both carrier aggregation (CA) as well as dual connectivity (DC).

According to 3GPP TS 38.300 v16.1.0, and depicted in FIG. 7, when duplication is configured for a radio bearer by RRC, at least one secondary RLC entity is added to the radio bearer to handle the duplicated PDCP protocol data units (PDUs), where the logical channel (LCH in FIG. 7) corresponding to the primary RLC entity is referred to as the primary logical channel, and the logical channel corresponding to the secondary RLC entity(ies), the secondary logical channel(s).

Duplication at PDCP therefore consists in submitting the same PDCP PDUs multiple times: once to each activated RLC entity for the radio bearer. The packet duplicates are transmitted via the different carriers (cells). With multiple independent transmission paths, packet duplication therefore increases reliability and reduces latency and is especially beneficial for URLLC services.

When configuring duplication for a dedicated radio bearer (DRB), RRC also sets the state of PDCP duplication (either activated or deactivated) at the time of (re-)configuration. After the configuration, the PDCP duplication state can then be dynamically controlled by means of a MAC control element and in DC, the UE applies the MAC CE commands regardless of their origin (MCG or SCG).

SCG Power Saving Mode

In order to improve network energy efficiency and UE battery life for UEs in MR-DC, a Rel-17 work item is planned to introduce efficient SCG/SCell activation/deactivation. This can be especially important for MR-DC configurations with NR SCG, as it has been evaluated in RP-190919 that in some cases NR UE power consumption is 3 to 4 times higher than LTE.

3GPP has specified the concepts of dormant SCell (in LTE) and dormancy like behavior of an SCell (for NR). FIG. 8 is an illustration of dormancy like behavior for SCells in NR. In LTE, when an SCell is in dormant state, like in the deactivated state, the UE does not need to monitor the corresponding PDCCH (physical downlink control channel) or PDSCH (physical downlink shared channel) and cannot transmit in the corresponding uplink (UL). However, differently from deactivated state, the UE is required to perform and report CQI (channel quality indicator) measurements. A physical uplink control channel (PUCCH) SCell (SCell configured with PUCCH) cannot be in dormant state.

In NR, the activated state denotes a state capable of transmitting/receiving data by performing operations of a normal SCell. A deactivated state denotes a state in which a SCell is configured on a UE, but a transmission or reception operation and the like is not performed for the SCell. MAC control elements are used to transition a SCell to the activated state and to the deactivated state. An activated SCell is also transitioned to a deactivated state upon expiration of an SCellDeactivationTimer associated with the activated SCell. To transition the SCell from the deactivated state to the activated state, a MAC CE is used to configure the SCell via RRC with the SCell state set to activated. Upon SCell activation, the BWP to be used is defined by a FirstActiveDownlinkBWP-ID. Dormancy like behavior for SCells is realized using the concept of dormant bandwidth parts (BWPs). One dormant BWP, which is one of the dedicated BWPs configured by the network via RRC signaling, can be configured for an SCell. If the active BWP of the activated SCell is a dormant BWP, the UE stops monitoring PDCCH on the SCell but continues performing channel state information (CSI) measurements, automatic gain control (AGC) and beam management, if configured. A downlink control information (DCI) is used to control entering/leaving the dormant BWP for one or more SCell(s) or one or more SCell group(s) using dormantBWP-ID (to identify a BWP for the UE for the activated SCell) and firstWithinActiveTimeBWP-Id (to identify that a current active BWP is the dormant BWP), and it is sent to the special cell (sPCell) of the cell group that the SCell belongs to (i.e. PCell in case the SCell belongs to the MCG and PSCell if the SCell belongs to the SCG). The SpCell (i.e. PCell of PSCell) and PUCCH SCell cannot be configured with a dormant BWP.

However, only SCells can be put to put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution could be releasing (for power savings) and adding (when traffic demands requires) the SCG on an as needed basis. However, traffic is likely to be bursty, and adding and releasing the SCG involves a significant amount of RRC signaling and inter-node messaging between the MN and the SN, which typically causes considerable delay.

In Release 16 (Rel-16), some discussions were made regarding putting also the PSCell in dormancy, also referred to as SCG Suspension. Some preliminary agreements were made in RAN2-107bis, October 2019 (see chairman notes at R2-1914301):

RAN2 assumes the following (can be slightly modified due to progress on Scell dormancy):

The UE supports network-controlled suspension of the SCG in RRC_CONNECTED.

UE behavior for a suspended SCG is For Further Study (FFS)

The UE supports at most one SCG configuration, suspended or not suspended, in Rel 16.

In RRC_CONNECTED upon addition of the SCG, the SCG can be either suspended or not suspended by configuration.

In RAN-2 108, further discussion was made to clarify the above for future studies (FFSs). Some solutions have been proposed in Rel-16, but these have different problems. For example, in R2-1908679 (Introducing suspension of SCG—Qualcomm) the paper proposes that gNB can indicate UE to suspend SCG transmissions when no data traffic is expected to be sent in SCG so that UE keeps the SCG configuration but does not use it for power saving purpose. Therein, it is mentioned that signaling to suspend SCG could be based on DCI/MAC-CE/RRC signaling, but no details were provided regarding the configuration from the gNB to the UE. And, differently from the defined behavior for SCell(s), PSCell may be associated to a different network node (e.g. a gNodeB operating as Secondary Node).

It is yet to be seen which behavior will be specified for SCG power saving in Release 17 (Rel-17). However, it is very likely that is going to be one or more of the following:

- The UE starting to operate the PSCell in dormancy, e.g. switching the PSCell to a dormant BWP. On the network side, the network considers the PSCell in dormancy and at least stops transmitting PDCCH for that UE in the PSCell and SCells;
- The UE deactivating the PSCell like SCell deactivation; On the network side, the network considers the PSCell as deactivated and at least stops transmitting PDCCH for that UE in the PSCell (and also on the SCells);
- The UE operating the PSCell in long discontinuous reception (DRX); SCG DRX can be switched off from the MN (e.g. via MCG RRC, MAC CE or DCI) when the need arises (e.g. DL data arrival for SN terminated SCG bearers);
- The UE suspending its operation with the SCG (e.g. suspending bearers associated with the SCG, like SCG MN-/SN-terminated bearers), but keeping the SCG configuration stored (referred to as Stored SCG); On the network side there can be different alternatives such as the SN storing the SCG as the UE does, or the SN releasing the SCG context of the UE to be generated again upon resume (e.g. with the support from the MN that is the node storing the SCG context for that UE whose SCG is suspended).

Though the power saving aspect is so far discussed from the SCG point of view, it is likely that similar approaches could be used on the MCG as well (e.g. the MCG maybe suspended or in long DRX, while data communication is happening only via the SCG).

Current status is that 3GPP meetings have been held with the work item for "Efficient activation deactivation mechanism for one SCG and SCells". Some agreements have been reached. See RAN2 #111e: R2-2102242 and RAN2 #112e: R2-2100001.

It is currently not defined how the selection of the target state/mode of operation is made, how the procedure will look like, which node will be responsible for what, how the signaling will be made etc. Solutions for different scenarios are missing and need to be defined.

Existing methods for SCG mobility of a UE in MR-DC are configured with a first and a second cell group, where the second cell group is in a power saving mode, (e.g. deactivated/suspended/dormant/etc.).

SUMMARY

Operations performed by a source Master Node (MN) may include transmitting a request for handover for a user equipment (UE) with a deactivated secondary cell group (SCG), to a target Master Node (MN), the request transmitted with user plane traffic load information. The operations include receiving, from the target MN, a response including a Handover Command comprising an reconfiguration message containing reconfigurationWithSync with the UE target configuration and an indication of activated or deactivate SCG, and transmitting the reconfiguration message containing the reconfigurationWithSync to the UE with the UE target configuration.

Operations performed by a target Master Node (MN) include receiving a request for handover from a source Master Node (MN) for a user equipment (UE) with activated or deactivated secondary cell group (SCG), the request transmitted with user plane traffic load information. The operations include determining whether the SCG should be activated or deactivated based on the user plane traffic load information. The operations include transmitting a request to a target SN for addition of an SCG to the target configuration. The operations include receiving a response from a target SN including an indication enabling the MN to determine whether the requested SCG's mode of operation was accepted and transmitting a response to a source MN containing a Handover Command comprising a reconfiguration message containing reconfigurationWithSync with the UE target configuration.

Operations performed by a target Secondary Node (SN), include receiving a request from an MN for addition of a secondary cell group (SCG) to the target configuration, the request including user plane traffic related information of a current SCG, and transmitting a response to a target MN including an indication enabling the MN to determine whether the requested SCG's mode of operation was accepted or not.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
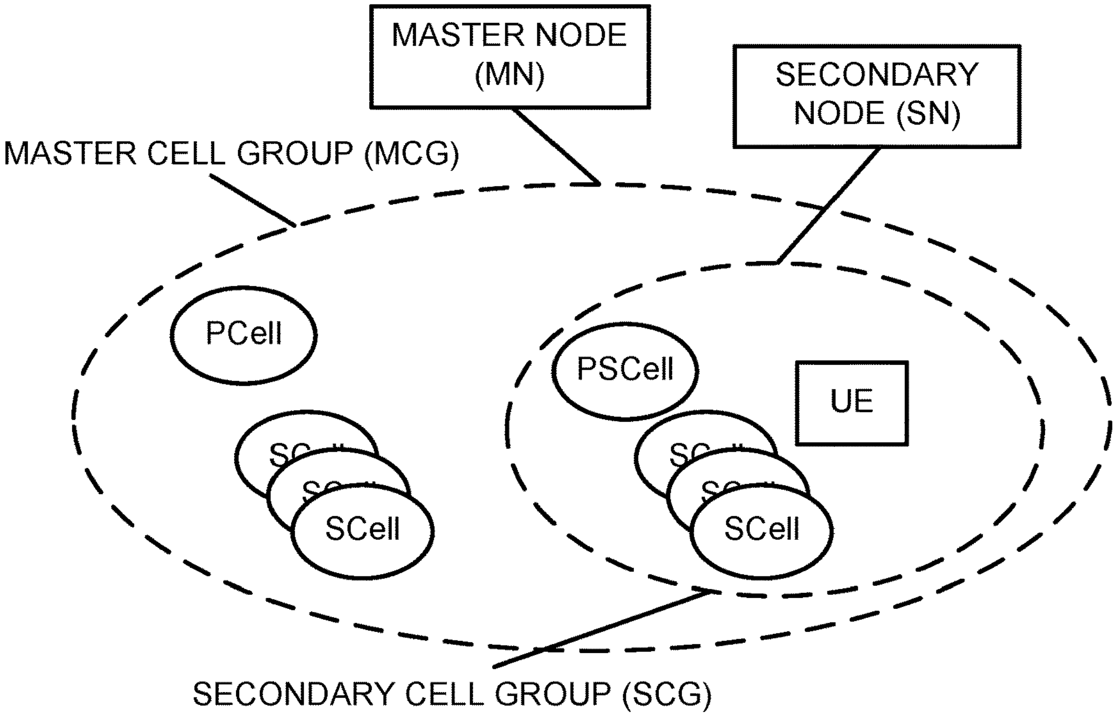
FIG. 1 is an illustration of dual connectivity combined with carrier aggregation in multi-radio dual connectivity according to some embodiments.
Figure 2:
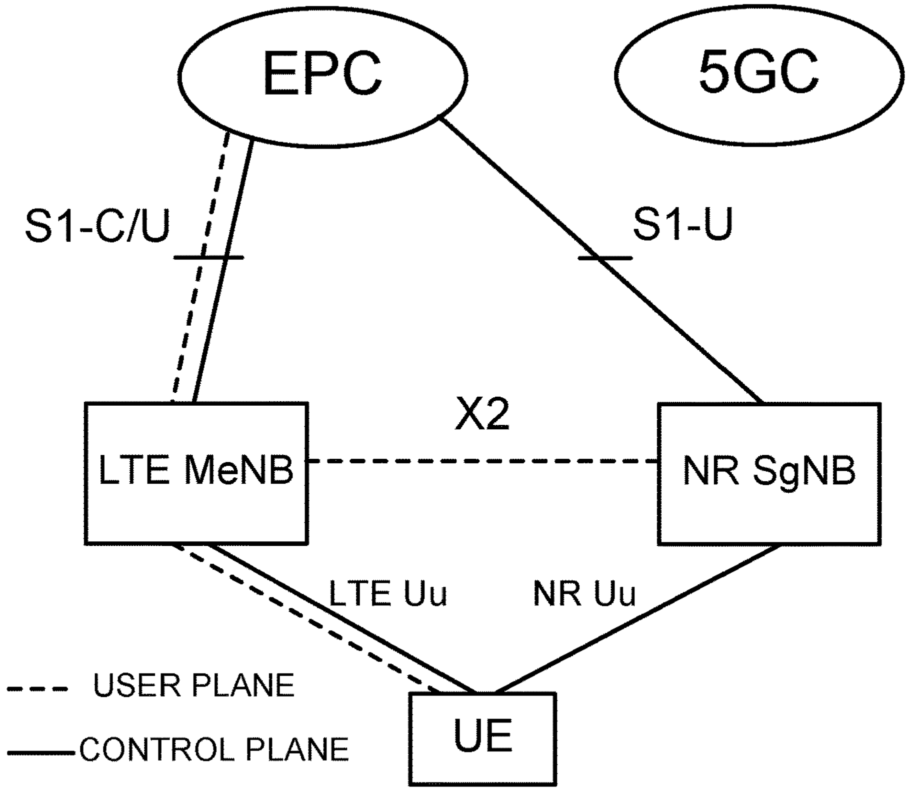
FIG. 2 is an illustration of E-UTRAN-NR Dual Connectivity (EN-DC) according to some embodiments.
Figure 3:
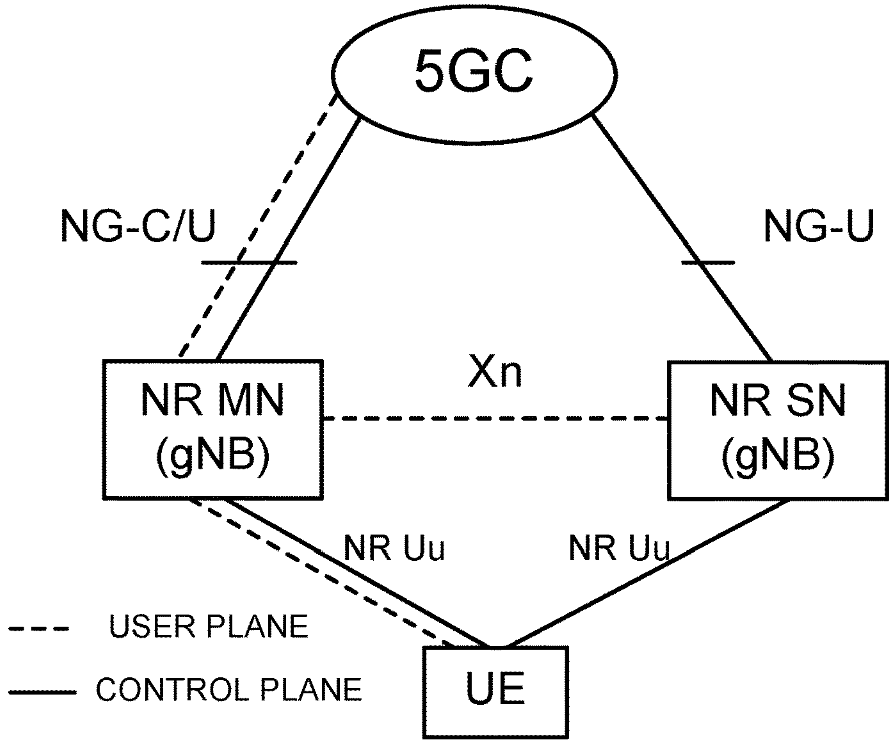
FIG. 3 is an illustration of new radio-dual connectivity (NR-DC) according to some embodiments.
Figure 4:
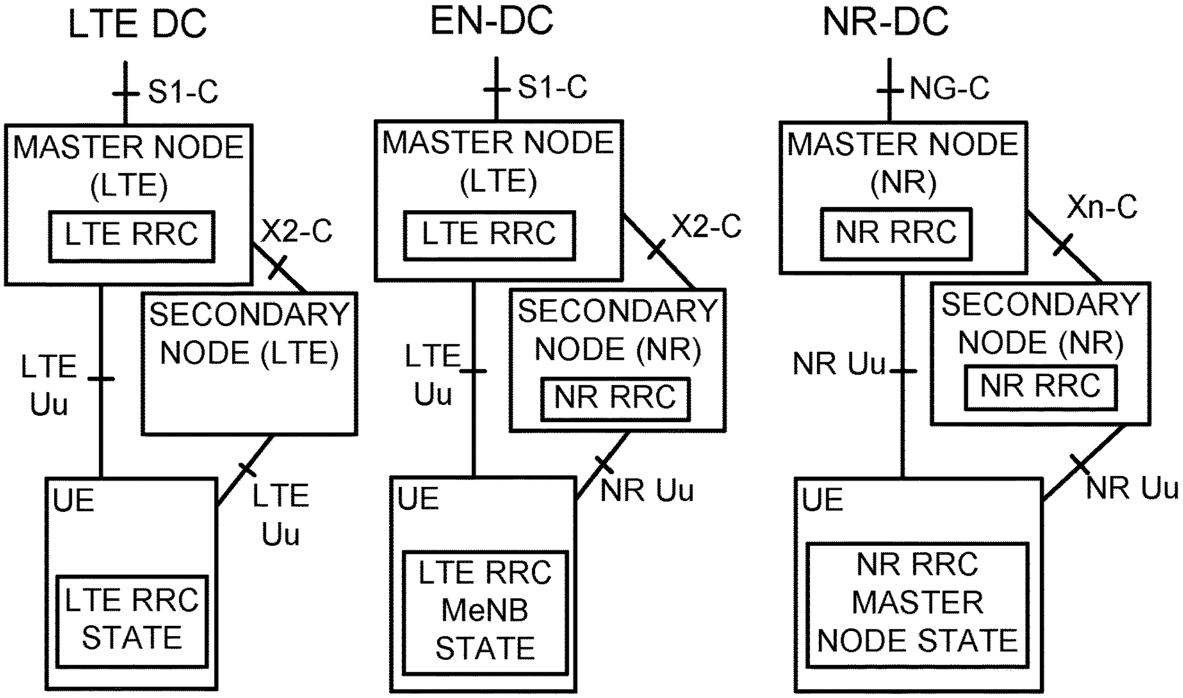
FIG. 4 is an illustration of the control plane architecture for Dual Connectivity in LTE DC, EN-DC, and NR-DC according to some embodiments.
Figure 5:
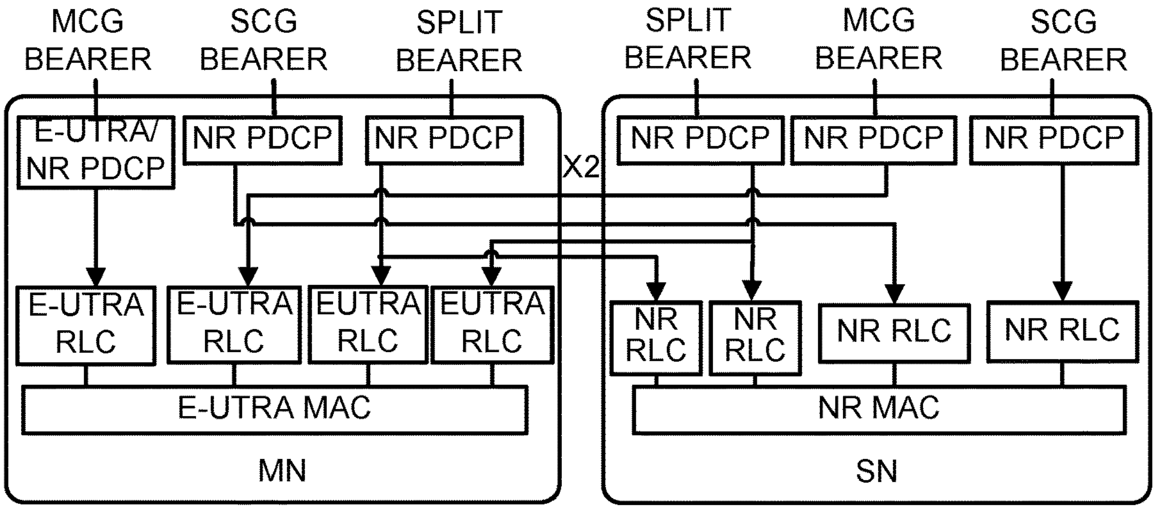
FIG. 5 is an illustration of network side protocol termination options for MCG, SCG and split bearers in MR-DC with EPC (EN-DC) according to some embodiments.
Figure 6:
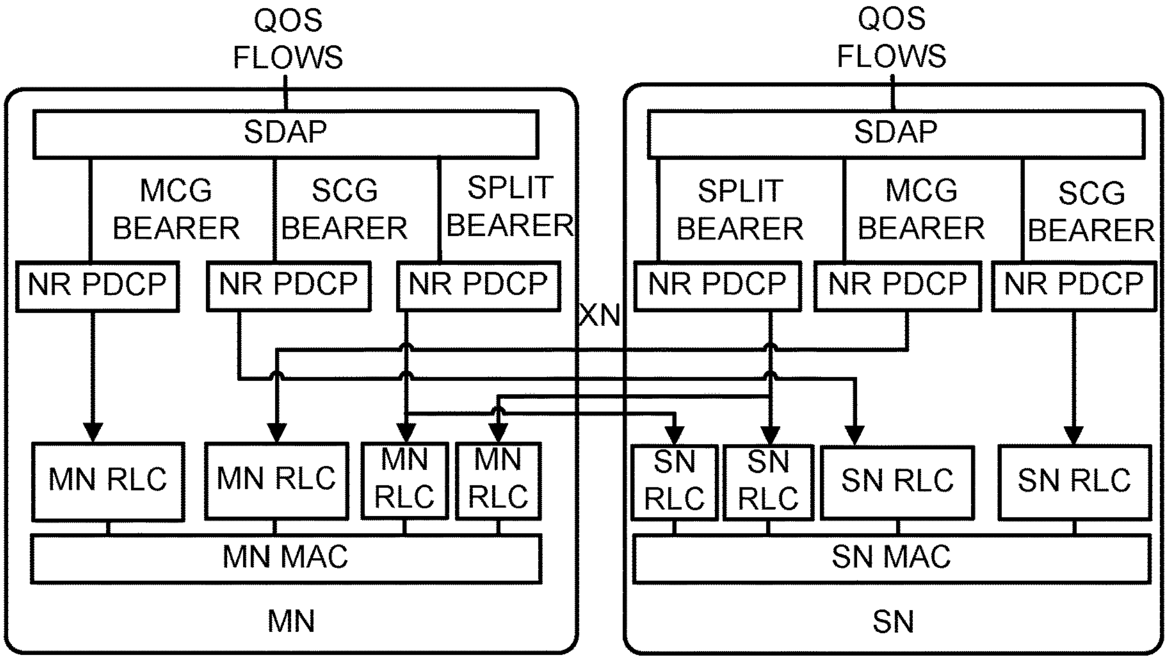
FIG. 6 is an illustration of network side protocol termination options for MCG, SCG and split bearers in MR-DC with 5GC (NGEN-DC, NE-DC and NR-DC) according to some embodiments.
Figure 7:
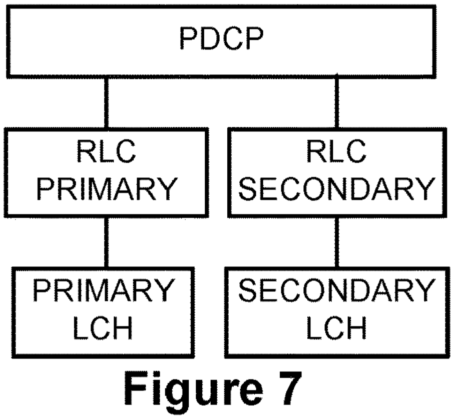
FIG. 7 is an illustration of packet duplication according to some embodiments.
Figure 8:
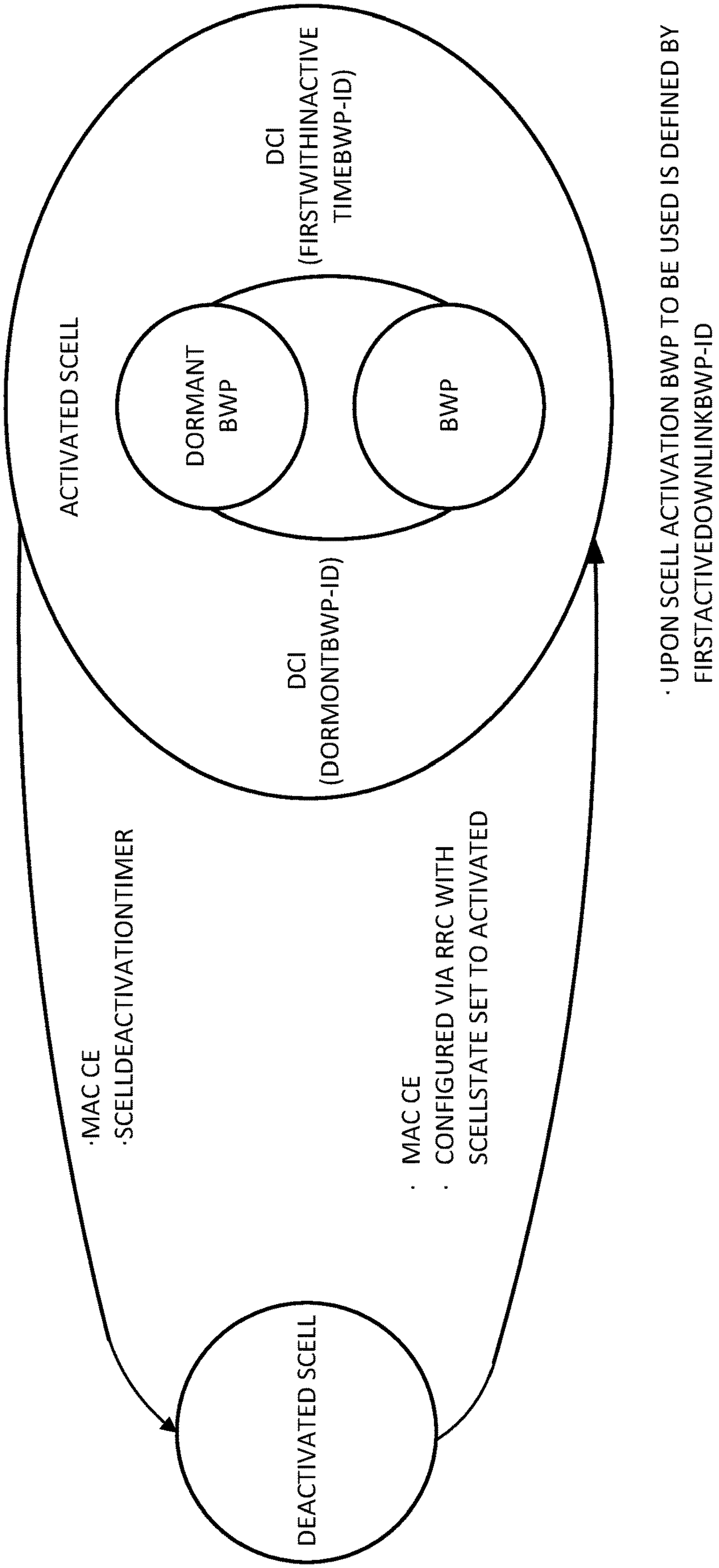
FIG. 8 is an illustration of dormancy like behavior for SCells in NR according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive.

Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

According to some embodiments herein mobility related to (de)activated SCG include:

MN mobility with (de)activated SCG, target MN decides the SCG mode of operation.

MN mobility with (de)activated SCG, target SN decides the SCG mode of operation.

MN initiated SN mobility with (de)activated SCG, MN decides the SCG mode of operation.

SN initiated SN mobility with (de)activated SCG, target SN decides the SCG mode of operation.

SN initiated SN mobility with (de)activated SCG, MN decides the SCG mode of operation.

MN initiated SN mobility with (de)activated SCG, target SN decides the SCG mode of operation.

Mobility to target MN not supporting (de)activated SCG.

Mobility to target SN not supported (de)activated SCG.

In general, the advantage of the solution herein is that it gives different methods for mobility with activated and deactivated SCG, which will be needed in the rel-17 work of standardizing deactivated SCG. Compared to existing methods, the current disclosure covers the exchange of user plane data activity/buffer status (e.g. from the source to the target) so that target can determine which mode of operation is to be set in an educated manner, avoiding the case of setting the SCG's mode of operation to deactivated while the UE has a lot of user plane data to be transmitted, which could benefit from an activated SCG; or vice-versa, setting the SCG's mode of operation to activated while the UE basically has not much data to transmit, which could benefit from an deactivated SCG (for not spend energy unnecessarily).

The present disclosure also covers the case where the Source MN determines the SCG's mode of operation, which might make sense in the case MN terminated bearers are configured and in the case the entity determining the SCG's mode of operation is at the MN.

The present disclosure also covers the possibility that the target SN has to reject the proposed SCG's mode of operation, e.g., taking into account SN related input such as the SCG's resource situation in terms of load.

The terms suspended SCG, SCG in power saving mode, or deactivated SCG are used interchangeably. The term suspended SCG may also be called as deactivated SCG or inactive SCG, or dormant SCG. The terms resumed SCG, SCG in normal operating mode and SCG in non-power saving mode are used interchangeably. The terms resumed SCG may also be called as activated SCG or active SCG. The operation of the SCG operating in resumed or active mode may also be called as normal SCG operation or legacy SCG operation. Examples of operations are UE signal reception/transmission procedures e.g. reception of signals/messages, transmission of signals/messages, etc.

In the description that follows, the description mostly refers to, and shows examples. wherein the second cell group is a Secondary Cell Group (SCG) for a UE configured with Multi-Radio Dual Connectivity (e.g. MR-DC).

In the description that follows, the description describes terms like SCG and PSCell, as one of the cells associated with the SCG. That can be for example a PSCell as defined in NR specifications (e.g. RRC TS 38.331 V16.2.0), defined as a Special Cell (SpCell) of the SCG, or a Primary SCG Cell (PSCell), as follows:

Secondary Cell Group: For a UE configured with dual connectivity, the subset of serving cells comprising of the PSCell and zero or more secondary cells (SCells).

Special Cell: For Dual Connectivity operation the term Special Cell refers to the PCell of the MCG or the PSCell of the SCG, otherwise the term Special Cell refers to the PCell.

Primary SCG Cell (PSCell): For dual connectivity operation, the SCG cell in which the UE performs random access when performing the Reconfiguration with Sync procedure.

In the description that follows, the description primarily refers to and shows examples wherein the second cell group is a Secondary Cell Group (SCG) that is deactivated (or suspended or in power saving mode of operation), for a UE configured with Multi-Radio Dual Connectivity (e.g. MR-DC). However, the method is equally applicable for the case where the second cell group is a Master Cell Group (MCG) for a UE configured with Dual Connectivity (e.g. MR-DC), wherein the MCG could be suspended, while the SCG is operating in normal mode. Some embodiments also provide that the MCG is referred to as MN (Master Node) and the SCG as SN (Secondary Node).

In the description that follows, the description describes that when the second cell group is deactivated (e.g. SCG becomes deactivated upon reception of an indication from the network) the UE stops monitoring PDCCH on the SCG cells (i.e. stop monitoring PDCCH of the PSCell and of the SCells of the SCG). Solutions are mainly described using as an example a second cell group that is a Secondary Cell Group the UE configured with MR-DC is configured with, and, the SCG being deactivated mode of operation at the UE when the UE perform the actions disclosed in the method. However, the method is also applicable for the case one assumes that the second cell group is a Master Cell Group (MCG) that is deactivated, so that the UE stops monitoring PDCCH on the MCG and continues monitoring PDCCH on the SCG.

The term "transmit BSR" is generally understood as the indication from the UE to the network about the UL data volume at UE. This includes the case that the triggered BSR is transmitted by a MAC CE on a UL grant. This also includes the case in which there is no UL grant for the transmission of the triggered BSR but instead a scheduling request is transmitted on a valid PUCCH resource and/or a random-access procedure is initiated with no valid PUCCH resource.

Figure 9:
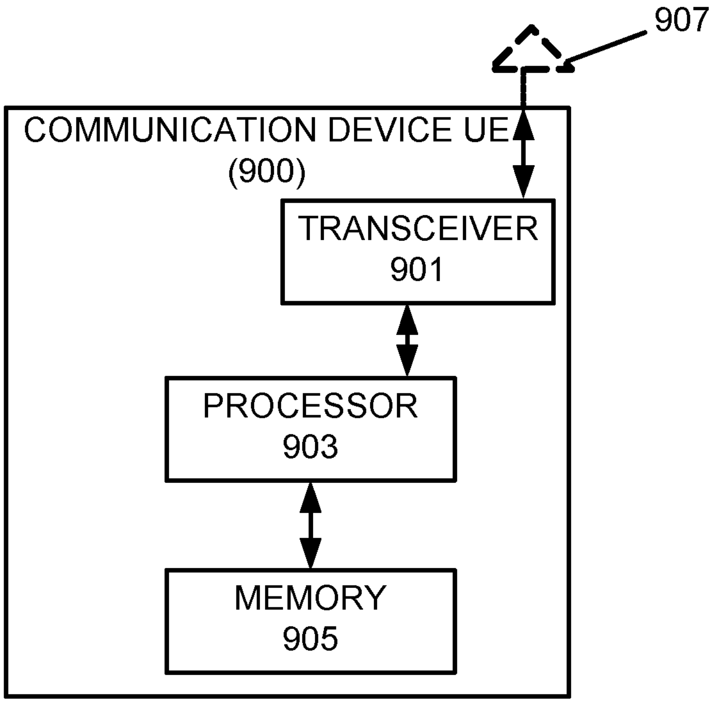
FIG. 9 is a block diagram illustrating a wireless device UE according to some embodiments of inventive concepts.

Prior to describing the embodiments in further detail, FIG. 9 is a block diagram illustrating elements of a UE 900 (also referred to as a mobile terminal, a mobile communication terminal, a communication device UE, a wireless device, a wireless communication device, a wireless terminal, mobile device, a wireless communication terminal, user equipment, UE, a user equipment node/terminal/device, etc.) configured to provide wireless communication according to embodiments of inventive concepts. (UE 900 may be provided, for example, as discussed below with respect to wireless device 2610 of FIG. 26, UE 2700 of FIG. 27, virtualization hardware 2830 and virtual machine 2840 of FIG. 28, UEs 2991, 2992 of FIG. 29, and UE 3030 of FIG. 30, all of which should be considered interchangeable in the examples and embodiments described herein and be within the intended scope of this disclosure, unless otherwise noted.) As shown, UE 900 may include an antenna 007 (e.g., corresponding to antenna 2611 of FIG. 26 and/or antenna 28225 of FIG. 28), and transceiver circuitry 901 (also referred to as a transceiver, e.g., corresponding to interface 2614 of FIG. 26, interfaces 2705, 2709, 2711, transmitter 2733 and receiver 2735 of FIG. 27, transmitter 28210 and receiver 28220 of FIG. 28, and radio interface 2937 of FIG. 30) including a transmitter and a receiver configured to provide uplink and downlink radio communications with a base station(s) (e.g., corresponding to network node 2660 of FIG. 26, also referred to as a RAN node) of a radio access network. UE 900 may also include processing circuitry 903 (also referred to as a processor, e.g., corresponding to processing circuitry 2620 of FIG. 26, processor 2701 of FIG. 27, processing circuitry 2860 of FIG. 28, and processing circuitry 3038 of FIG. 30) coupled to the transceiver circuitry, and memory circuitry 905 (also referred to as memory, e.g., corresponding to device readable medium 2630 of FIG. 26 and/or memory 2890 of FIG. 28) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that separate memory circuitry is not required. UE 900 may also include an interface (such as a user interface) coupled with processing circuitry 903, and/or UE 900 may be incorporated in a vehicle.

As discussed herein, operations of UE 900 may be performed by processing circuitry 903 and/or transceiver circuitry 901. For example, processing circuitry 903 may control transceiver circuitry 1101 to transmit communications through transceiver circuitry 901 over a radio interface to a master radio access network node (also referred to as a master node, or a base station) and/or to receive communications through transceiver circuitry 907 from a master node over a radio interface. Moreover, modules may be stored in memory circuitry 905, and these modules may provide instructions so that when instructions of a module are executed by processing circuitry 903, processing circuitry 903 performs respective operations (e.g., operations discussed below with respect to Example Embodiments relating to wireless communication devices). According to some embodiments, a UE 900 and/or an element(s)/function(s) thereof may be embodied as a virtual node/nodes and/or a virtual machine/machines.

Figure 10:
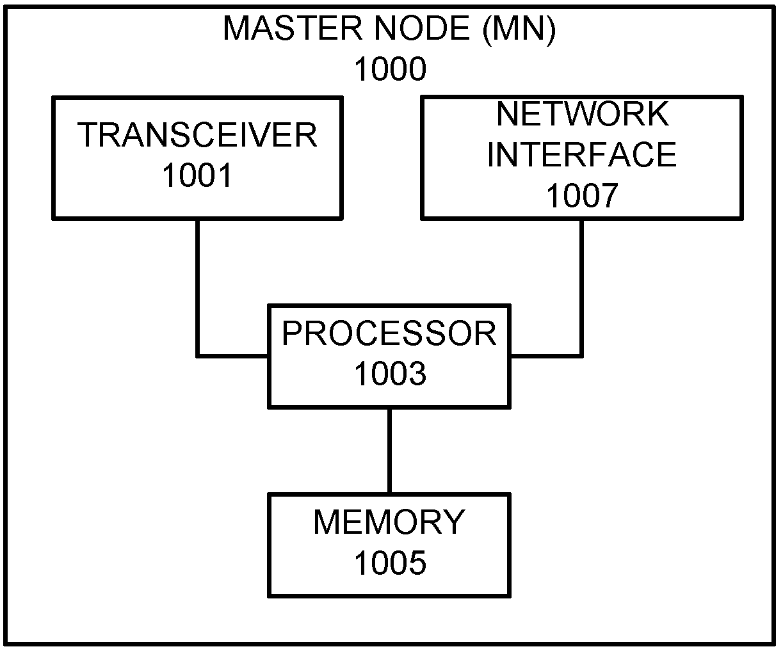
FIG. 10 is a block diagram illustrating a master node (e.g., a master base station MeNB/gNB) according to some embodiments of inventive concepts.

FIG. 10 is a block diagram illustrating elements of a master node 1000 (also referred to as a master network node, master base station, MeNodeB/MeNB, gNodeB/gNB, etc.) of a Radio Access Network (RAN) configured to provide cellular communication according to embodiments of inventive concepts. (Master node 1000 may be provided, for example, as discussed below with respect to network node 2660 of FIG. 26, virtual hardware 2830 or virtual machine 2840 of FIG. 28, base stations 2912A, 2912B, and 2312C of FIG. 29 and/or base station 3020 of FIG. 30, all of which should be considered interchangeable in the examples and embodiments described herein and be within the intended scope of this disclosure, unless otherwise noted.) As shown, the master node 1000 may include transceiver circuitry 1001 (also referred to as a transceiver, e.g., corresponding to portions of interface 2690 of FIG. 26 and/or portions of radio interface 3027 of FIG. 30) including a transmitter and a receiver configured to provide uplink and downlink radio communications with mobile terminals. The master node may include network interface circuitry 1007 (also referred to as a network interface, e.g., corresponding to portions of interface 2690 of FIG. 26 network interfaces 2870, 2880 of FIG. 28, and/or portions of communication interface 3026 of FIG. 30) configured to provide communications with other nodes (e.g., with other master base stations and secondary base stations) of the RAN and/or core network CN. The network node may also include processing circuitry 1003 (also referred to as a processor, e.g., corresponding to processing circuitry 2670 of FIG. 26, processing circuitry 2860 of FIG. 28, and/or processing circuitry 3028 of FIG. 30) coupled to the transceiver circuitry, and memory circuitry 1005 (also referred to as memory, e.g., corresponding to device readable medium 2680 of FIG. 26 and/or memory 2890 of FIG. 28) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the master node 1000 may be performed by processing circuitry 1003, network interface 1007, and/or transceiver 1001. For example, processing circuitry 1003 may control transceiver 1001 to transmit downlink communications through transceiver 1001 over a radio interface to one or more mobile terminals UEs and/or to receive uplink communications through transceiver 1001 from one or more mobile terminals UEs over a radio interface. Similarly, processing circuitry 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to RAN nodes). According to some embodiments, master node 1000 and/or an element (s)/function(s) thereof may be embodied as a virtual node/nodes and/or a virtual machine/machines.

Figure 11:
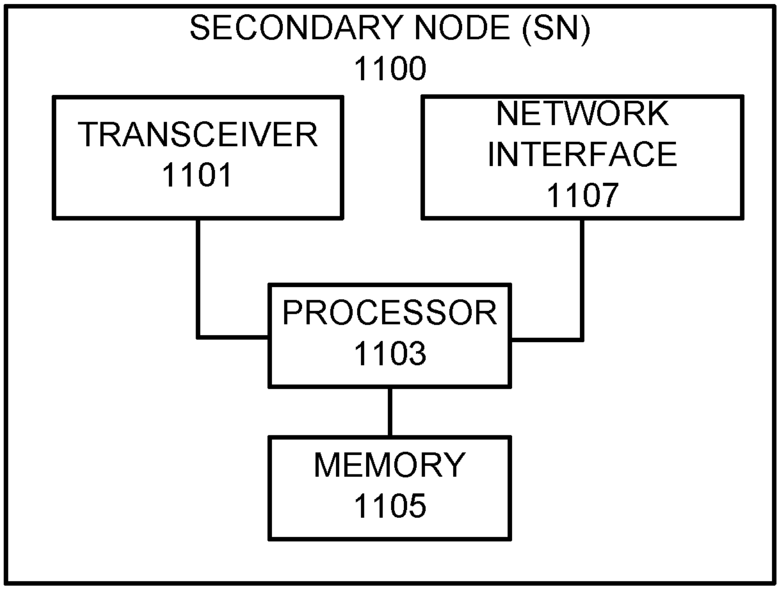
FIG. 11 is a block diagram illustrating a secondary node (e.g., a secondary base station SeNB/gNB) according to some embodiments of inventive concepts.

FIG. 11 is a block diagram illustrating elements of a secondary node 1100 (also referred to as a secondary network node, secondary base station, SeNodeB/SeNB, gNodeB/gNB, etc.) of a Radio Access Network (RAN) configured to provide cellular communication according to embodiments of inventive concepts. (Secondary node 1100 may be provided, for example, as discussed below with respect to network node 2660 of FIG. 26, virtual hardware 2830 or virtual machine 2840 of FIG. 28, base stations 2912A, 2912B, and 2912C of FIG. 29 and/or base station 3020 of FIG. 30, all of which should be considered interchangeable in the examples and embodiments described herein and be within the intended scope of this disclosure, unless otherwise noted.) As shown, the secondary node 1100 may include transceiver circuitry 1101 (also referred to as a transceiver, e.g., corresponding to portions of interface 2690 of FIG. 26 and/or portions of radio interface 3027 of FIG. 30) including a transmitter and a receiver configured to provide uplink and downlink radio communications with mobile terminals. The secondary node may include network interface circuitry 1107 (also referred to as a network interface, e.g., corresponding to portions of interface 2690 of FIG. 26 network interfaces 2870, 2880 of FIG. 28, and/or portions of communication interface 3026 of FIG. 30) configured to provide communications with other nodes (e.g., with other master base stations and secondary base stations) of the RAN and/or core network CN. The secondary node may also include processing circuitry 1103 (also referred to as a processor, e.g., corresponding to processing circuitry 2670 of FIG. 26, processing circuitry 2860 of FIG. 28, and/or processing circuitry 3028 of FIG. 30) coupled to the transceiver circuitry, and memory circuitry 1105 (also referred to as memory, e.g., corresponding to device readable medium 2680 of FIG. 26 and/or memory 2890 of FIG. 28) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the secondary node 1000 may be performed by processing circuitry 1103, network interface 1107, and/or transceiver 1101. For example, processing circuitry 1103 may control transceiver 1101 to transmit downlink communications through transceiver 1101 over a radio interface to one or more mobile terminals UEs and/or to receive uplink communications through transceiver 1101 from one or more mobile terminals UEs over a radio interface. Similarly, processing circuitry 1103 may control network interface 1107 to transmit communications through network interface 1107 to one or more other network nodes and/or to receive communications through network interface from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to secondary nodes 1000). According to some embodiments, secondary node 1100 and/or an element(s)/function(s) thereof may be embodied as a virtual node/nodes and/or a virtual machine/machines.

Figure 12:
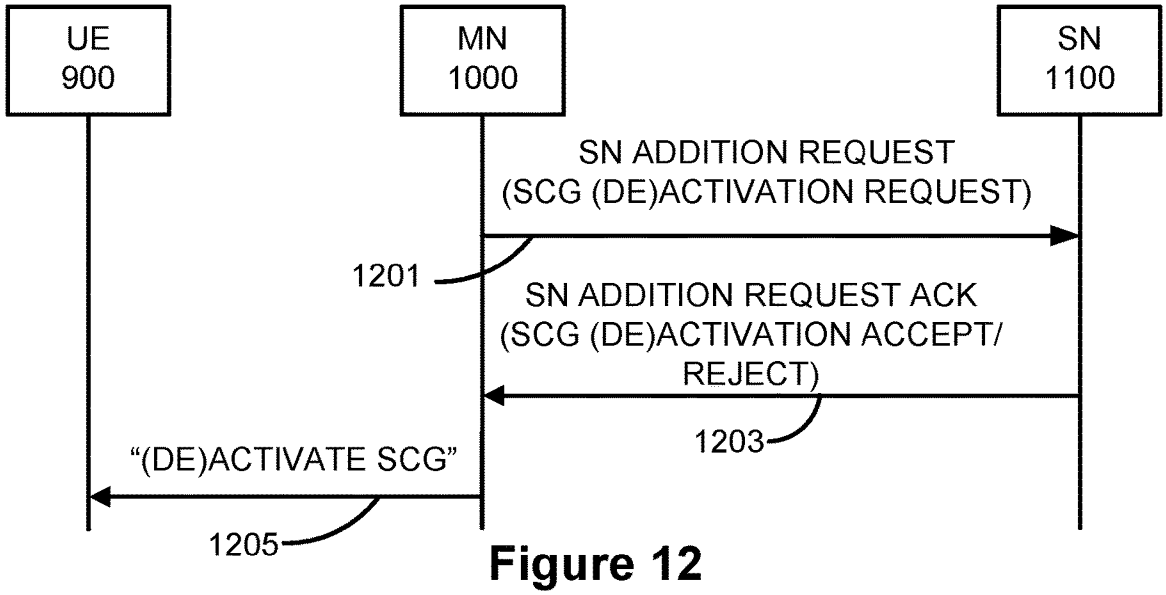
FIG. 12 is a signaling diagram illustrating operations of MN initiated SCG activation and/or deactivation where the MN decides the mode of operation according to some embodiments of inventive concepts.

FIG. 12 illustrates a signaling diagram of embodiments where the MN 1000 initiates SCG activation and/or deactivation where the MN requests a certain SCG mode of operation to the SN. The MN 1000 determines to add a Secondary cell group (SCG) configuration (e.g. based on measurement reports received from the UE and/or further input like traffic demands) and determines a mode of operation of the SCG e.g. activated or deactivated.

In operation 1201, the MN 1000 initiates transmission of a SN addition request (also referred to as a SCG (de) activation request) to a secondary node 1100 to add an activated SCG and/or a deactivated SCG. The request may be in the form of a S-NG-RAN NODE ADDITION REQUEST with an indication of activated SCG or deactivated SCG.

In operation 1203, the SN 1100 initiates transmission of a SN addition request acknowledgement message (also referred to as a SCG (de)activation accept/reject message) to the MN 1000. The acknowledgement message indicates whether the request has been accepted and the mode of operation of the SCG. The acknowledgement message may be in the form of a S-NG-RAN NODE ADDITION ACKNOWLEDGE message.

In operation 1205, the MN 1000 initiates transmission to the UE 904 of a (de)active SCG message including an SCG configuration to be added (e.g. nr-scg) and an indication of the SCG's mode of operation e.g. activated SCG or deactivated SCG.

Figure 13:
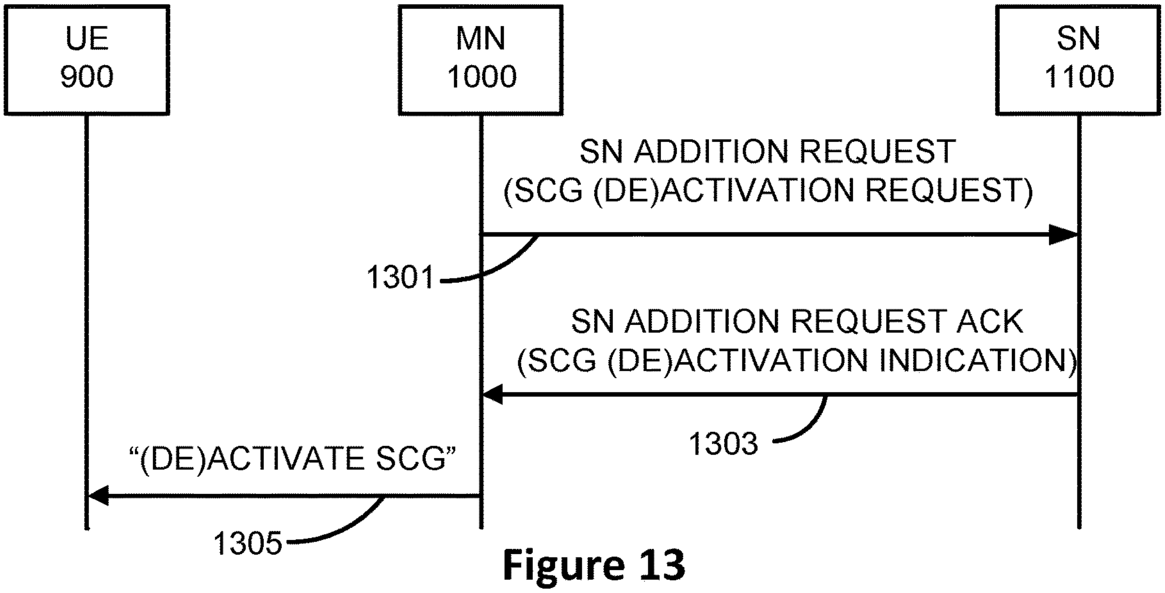
FIG. 13 is a signaling diagram illustrating operations of MN initiated SCG activation and/or deactivation where the SN decides the mode of operation according to some embodiments of inventive concepts.

FIG. 13 illustrates a signaling diagram of embodiments where the MN 1000 initiates SCG activation and/or deactivation where the SN 1100 indicates the SCG mode of operation to the MN 1000. Thus, the SN 1100 decides the mode of operation of the SCG. The MN 1000 determines to add a Secondary cell group (SCG) configuration (e.g. based on measurement reports received from the UE and/or further input like traffic demands).

In operation 1301, the MN 1000 initiates transmission of a SN addition request (also referred to as a SCG (de) activation request) to a secondary node 902 to add an activated SCG and/or a deactivated SCG and to determine an operation mode of the SCG. The request may be in the form of a S-NG-RAN NODE ADDITION REQUEST with a request to the SN 1100 to determine the SCG mode of operation (e.g., activated SCG or deactivated SCG).

In operation 1303, the SN 1100 initiates transmission of a SN addition request acknowledgement message (also referred to as a SCG (de)activation indication) to the MN 1000. The acknowledgement message indicates whether the request has been accepted and the mode of operation of the SCG indicated. The acknowledgement message may be in the form of a S-NG-RAN NODE ADDITION ACKNOWLEDGE message.

In operation 1305, the MN 1000 initiates transmission to the UE 904 of a (de)activate SCG message including an SCG configuration to be added (e.g. nr-scg) and an indication of a mode of operation of the SCG (e.g. activated SCG or deactivated SCG).

Figure 14:
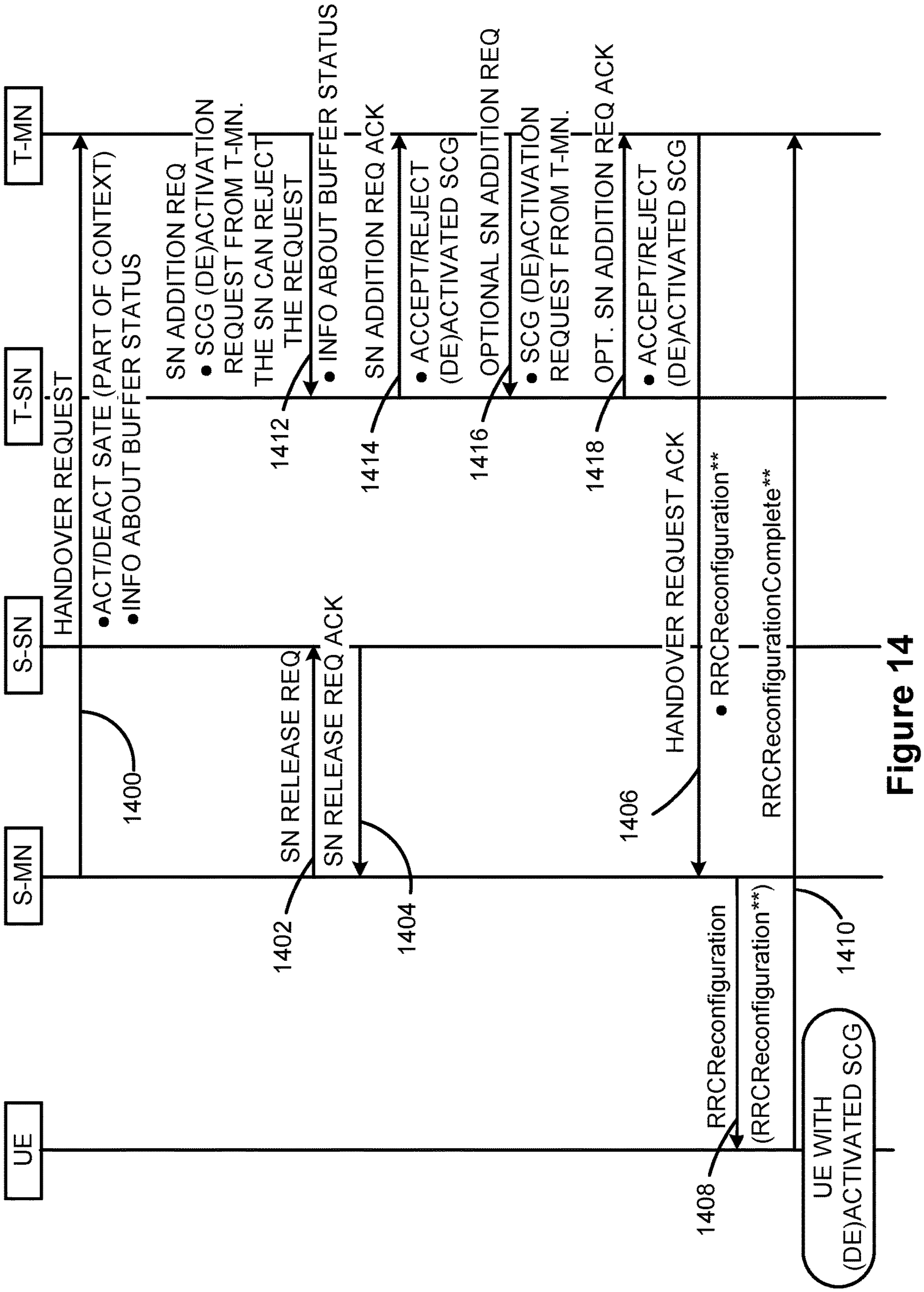
FIGS. 14-19 are signaling diagrams illustrating some embodiments of inventive concepts.

Reference is now made to FIG. 14, which illustrates the main operations of MN mobility with (de)activated SCG, where the target MN suggests the SCG mode of operation according to some embodiments. Some embodiments include methods that are performed by a source Master Node (MN) (S-MN in FIG. 14) by performing operations of: transmitting a request for handover (operation 1400), a HANDOVER REQUEST message for a UE with activated or deactivated SCG, to a target Master Node (MN). In some embodiments, the message may contain an indication about whether the SCG is currently activated or deactivated. In some embodiments, the message may contain information about the current traffic load, e.g. buffer status of the current MCG or buffer status of the current SCG or any combination of these as part of the info about buffer status. Some embodiments provide that the information about SCG mode of operation (e.g., activated/deactivate state) may be included in the UE Context. The information may be included in the MN part of the UE context, in the SN part of the UE context or in both the MN and SN part of the UE context.

Some embodiments include the source MN transmitting a SN release request to the source secondary node in operation 1402 for the source SN to release resources associated with the UE being handed over and receiving, in operation 1404 a SN release request acknowledgement message from the source SN.

Some embodiments include receiving, in operation 1406, a response, a HANDOVER REQUEST ACKNOWLEDGE, by the source MN containing a Handover Command, including a reconfiguration message (referred to as an RRCReconfiguration message in FIG. 14) containing reconfigurationWithSync with a UE target configuration having configuration parameters for the UE for communicating with the target MN and/or target SN(s). In some embodiments, the Handover Command includes an indication of activated or deactivated SCG. Some embodiments provide that the indication may be included in the MN part of the reconfiguration message (e.g. a CellGroupConfig associated to the MCG) and the indication may be included in the SN part of the reconfiguration message, e.g. CellGroupConfig associated to the SCG. In some embodiments, the indication may be included in the XnAP message HANDOVER REQUEST ACKNOWLEDGE message.

Some embodiments include transmitting, in block 1408, the Handover Command, having the reconfiguration message (e.g., the RRCReconfiguration message) containing the reconfigurationWithSync to the UE with the target configuration. The Handover Command includes the indication of activated or deactivated SCG and releases the source SN. The UE, in operation 1410, transmits a reconfiguration complete (e.g., a RRCReconfiguration complete) message to the target MN.

Figure 18:
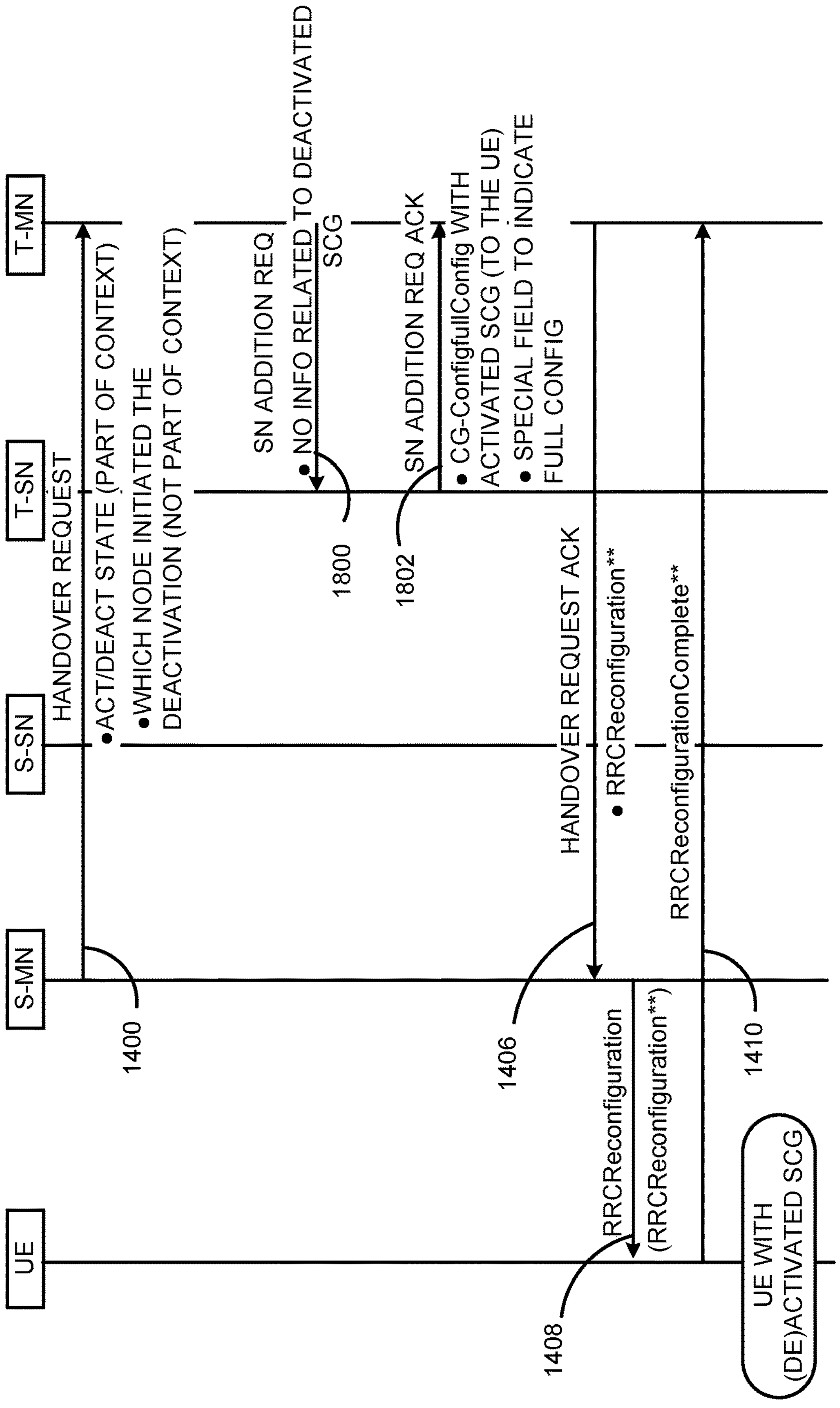

It is noted that in some embodiments such as the embodiments in FIG. 14 and FIG. 18 that the reconfiguration message is referred to as RRCReconfiguration . This indicates that the reconfiguration message is configured by the target MN where the source MN maps the RRCReconfiguration  from the target MN to a RRCReconfiguration message from the source MN.

Some embodiments illustrated in FIG. 14 are directed to methods performed by a target Master Node (MN), the method comprising: receiving, in operation 1400, a request for handover from a source Master Node (MN) for a UE with activated or deactivated SCG; determining whether the target SN should be activated or deactivated. The decision can be based on if it is activated or deactivated in the source SN (i.e. based on the current mode of operation of the UE's SCG at the source SN) and possibly based on additional information such as at least one of these: i) user plane traffic related information such as the Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG).

In some embodiments, the target MN decides to have an activated SCG if at least the amount of user plane traffic is above a threshold. In some embodiments, this is performed if the criterion is fulfilled for at least one direction i.e. DL and UL fulfill the criterion. In the case of UL, that is done by comparing an amount of data volume reported in BSR with an UL threshold. In some embodiments, this is performed if both DL and UL fulfill the criterion in the case of UL, that is done by comparing an amount of data volume reported in BSR with an UL threshold. Some embodiments provide that the amount of user plane traffic compared to the threshold is averaged over time e.g. amount of traffic within a period of time is compared to the threshold. In some embodiments, different scenarios may be addressed. For example, some embodiments provide that the SCG is deactivated and MN decides for SCG activated. This may happen if the user plane traffic increases and/or the MN determines that after the SN change there would be more resources available at the SN (so that activation may be more beneficial compared to the S-SN case) and/or fewer resources available at the MN (due to a possible difference in UE capabilities between S-SN and T-SN) so that the MN benefits more of having the target SN with the SCG as activated.

In some embodiments, the SCG activated remains SCG activated: That can happen if the user plane traffic remains in similar conditions. In some embodiments, the MN decides to have a deactivated SCG in the target SN if the amount of user plane traffic is below a threshold. In some embodiments, this is performed if the criterion is fulfilled for at least one direction i.e. DL and UL fulfill the criterion. In some embodiments, in the case of UL, that is done by comparing an amount of data volume reported in BSR with an UL threshold.

In some embodiments, this is performed if both DL and UL fulfill the criterion; in the case of UL, that is done by comparing an amount of data volume reported in BSR with an UL threshold. Some embodiments provide that the amount of user plane traffic compared to the threshold is averaged over time e.g. amount of traffic within a period of time is compared to the threshold. According to different scenarios, SCG is activated and MN decides for SCG deactivated, which may happen if the user plane traffic decreases and/or the MN determines that after the SN change there would be less resources available at the SN (so that activation may be less beneficial compared to the S-SN case) and/or more resources available at the MN (due to a possible difference in UE capabilities between S-SN and T-SN) so that the MN benefits less of having the target SN with the SCG as activated.

Some embodiments provide that the SCG deactivated remains SCG deactivated, which may happen if the user plane traffic remains in similar conditions.

In some embodiments, the method includes transmitting, in operation 1412 a request, an S-NODE ADDITION REQUEST, to a target SN (may be the same as the source SN) for addition of an SCG to the target configuration. In some embodiments, the request includes an indication of the mode of operation determined by the MN for the SCG i.e. whether that is activated or deactivated SCG. In some embodiments, the indication can be an Information Element (IE) within the message over the interface between MN and SN indicating the determined mode of operation e.g. "SCG activated", "SCG deactivated". Some embodiments provide indicating/enabling the target SN to determine the SCG's mode of operation requested by the N e.g. presence of the IE "SCG deactivated" to indicate that the MN wants the SCG to be deactivated, or absence of the IE "SCG deactivated" to indicate that the MN wants the SCG to be activated (as in legacy). In some embodiments, the request including traffic information, e.g. of current SCG.

In some embodiments, the user plane traffic information can be at one of these: i) Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG). In some embodiments, the user plane traffic information can be in different granularity such as at least one of per direction e.g. user plane traffic information for DL, user plane traffic information for UL and per bearer.

Operations may include receiving, in operation 1414 a response, an S-NODE ADDITION REQUEST ACKNOWLEDGE, from a target SN including an indication enabling the MN to determine whether the requested SCG's mode of operation was accepted or not. Some embodiments include receiving a response from the target SN where the addition of the SCG is accepted and the requested SCG mode of operation accepted. In this case, as the mode of operation has been accepted, the MN can generate the RRC message to be provided to the UE (MN RRC Reconfiguration, including the SN RRC Reconfiguration) including the indication with the requested SCG mode of operation.

In some embodiments, the MN sets the SCG's mode of operation, as part of the MN RRC Reconfiguration e.g. outside the CellGroupConfig IE for the SCG configuration in SN RRC Reconfiguration; that is set according to what the MN has requested, as the SN has accepted the request for the SCG's mode of operation. In some embodiments, the MN does not need to set the SCG's mode of operation, as the MN assumes that the SCG's mode of operation has been set by the target SN within the SCG configuration (within the SN RRC Reconfiguration the MN has received in the S-NODE ADDITION REQUEST ACKNOWLEDGE message—also referred to as an accept\reject (de)activated SCG that indicates whether the SN addition request was accepted or rejected). Embodiments may include receiving a response from a target SN where the addition of the SCG is accepted, but the requested SCG mode of operation is rejected. In such cases, as the mode of operation has been rejected, there can be different options in terms of actions at the MN. In some embodiments, the MN continues the procedure towards the UE and generates the RRC message to be provided to the UE (MN RRC Reconfiguration, including the SN RRC Reconfiguration) including the indication of the SCG's mode of operation (even if that is NOT the MN's requested SCG mode of operation).

In some embodiments, the MN has requested the SCG to be activated, but the SN has rejected the request (and determined the SCG to be deactivated e.g. due to some temporary traffic overload).

In some embodiments, at least the target-SN rejects the requested mode of operation and determines the SCG is to be deactivated, the target SN includes a timer information indicating that the MN shall wait sometime until it can send a request to activate the SCG via an optional SN addition request in operation 1416; that can be useful to prevent a situation where the MN receives the rejection for an activated SCG mode of operation, and immediately or within a too short time sends a request to the SN requesting to activate the SCG. The target SN receives, in operation 1418, an optional SN addition request acknowledgement (also referred to as an accept\reject (de)activated SCG that indicates if the optional SN addition request was accepted or rejected.

In some embodiments, the MN has requested the SCG to be deactivated, but the SN has rejected the request (and determined the SCG to be activated e.g. in case an SN-terminated bearer is to be configured and/or in case the SN prefers to not support a deactivate SCG towards a given MN). In some embodiments, the MN sets the SCG's mode of operation, as part of the MN RRC Reconfiguration e.g. outside the CellGroupConfig 1E for the SCG configuration in SN RRC Reconfiguration; that is set according to what the MN has requested, as the SN has accepted the request for the SCG's mode of operation. In some embodiments, the MN does not need to set the SCG's mode of operation, as the MN assumes that the SCG's mode of operation has been set by the target SN within the SCG configuration (within the SN RRC Reconfiguration the MN has received in the S-NODE ADDITION REQUEST ACKNOWLEDGE message).

In some embodiments, the MN stops/aborts the SN change procedure and determines to release the resources at the target SN. In some embodiments, the MN also releases the resources at the Source SN. Some embodiments provide that the MN selects another target SN to trigger the SN Change and re-start the procedure.

Some embodiments include receiving a response, an S-NODE ADDITION REQUEST REJECT, from a target SN where the addition of the SCG is rejected. This may occur in case the SN does not agree with the requested SCG's mode of operation. In some embodiments, as the addition has been rejected, there can be different options in terms of actions at the MN. In some embodiments, the MN stops/aborts the SN change procedure. In some embodiments, the MN also releases the resources at the Source SN. In some embodiments, the MN selects another target SN to trigger the SN Change and re-start the procedure. In some embodiments, in the case the MN initiates another addition request to the same or to a different SN, the indication of activated or deactivated SCG may in a following request be set to the same value of activated or deactivated as in the same request, or to a different value.

Operations may include Transmitting a response, a HANDOVER REQUEST ACKNOWLEDGE, to a source MN containing a Handover Command including a reconfiguration message (e.g., an RRCReconfiguration message) containing reconfigurationWithSync with the UE target configuration. In some embodiments, the Handover Command includes an indication of activated or deactivated SCG. The indication may be included in the MN part of the reconfiguration message, e.g. CellGroupConfig associated to the MCG. The indication may be included in the SN part of the reconfiguration message, e.g. CellGroupConfig associated to the SCG. The indication may be included in the XnAP message HANDOVER REQUEST ACKNOWLEDGE message.

Figure 15:
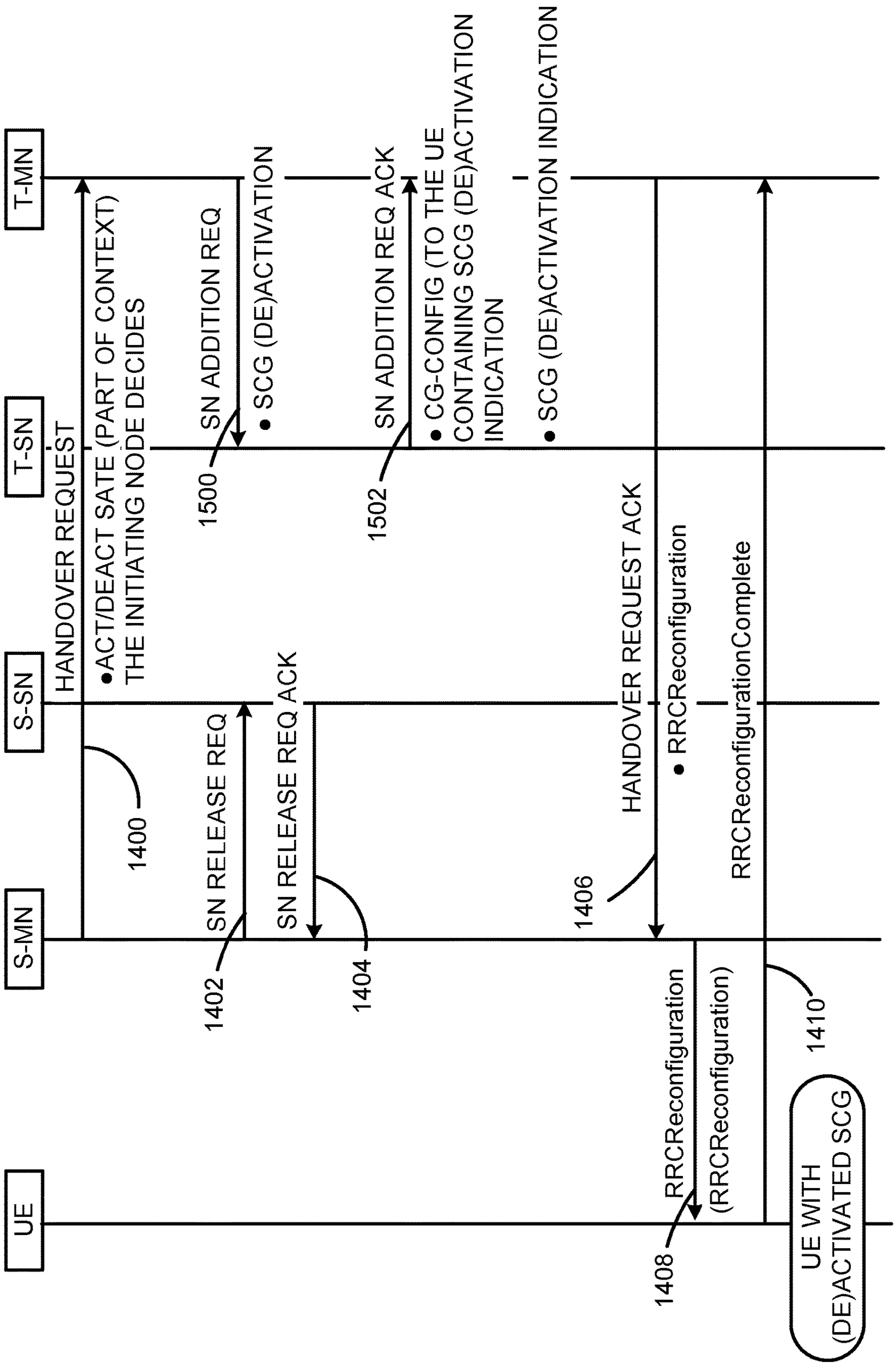

Some embodiments are directed to methods executed by a target Secondary Node (SN). FIG. 15 illustrates MN mobility with (de)activated SCG where the target SN decides MN initiated procedures. Turning to FIG. 15, operations by the source MN, target MN, and source SN are the same operations described in FIG. 14 and need not be repeated in detail herein. Operations according to such methods by the target secondary node include receiving a request, an S-NODE ADDITION REQUEST, from an MN for addition of an SCG to the target configuration (operation 1500). The request can include an indication of the mode of operation determined by the MN for the SCG i.e. whether that is activated or deactivated SCG. In one option the indication can be an Information Element (IE) within the message over the interface between MN and SN indicating the determined mode of operation e.g. "SCG activated", "SCG deactivated."

In another option, the indicating enables the target SN to determine the SCG's mode of operation requested by the MN e.g. presence of the IE "SCG deactivated" to indicate that the MN wants the SCG to be deactivated, or absence of the IE "SCG deactivated" to indicate that the MN wants the SCG to be activated (as in legacy).

The request includes traffic information, e.g. of the current SCG. The user plane traffic information can be at least one of following: i) Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG).

The user plane traffic information can be in different granularity such as at least one of per direction e.g. user plane traffic information for DL, user plane traffic information for UL or per bearer.

The operations include transmitting a response, an S-NODE ADDITION REQUEST ACKNOWLEDGE, to a target MN including an indication enabling the MN to determine whether the requested SCG's mode of operation was accepted or not (operation 1502). There can be different options as described below.

In one option, transmitting a response to the MN where the addition of the SCG is accepted and the requested SCG mode of operation accepted. As the mode of operation has been accepted, this enables the MN to generate the reconfiguration message (e.g., RRC message) to be provided to the UE (MN RRC Reconfiguration, including the SN RRC Reconfiguration) including the indication with the requested SCG mode of operation, and enables the MN to operate accordingly, the SN includes the indication of the SCG's mode of operation determined by the SN in the message to the MN (i.e. outside the RRC container).

In one option, the SCG's mode of operation is set by the target SN within the SCG configuration (within the SN RRC Reconfiguration the MN has received in the S-NODE ADDITION REQUEST ACKNOWLEDGE message).

In other embodiments, the response transmitted to the MN includes an indication that the addition of the SCG is accepted, but the requested SCG mode of operation is rejected; OR the response transmitted is an S-NODE ADDITION REQUEST REJECT, from a target SN where the addition of the SCG is rejected.

In one option, the target SN determines the acceptance of the mode of operation of the SCG based on the information the MN has included in the S-NODE ADDITION REQUEST such as: i) The indication of the mode of operation determined by the MN for the SCG i.e. whether that is activated or deactivated SCG; and/or ii) user plane traffic information such as i) user plane traffic related information such as the Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG).

In one option the SN decides to have an activated SCG if at least the amount of user plane traffic (e.g. included in the message from the MN) is above a threshold. In one sub-option this is performed if the criterion is fulfilled for at least one direction i.e. DL and UL fulfill the criterion; in the case of UL, that is done by comparing an amount of data volume reported in BSR with an UL threshold. In another sub-option this is performed if both DL and UL fulfill the criterion; in the case of UL, that is done by comparing an amount of data volume reported in BSR with an UL threshold. In yet another sub-option the amount of user plane traffic compared to the threshold is averaged over time e.g. amount of traffic within a period of time is compared to the threshold.

There may be different scenarios of these sub-options. In one scenario, the MN request is for SCG activated and the SN accepts the SCG to be activated: that can happen if the SN determine that the amount of user plane traffic information is above a threshold (which justifies the activation) and/or if the load in the SCG is below a threshold (e.g. in the PSCell).

In another scenario, the MN requests for SCG deactivated but SN accepts the SCG to be activated: that can happen if the SN determine that the amount of user plane traffic information is above a threshold (which justifies the activation) and/or if the load in the SCG is below a threshold (e.g. in the PSCell), and if the SN does not prefer to have the SCG deactivated (wherein a preference may have been set in the Operation and Maintenance—OAM system).

In another option the SN decides to have a deactivated SCG in the target SN if the amount of user plane traffic is below a threshold. In one sub-option of this option, this option is performed if the criterion is fulfilled for at least one direction i.e. DL and UL fulfill the criterion; in the case of UL, that is done by comparing an amount of data volume reported in BSR with an UL threshold. In another sub-option, this is performed if both DL and UL fulfill the criterion; in the case of UL, that is done by comparing an amount of data volume reported in BSR with an UL threshold. In yet another sub-option, the amount of user plane traffic compared to the threshold is averaged over time e.g. amount of traffic within a period of time is compared to the threshold.

There may be different scenarios. In one scenario, the MN request is a request for SCG deactivated and the SN accepts it to be deactivated. In another scenario, the MN request is for SCG activated but the SN rejects it, and only accepts it to be deactivated: that can happen if the SN determine that the amount of user plane traffic information is below a threshold (which would not justify the activation) and/or if the load in the SCG is above a threshold (e.g. in the PSCell).

Various embodiments described herein includes methods executed by a User Equipment (UE). Such methods include receiving, via a source MN, the Handover Command including the reconfiguration message (e.g., RRCReconfiguration message) containing the reconfigurationWithSync with the target configuration. The Handover Command including an indication of activated or deactivated SCG. The methods include reconfiguring to a target MN with an activated or deactivated SCG. The methods include transmitting a reconfiguration complete message (e.g., an RRCReconfiguration-Complete message) to a target MN.

Handover Preparation

This procedure is used to establish necessary resources in an NG-RAN node for an incoming handover. If the procedure concerns a conditional handover, parallel transactions are allowed. Possible parallel requests are identified by the target cell ID when the source UE AP IDs are the same. If the SCG State Indication IE is included in the HANDOVER REQUEST message, the target NG-RAN node may use it to activate or deactivate SCG as specified in TS 37.340 V16.3.0

Handover Request

This message is sent by the source NG-RAN node to the target NG-RAN node to request the preparation of resources for a handover.

Direction: source NG-RAN node→target NG-RAN node.

The additions to the Handover Request are:

| IE/Group Name | Presence | Range | IE type and reference | Semantics description | Criticality | Assigned Criticality |
|---|---|---|---|---|---|---|
| SCG State Indication | O | | ENUMERATED (activated, deactivated, . . . ) | | YES | ignore |

Figure 16:
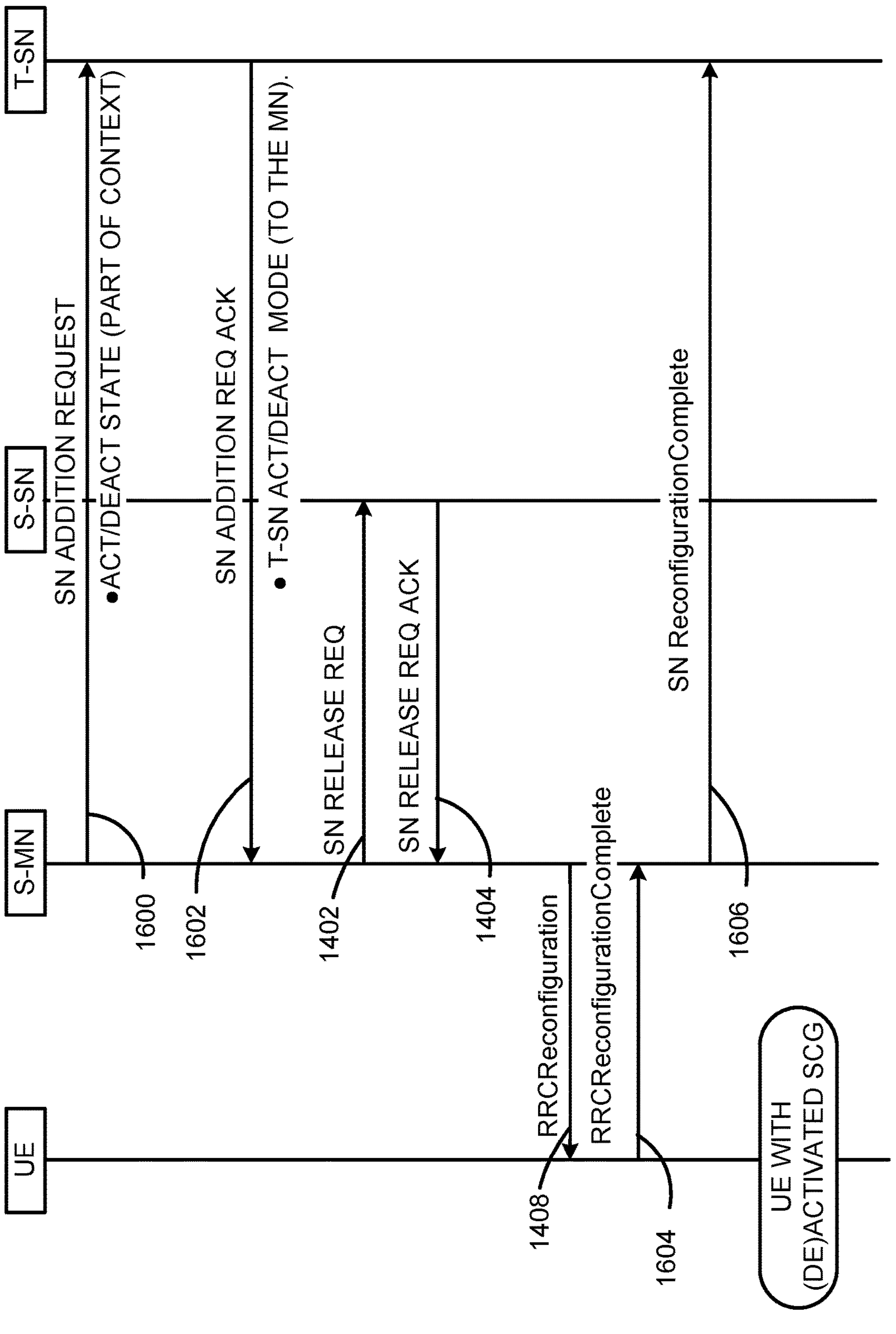

FIG. 16 illustrates MN initiated SN mobility with (de) activated SCG, where the MN suggests the SCG mode of operation. The operations in FIG. 16 that are common with the operations in FIG. 14 have been previously described and need not be described herein.

The various embodiments includes a method executed by a Master Node (MN). The method includes determining that a change of SN is needed, for example, based on measurements received from the UE. The measurement reports may indicate that a cell in the PSCell's frequency has a better quality than the current PSCell e.g. in terms of Reference Signal Received Power (RSRP), Reference Signal Received Quality (RSRQ) and/or SINR. Other input may also be considered such as the load in the PSCell frequency and other frequencies e.g. mobility load balance.

The method includes determining whether the target SN should be activated or deactivated. The decision can be based on if it is activated or deactivated in the source SN (i.e. based on the current mode of operation of the UE's SCG at the source SN) and possibly based on additional information such as at least one of these: i) user plane traffic related information such as the Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG).

In one option the target MN always keeps the same SCG mode as the source MN has indicated. In another option, the MN always sets the SCG mode to a fixed value, e.g. activated.

In another option the MN decides to have an activated SCG if at least the amount of user plane traffic is above a threshold. In one sub-option this is performed if the criterion is fulfilled for at least one direction i.e. DL and UL fulfill the criterion; in the case of UL, that is done by comparing an amount of data volume reported in BSR with an UL threshold. In another sub-option this is performed if both DL and UL fulfill the criterion; in the case of UL, that is done by comparing an amount of data volume reported in BSR with an UL threshold. In a further sub-option the amount of user plane traffic compared to the threshold is averaged over time e.g. amount of traffic within a period of time is compared to the threshold. There may be different scenarios.

In one scenario, the SCG is deactivated and MN decides for SCG activated: That can happen if the user plane traffic increases and/or the MN determines that after the SN change there would be more resources available at the SN (so that activation may be more beneficial compared to the S-SN case) and/or fewer resources available at the MN (due to a possible difference in UE capabilities between S-SN and T-SN) so that the MN benefits more of having the target SN with the SCG as activated.

In another scenario, the SCG activated remains SCG activated: That can happen if the user plane traffic remains in similar conditions.

In another option, the MN decides to have a deactivated SCG in the target SN if the amount of user plane traffic is below a threshold. In one sub-option this is performed if the criterion is fulfilled for at least one direction i.e. DL and UL fulfill the criterion; in the case of UL, that is done by comparing an amount of data volume reported in BSR with an UL threshold. In another sub-option, this is performed if both DL and UL fulfill the criterion; in the case of UL, that is done by comparing an amount of data volume reported in BSR with an UL threshold. In another sub-option, the amount of user plane traffic compared to the threshold is averaged over time e.g. amount of traffic within a period of time is compared to the threshold.

There may be different scenarios. In one scenario, the SCG is activated and the MN decides for SCG deactivated: That can happen if the user plane traffic decreases and/or the MN determines that after the SN change there would be less resources available at the SN (so that activation may be less beneficial compared to the S-SN case) and/or more resources available at the MN (due to a possible difference in UE capabilities between S-SN and T-SN) so that the MN benefits less of having the target SN with the SCG as activated. In another scenario, the SCG deactivated remains SCG deactivated: That can happen if the user plane traffic remains in similar conditions.

The method includes transmitting, in operation 1600, a request, an S-NODE ADDITION REQUEST, to a target SN (may be the same as the source SN) for addition of an SCG to the target configuration. The request includes an indication of the mode of operation determined by the MN for the SCG i.e. whether that is activated or deactivated SCG as indicated by the activated/deactivates state in FIG. 16. In one option the indication can be an Information Element (IE) within the message over the interface between MN and SN indicating the determined mode of operation e.g. "SCG activated", "SCG deactivated."

In another option the indication enables the target SN to determine the SCG's mode of operation requested by the MN e.g. presence of the IE "SCG deactivated" to indicate that the MN wants the SCG to be deactivated, or absence of the IE "SCG deactivated" to indicate that the MN wants the SCG to be activated (as in legacy).

The request can include user plane traffic information, e.g. of current SCG. The information is e.g. current buffer status. The user plane traffic information can be at one of these: i) Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG). The user plane traffic information can be in different granularity such as at least one of the following:

- Per direction e.g. user plane traffic information for DL, user plane traffic information for UL;
- Per bearer;

The method includes receiving, in operation 1602, a response, an S-NODE ADDITION REQUEST ACKNOWLEDGE, from a target SN including an indication enabling the MN to determine whether the requested SCG's mode of operation was accepted or not. There can be different options. In one option, the response received from the target SN includes an indication that indicates the addition of the SCG is accepted and the requested SCG mode of operation is accepted. In this case, as the mode of operation has been accepted, the MN can generate the RRC message to be provided to the UE (in operation 1408) (IN RRC Reconfiguration, including the SN RRC Reconfiguration) including the indication with the requested SCG mode of operation. In one option, the MN sets the SCG's mode of operation, as part of the MN RRC Reconfiguration e.g. outside the CellGroupConfig IE for the SCG configuration in SN RRC Reconfiguration; that is set according to what the MN has requested, as the SN has accepted the request for the SCG's mode of operation.

In another option, the MN does not need to set the SCG's mode of operation, as the MN assumes that the SCG's mode of operation has been set by the target SN within the SCG configuration (within the SN RRC Reconfiguration the MN has received in the S-NODE ADDITION REQUEST ACKNOWLEDGE message).

In another option of the different options, the response received from the target SN includes an indication that indicates the addition of the SCG is accepted, but the requested SCG mode of operation is rejected. In this case, as the mode of operation has been rejected, there can be a few options in terms of actions at the MN.

In one of these few options, the MN continues the procedure towards the UE and generates the RRC message to be provided to the UE (MN RRC Reconfiguration, including the SN RRC Reconfiguration) including the indication of the SCG's mode of operation (even if that is NOT the MN's requested SCG mode of operation).

In one case the MN has requested the SCG to be activated, but the SN has rejected the request (and determined the SCG to be deactivated e.g. due to some temporary traffic overload). In one option, at least the SN rejects the requested mode of operation and determines the SCG is to be deactivated, the SN includes a timer information indicating that the MN shall wait sometime until it can send a request to activate the SCG; that can be useful to prevent a situation where the MN receives the rejection for an activated SCG mode of operation, and immediately or within a too short time sends a request to the SN requesting to activate the SCG.

In another case the MN has requested the SCG to be deactivated, but the SN has rejected the request (and determined the SCG to be activated e.g. in case an SN-terminated bearer is to be configured and/or in case the SN prefers to not support a deactivate SCG towards a given MN). In one option, the MN sets the SCG's mode of operation, as part of the MN RRC Reconfiguration e.g. outside the CellGroupConfig IE for the SCG configuration in SN RRC Reconfiguration; that is set according to what the MN has requested, as the SN has accepted the request for the SCG's mode of operation. In another option, the MN does not need to set the SCG's mode of operation, as the MN assumes that the SCG's mode of operation has been set by the target SN within the SCG configuration (within the SN RRC Reconfiguration the MN has received in the S-NODE ADDITION REQUEST ACKNOWLEDGE message)

In another option the MN stops/aborts the SN change procedure and determines to release the resources at the target SN. In one option the MN also releases the resources at the Source SN. In another option the MN selects another target SN to trigger the SN Change and re-starts the procedure.

In another option of the different options, the response received from the target SN is an S-NODE ADDITION REQUEST REJECT, where the addition of the SCG is rejected. This may occur in case the SN does not agree with the requested SCG's mode of operation. In this case, as the addition has been rejected, there can be several options in terms of actions at the MN. In one option the MN stops/aborts the SN change procedure. In another option the MN also releases the resources at the Source SN. In another option the MN selects another target SN to trigger the SN Change and re-start the procedure.

In the case the MN initiates another addition request to the same or to a different SN, the indication of activated or deactivated SCG may in a following request be set to the same value of activated or deactivated as in the same request, or to a different value.

The method includes transmitting to the UE, a reconfiguration message (e.g., an RRCReconfiguration message) for the SN addition. This may contain the reconfigurationWithSync for the PSCell. The message may include an indication of activated or deactivated SCG. This indication should be interpreted in a broader sense. For example, the inclusion of a field and/or IE may indicate the SCG being added is to be considered deactivated while the absence of the field and/or IE indicates the SCG being added is to be considered activated; or, some other explicit indication such as "SCG activate" or "SCG deactivated." The indication may be included in the MN part of the reconfiguration message, e.g. CellGroupConfig associated to the MCG. The indication may be included in the SN part of the reconfiguration message e.g. CellGroupConfig associated to the SCG.

The method includes releasing the source SN (operations 1402 and 1404).

The various embodiments include a method executed by a target Secondary Node (SN). The method includes receiving, in operation 1600, a request, an S-NODE ADDITION REQUEST, from an MN for addition of an SCG to the target configuration. The request may include an indication of the mode of operation determined by the MN for the SCG i.e. whether that is of activated or deactivated SCG. In one option the indication can be an Information Element (IE) within the message over the interface between MN and SN indicating the determined mode of operation e.g. "SCG activated", "SCG deactivated." In another option, the indicating enabling the target SN to determine the SCG's mode of operation requested by the MN e.g. presence of the IE "SCG deactivated" to indicate that the MN wants the SCG to be deactivated, or absence of the IE "SCG deactivated" to indicate that the MN wants the SCG to be activated (as in legacy).

The request may include user plane traffic information, e.g. of current SCG. The information is e.g. current buffer status. The user plane traffic information can be at one of these: i) Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG). The user plane traffic information can be in different granularity such as at least one of the following:

- Per direction e.g. user plane traffic information for DL, user plane traffic information for UL;
- Per bearer;

The method includes transmitting a response, in operation 1602, an S-NODE ADDITION REQUEST ACKNOWLEDGE, to a source MN including an indication enabling the MN to determine whether the requested SCG's mode of operation was accepted or not. There can be different embodiments. In one option, the response to the MN indicates the addition of the SCG is accepted and the requested SCG mode of operation accepted. As the mode of operation has been accepted, to enable the MN to generate the reconfiguration message to be provided to the UE (MN RRC Reconfiguration, including the SN RRC Reconfiguration) including the indication with the requested SCG mode of operation, and to enable the MN to operate accordingly, the SN includes the indication of the SCG's mode of operation determined by the SN in the message to the MN (i.e. outside the RRC container).

In another option, the SCG's mode of operation is set by the target SN within the SCG configuration (within the SN RRC Reconfiguration the MN has received in the S-NODE ADDITION REQUEST ACKNOWLEDGE message).

In another embodiment, the response to the MN indicates that the addition of the SCG is accepted, but the requested SCG mode of operation is rejected. In another embodiment, the response is an S-NODE ADDITION REQUEST REJECT from a target SN where the addition of the SCG is rejected.

In another embodiment, the target SN determines the acceptance of the mode of operation of the SCG based on the information the MN has included in the S-NODE ADDITION REQUEST such as: i) The indication of the mode of operation determined by the MN for the SCG i.e. whether that is activated or deactivated SCG; and/or ii) user plane traffic information such as i) user plane traffic related information such as the Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG).

In one option the SN decides to have an activated SCG if at least the amount of user plane traffic (e.g. included in the message from the MN) is above a threshold. In one sub-option this is performed if the criterion is fulfilled for at least one direction i.e. DL and UL fulfill the criterion; in the case of UL, that is done by comparing an amount of data volume reported in BSR with an UL threshold. In another sub-option this is performed if both DL and UL fulfill the criterion; in the case of UL, that is done by comparing an amount of data volume reported in BSR with an UL threshold. In another sub-option the amount of user plane traffic compared to the threshold is averaged over time e.g. amount of traffic within a period of time is compared to the threshold.

There may be different scenarios. In a first scenario, the MN request for SCG activated and SN accepts the SCG to be activated: that can happen if the SN determine that the amount of user plane traffic information is above a threshold (which justifies the activation) and/or if the load in the SCG is below a threshold (e.g. in the PSCell). In a second scenario, the MN requests for SCG deactivated but SN accepts the SCG to be activated: that can happen if the SN determine that the amount of user plane traffic information is above a threshold (which justifies the activation) and/or if the load in the SCG is below a threshold (e.g. in the PSCell), and if the SN does not prefer to have the SCG deactivated (wherein a preference may have been set in the Operation and Maintenance—O&M system).

In another option, the SN decides to have a deactivated SCG in the target SN if the amount of user plane traffic is below a threshold. In one sub-option this is performed if the criterion is fulfilled for at least one direction i.e. DL and UL fulfill the criterion; in the case of UL, that is done by comparing an amount of data volume reported in BSR with an UL threshold. In another sub-option this is performed if both DL and UL fulfill the criterion; in the case of UL, that is done by comparing an amount of data volume reported in BSR with an UL threshold. In another sub-option the amount of user plane traffic compared to the threshold is averaged over time e.g. amount of traffic within a period of time is compared to the threshold.

There may be different scenarios. In a first scenario, the MN request for SCG deactivated and SN accepts it to be deactivated. In a second scenario, the MN request for SCG activated but SN rejects it, and only accepts it to be deactivated: that can happen if the SN determine that the amount of user plane traffic information is below a threshold (which would not justify the activation) and/or if the load in the SCG is above a threshold (e.g. in the PSCell).

The various embodiments include a method executed by a User Equipment (UE). The method includes receiving, in operation 1408, a reconfiguration message (referred to as an RRCReconfiguration message in FIG. 14) containing the target configuration. The message including an indication of activated or deactivated SCG.

The method includes reconfiguring to a target SN with an activated or deactivated SCG.

The method includes transmitting reconfiguration complete message (referred to as an RRCReconfigurationComplete message in FIG. 14) to a target SN via the source MN in operations 1604 where the source MN transmits, in operation 1606, a SN ReconfigurationComplete message to the target SN.

Figure 17:
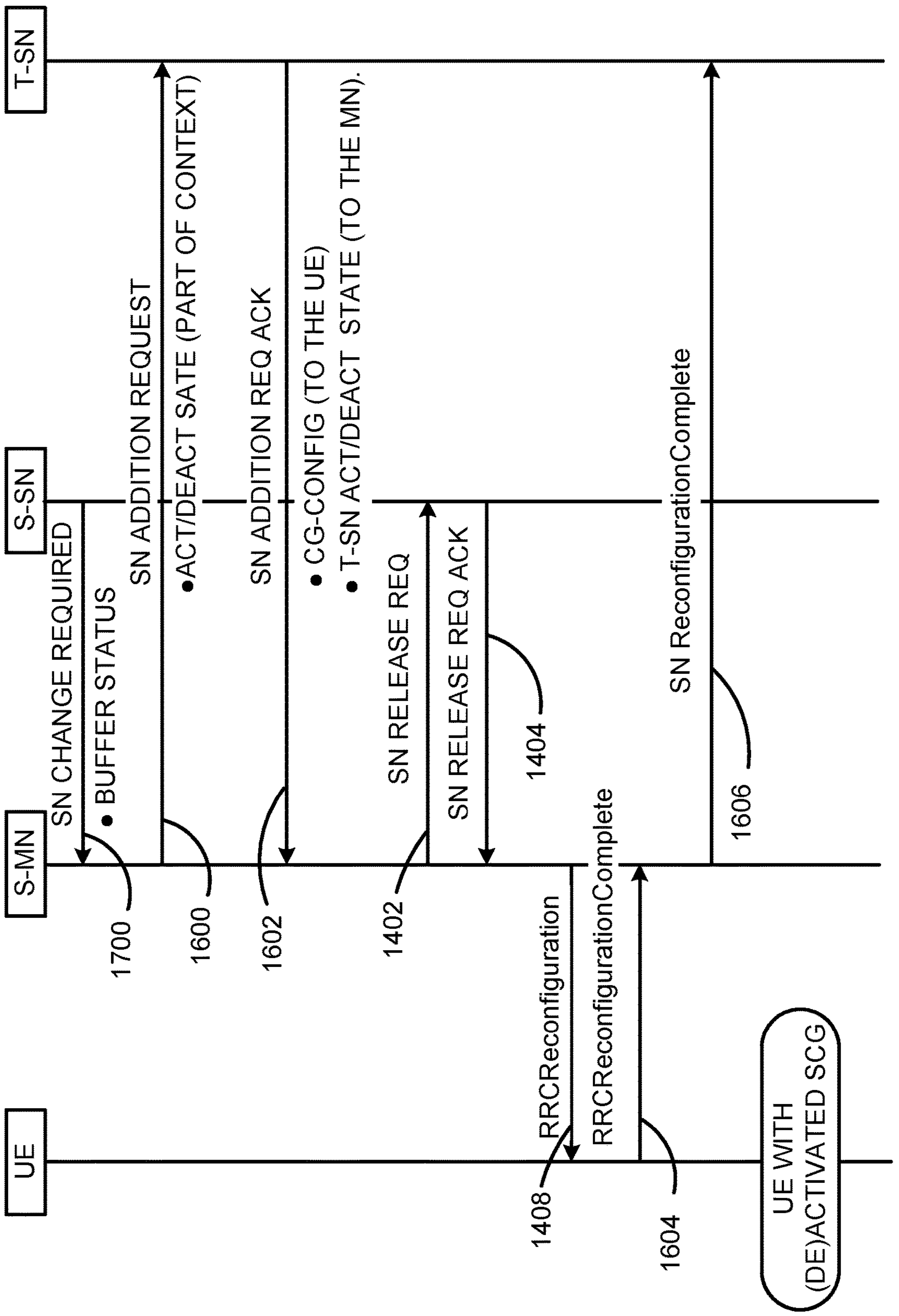

FIG. 17 illustrates SN initiated SN mobility with (de) activated SCG, where the target SN determines the SCG mode of operation. The operations in FIG. 17 that are common with the operations in FIG. 14 and FIG. 16 have been previously described and are labeled with reference numbers from FIG. 14 and FIG. 16.

The various embodiments include a method executed by a source Secondary Node (SN). The method includes determining that a change of SN is needed based on measurements received from the UE. The measurement reports may indicate that a cell in the PSCell's frequency has a better quality than the current PSCell e.g. in terms of Reference Signal Received Power (RSRP), Reference Signal Received Quality (RSRQ) and/or SINR. Other input may also be considered such as the load in the PSCell frequency and other frequencies e.g. mobility load balance.

The method includes transmitting, in operation 1700, a request, an S-NODE CHANGE REQUIRED, to an MN for change of SCG. The request may include an indication of activated or deactivated SCG. The request may include traffic information, e.g. of current SCG. The user plane traffic information can be at one of these: i) Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG). The user plane traffic information can be in different granularity such as at least one of the following:

- Per direction e.g. user plane traffic information for DL, user plane traffic information for UL;
- Per bearer.

The method includes receiving, in block 1402 a request for release from the MN.

The various embodiments include a method executed by a Master Node (MN). The method includes receiving, in operation 1700, a request for change of SCG, an S-NODE CHANGE REQUIRED, from a source Secondary Node (SN), for a UE with activated or deactivated SCG.

The method by the MN includes operations 1402-1404 and 1600-1606 as described above in FIGS. 14 and 16.

The various embodiments include a method executed by a target Secondary Node (SN). The method includes operations 1600, 1602, and 1606 as described above in FIG. 16.

The various embodiments include a method executed by a User Equipment (UE). The method includes operations described above in FIGS. 14 and 16.

SN initiated SN mobility with (de)activated SCG, MN decides the SCG mode of operation.

Another case is that the SN initiates the change of SCG, but the MN decides the SCG mode of operation of the target SCG. That case is similar to the case as described in FIG. 13, but with the S-NODE CHANGE REQUIRED message initiating the procedure.

MN initiated SN mobility with (de)activated SCG, target SN decides the SCG mode of operation Another case is that the MN initiates the change of SCG, but the target SN decides the SCG mode of operation of the target SCG. That case is similar to the case as described in FIG. 14, but with the SN setting the SCG mode of operation.

Mobility to target MN not supporting (de)activated SCG.

FIG. 18 illustrates mobility to a target MN not supporting (de)activated SCG. The operations in FIG. 18 that are common with the operations in FIG. 14 have been previously described and shall not be described again.

In this option, the target MN does not support activated/deactivated SCG.

MN Initiated Procedure

The various embodiments include a method executed by a source Master Node (MN). The method includes determining to perform a handover to a target MN based on measurements in the UE.

The method includes transmitting, in operation 1400, a request for handover, a HANDOVER REQUEST message for a UE with activated or deactivated SCG, to a target Master Node (MN). The message may contain an indication about whether the SCG is currently activated or deactivated. The message may contain information about the current traffic load, e.g. buffer status of the current MCG or buffer status of the current SCG or any combination of these. The information about SCG mode of operation may be included in the UE Context. The information may be included in the MN part of the UE context, in the SN part of the UE context or in both the MN and SN part of the UE context. The request may include which node initiated the deactivation.

The method includes receiving, in operation 1406 a response, a HANDOVER REQUEST ACKNOWLEDGE, from a target MN, containing a Handover Command, a reconfiguration message (e.g., an RRCReconfiguration message) containing reconfigurationWithSync, containing fullConfig, i.e. a complete UE configuration where the previous configuration is firstly deleted and then the new configuration added in the UE.

The method includes transmitting, in operation 1408 the Handover Command having the reconfiguration message (e.g., RRCReconfiguration message) containing the reconfigurationWithSync to the UE with the full target configuration for the UE for communicating with the target MN and/or target SN.

The method includes releasing the source SN (not shown).

The various embodiments includes a method executed by a target Master Node (MN). The method includes receiving, in operation 1400, a request for handover, a HANDOVER REQUEST, from a source Master Node (MN) for a UE with activated or deactivated SCG, but the target master node not being able to understand the fields of activated or deactivated SCG. In one option the indication is included in the MN part of the UE context. In another option the indication is included in the XnAP part of the HANDOVER REQUEST. In a further option, the indication is included in the SN part of the UE context.

The method includes triggering a full configuration.

The method includes transmitting, in operation 1800, a request, an S-NODE ADDITION REQUEST, to a target SN (may be the same as the source SN) for addition of an SCG to the target configuration. The request includes an indication of full configuration.

The method includes receiving, in operation 1802. a response, an S-NODE ADDITION REQUEST ACKNOWLEDGE, from a target SN containing a full configuration of the SCG and the RRC Config Indicator set to full config; OR receiving a response, an S-NODE ADDITION REQUEST REJECT, from a target SN where the addition of the SCG is rejected. The MN may initiate another addition request to the same or to a different SN.

The method includes transmitting, in operation 1406, a response, a HANDOVER REQUEST ACKNOWLEDGE, to a source MN containing a Handover Command, a reconfiguration message (e.g., an RRCReconfiguration message) containing reconfigurationWithSync, containing fullConfig, i.e., a complete UE configuration where the previous configuration is firstly deleted and then the new configuration added in the UE.

The various embodiments includes a method executed by a target Secondary Node (SN). The method includes receiving, in operation 1800, a request, an S-NODE ADDITION REQUEST, from an MN for addition of an SCG to the target configuration. The request including an indication of full configuration.

The method includes transmitting, in operation 1802, a response, an S-NODE ADDITION REQUEST ACKNOWLEDGE, to a target MN, containing a full configuration of the SCG; OR the method includes transmitting a response, an S-NODE ADDITION REQUEST REJECT, from a target SN where the addition of the SCG is rejected.

The various embodiments include a method executed by a User Equipment (UE). The method includes receiving in operation 1408, via a source MN, the Handover Command having a reconfiguration message (e.g., the RRCReconfiguration message) containing the reconfigurationWithSync containing fullConfig, i.e., a complete UE configuration where the previous configuration is firstly deleted and then the new configuration added in the UE.

The method includes reconfiguring to a target MN without activated or deactivated SCG.

The method includes transmitting, in operation 1410, a reconfiguration complete message (e.g., an RRCReconfigurationComplete message) to a target MN.

An example implementation of indicating request for full configuration in S-NODE ADDITION REQUEST may look like this:

9.1.2.1 S-Node Addition Request

This message is sent by the M-NG-RAN node to the S-NG-RAN node to request the preparation of resources for dual connectivity operation for a specific UE.

Direction: M-NG-RAN node→S-NG-RAN node.

| IE/ Group Name | Presence | Range | IE type and reference | Semantics description | Criticality | Assigned Criticality |
|---|---|---|---|---|---|---|
| RRC Config Indication | O | | 9.2.3.7 | | Yes | Reject |

RRC Config Indication

This IE indicates the type of RRC configuration used at the S-NG-RAN node or requested to be used at the S-NG-RAN node.

| IE/Group Name | Presence | Range | IE Type and Reference | Semantics Description |
|---|---|---|---|---|
| RRC Config Indication | M | | ENUMERATED (full config, delta config, . . . ) | |

Figure 19:
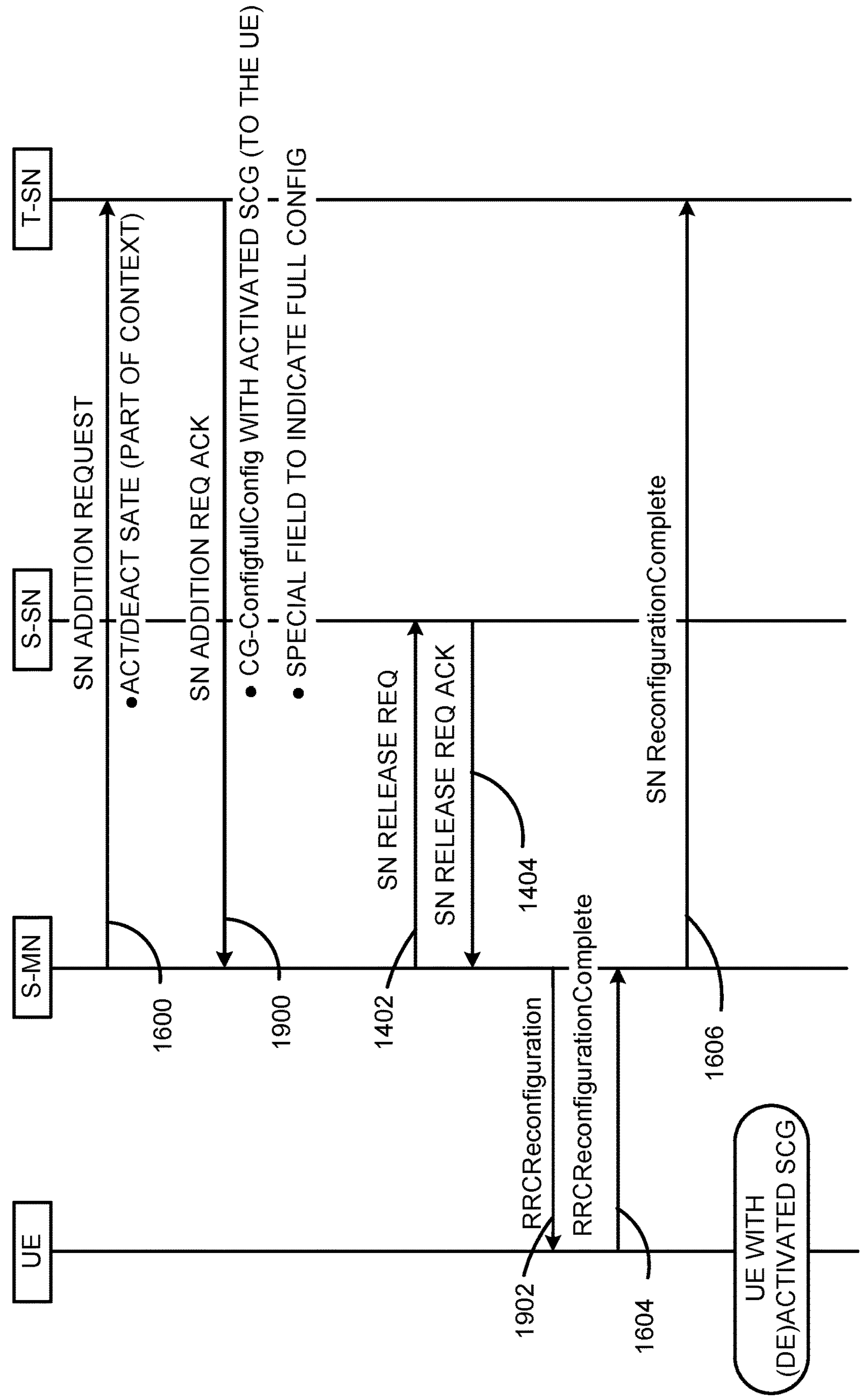

Mobility to target SN not supporting (de)activated SCG as shown in FIG. 19. The operations in FIG. 19 that are common with the operations in FIG. 16 have been previously described and shall not be described again In this option, the target SN does not support activated/deactivated SCG.

The various embodiments include a method executed by a Master Node (MN). The method includes deciding to initiate an S-NODE ADDITION procedure. The initiation may be based on measurements from the UE (in case of MN initiated SN change), by receiving an S-NODE CHANGE REQUIRED message from a source SN (in case of SN initiated SN change) or by receiving a HANDOVER REQUEST message (in case of handover).

The method includes determining whether the target SN should be activated or deactivated. The decision can be based on if it is activated or deactivated in the source SN (i.e. based on the current mode of operation of the UE's SCG at the source SN) and possibly based on additional information such as at least one of these: i) user plane traffic related information such as the Downlink (DL) buffer status and/or the Uplink (UL) buffer status (obtained from a Buffer Status Report—BSR reported by the UE), ii) the amount of data transmitted/received in the SCG in the last X time units (e.g. seconds or milliseconds), iii) the SCG's inactivity time (e.g. time duration for which there has been no data transmission on the SCG) Alternatively, requesting the SN to determine whether the target SN should be activated or deactivated.

The method includes transmitting a request, an S-NODE ADDITION REQUEST, to a target SN (may be the same as the source SN) for addition of an SCG to the target configuration. The request in some embodiments includes an indication of activated or deactivated SCG.

Further details on the request are described above in FIG. 16.

The method includes receiving, in operation 1900, a response, an S-NODE ADDITION REQUEST ACKNOWLEDGE, from a target SN where the addition of the SCG is accepted, but with no response to the requested SCG mode of operation accepted; OR the method includes receiving a response, an S-NODE ADDITION REQUEST ACKNOWLEDGE, with the RRC config indication set to full config via a special field to indicate full config an a CG-ConfigfullConfig with activated SCG for the UE; OR the method includes receiving a response, an S-NODE ADDITION REQUEST REJECT, from a target SN where the addition of the SCG is rejected.

The MN may initiate another addition request to the same or to a different SN; The indication of activated or deactivated SCG may in a following request be set to the same value of activated or deactivated as in the same request, or to a different value.

The method includes transmitting to the UE in operation 1408, the Handover Command having the reconfiguration message (e.g., the RRCReconfiguration message) containing the reconfigurationWithSync containing fullConfig, i.e. a complete UE configuration where the previous configuration is firstly deleted and then the new configuration added in the UE.

The method includes releasing the source SN in operation 1402.

The various embodiments includes a method executed by a target Secondary Node (SN). The method includes operation 1600 as described above in the description of FIG. 16.

The method in one embodiment includes transmitting, in operation 1900, a response, an S-NODE ADDITION REQUEST ACKNOWLEDGE, to a target MN where the addition of the SCG is accepted, but with no response to the requested SCG mode of operation.

In another embodiment, the method includes transmitting a response, an S-NODE ADDITION REQUEST ACKNOWLEDGE, with the configuration indication set to full config.

In another embodiment, the method includes transmitting a response, an S-NODE ADDITION REQUEST REJECT, from a target SN where the addition of the SCG is rejected.

The various embodiments include a method executed by a User Equipment (UE). The method includes receiving, in block 1902, via a source MN, the Handover Command having the reconfiguration message (e.g., the RRCReconfiguration message) containing the reconfigurationWithSync containing fullConfig, i.e. a complete UE configuration where the previous configuration is firstly deleted and then the new configuration added in the UE.

In another embodiment, the method includes receiving, in block 1902, via the source MN, the Handover Command including the reconfiguration message (e.g., the RRCReconfiguration message) containing the reconfigurationWithSync containing no indication of activated or deactivated SCG.

The method includes reconfiguring to a target MN without activated or deactivated SCG and transmitting, in block 1604, a reconfiguration complete message (e.g., an RRCReconfigurationComplete message) to a target MN.

Reference is now made to FIGS. 20-25, which are flow charts illustrating non-limiting operations according to various embodiments.

Figure 20:
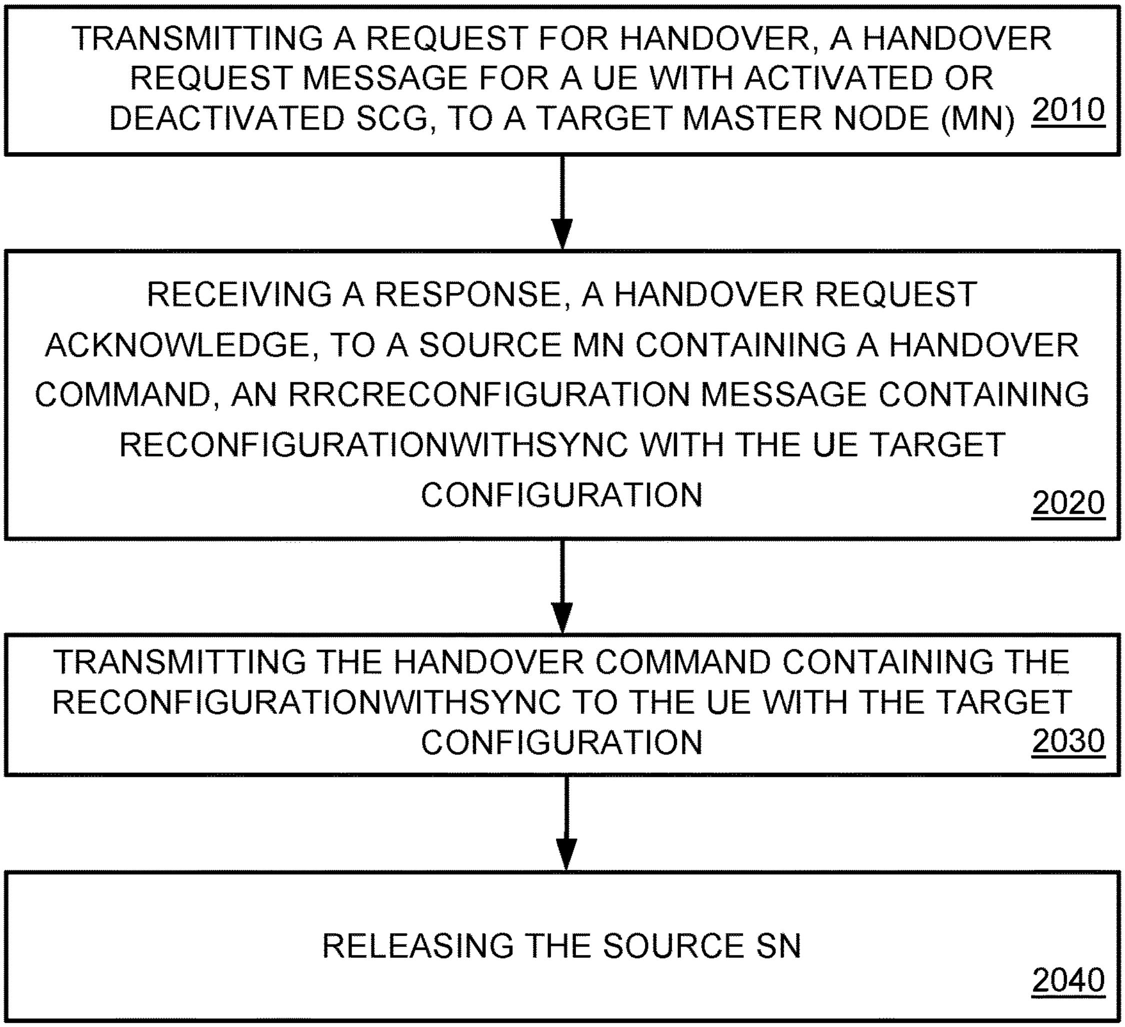
FIG. 20 is a flow chart illustrating operations of a master node according to some embodiments of inventive concepts.

For example, FIG. 20 illustrates operations of a master node according to some embodiments of inventive concepts. Operations performed by a source Master Node (MN) may include transmitting (2010) a request for handover, a HANDOVER REQUEST message for a UE with activated or deactivated SCG, to a target Master Node (MN), receiving (2020) a response, a HANDOVER REQUEST ACKNOWLEDGE, from the target MN containing a Handover Command, a reconfiguration message (referred to as an RRCReconfiguration message in FIG. 20) containing reconfigurationWithSync with the UE target configuration, transmitting (2030) the Handover Command containing the reconfigurationWithSync to the UE with the target configuration and releasing (2040) the source SN.

Figure 21:
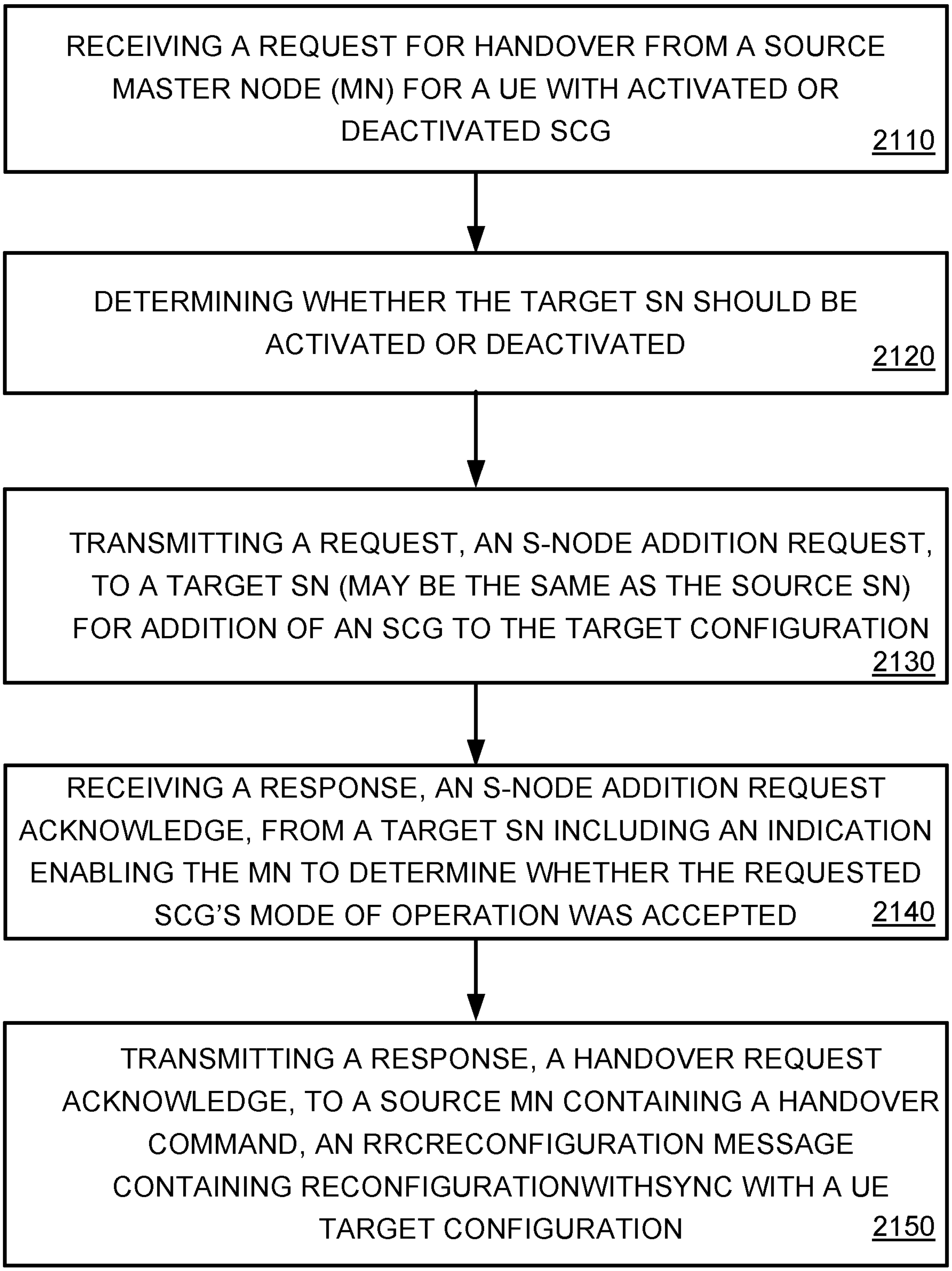
FIG. 21 is a flow chart illustrating operations of a secondary node according to some embodiments of inventive concepts.

FIG. 21 is a flow chart illustrating operations of a secondary node according to some embodiments of inventive concepts. Operations performed by a target Master Node (MN) include receiving (2110) a request for handover from a source Master Node (MN) for a UE with activated or deactivated SCG, determining (2120) whether the target SN should be activated or deactivated, transmitting (2130) a request, an S-NODE ADDITION REQUEST, to a target SN for addition of an SCG to the target configuration, receiving (2140) a response, an S-NODE ADDITION REQUEST ACKNOWLEDGE, from a target SN including an indication enabling the MN to determine whether the requested SCG's mode of operation was accepted and transmitting (2150) a response, a HANDOVER REQUEST ACKNOWLEDGE, to a source MN containing a Handover Command, a reconfiguration message (referred to as an RRCReconfiguration message in FIG. 21) containing reconfiguration-WithSync with the UE target configuration.

Figure 22:
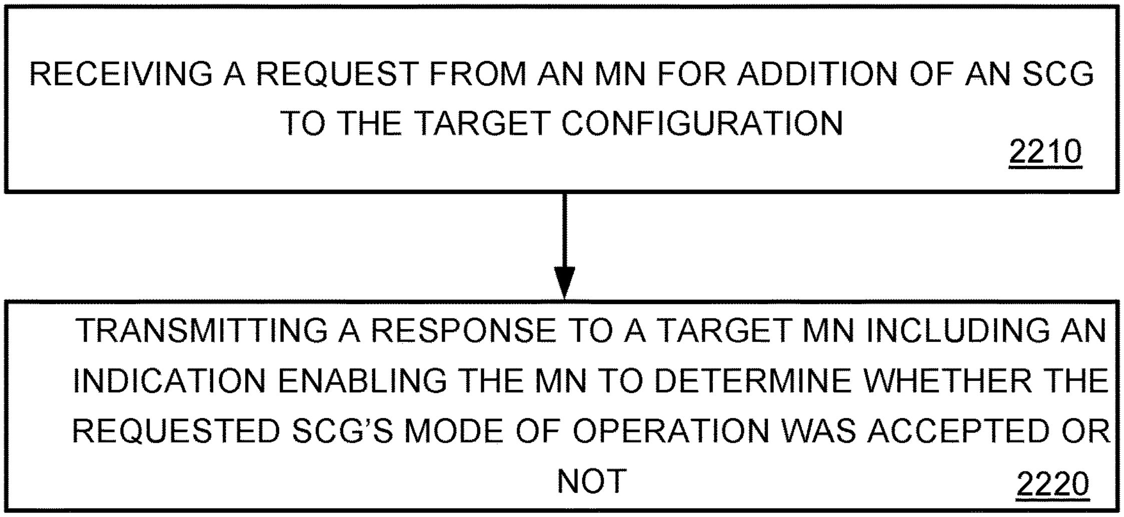
FIG. 22 is a flow chart illustrating operations of a user equipment according to some embodiments of inventive concepts.

FIG. 22 is a flow chart illustrating operations of a user equipment according to some embodiments of inventive concepts. Operations performed by a target Secondary Node (SN), include receiving (2210) a request from an MN for addition of an SCG to the target configuration and transmitting (2220) a response to a target MN including an indication enabling the MN to determine whether the requested SCG's mode of operation was accepted or not.

Figure 23:
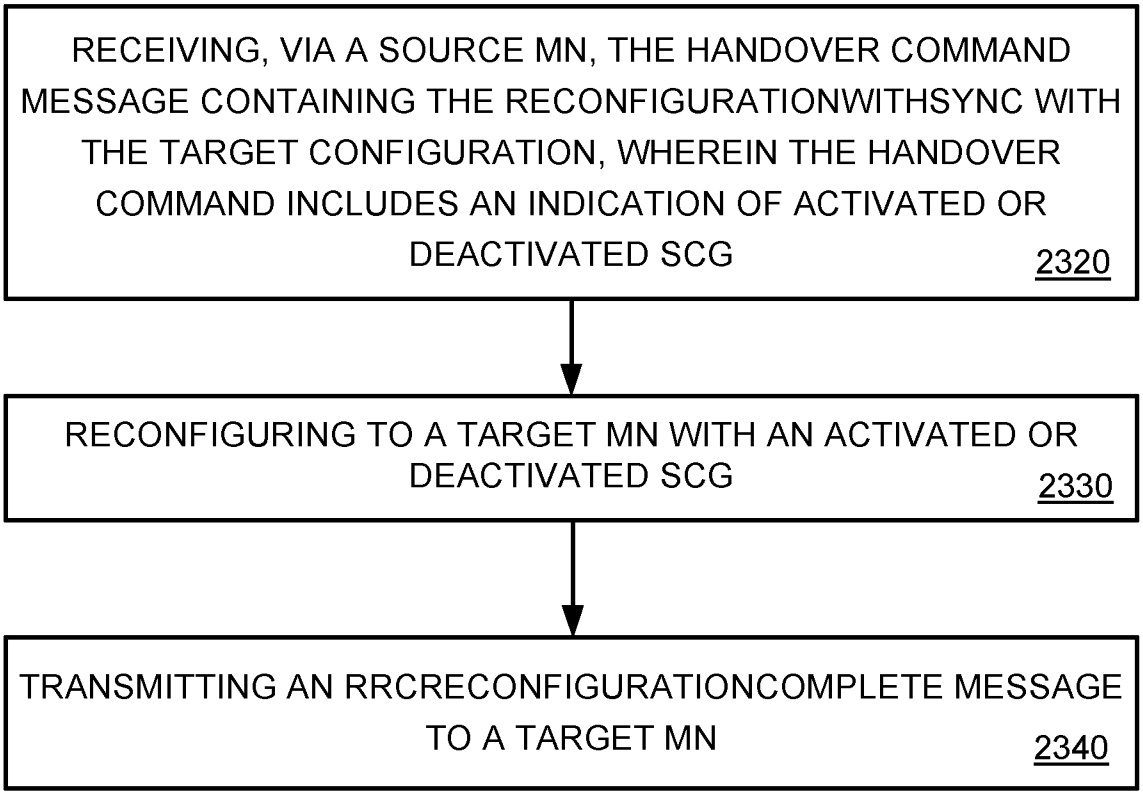
FIG. 23 is a flow chart illustrating operations of a master node according to some embodiments of inventive concepts.

FIG. 23 is a flow chart illustrating operations of a master node according to some embodiments of inventive concepts. Operations performed by a User Equipment (UE) include receiving (2320), via a source MN, the Handover Command message containing the reconfigurationWithSync with the target configuration, wherein the Handover Command includes an indication of activated or deactivated SCG, reconfiguring (2330), to a target MN, with an activated or deactivated SCG and transmitting (2340) a reconfiguration complete message (e.g., an RRCReconfigurationComplete message) to a target MN.

Figure 24:
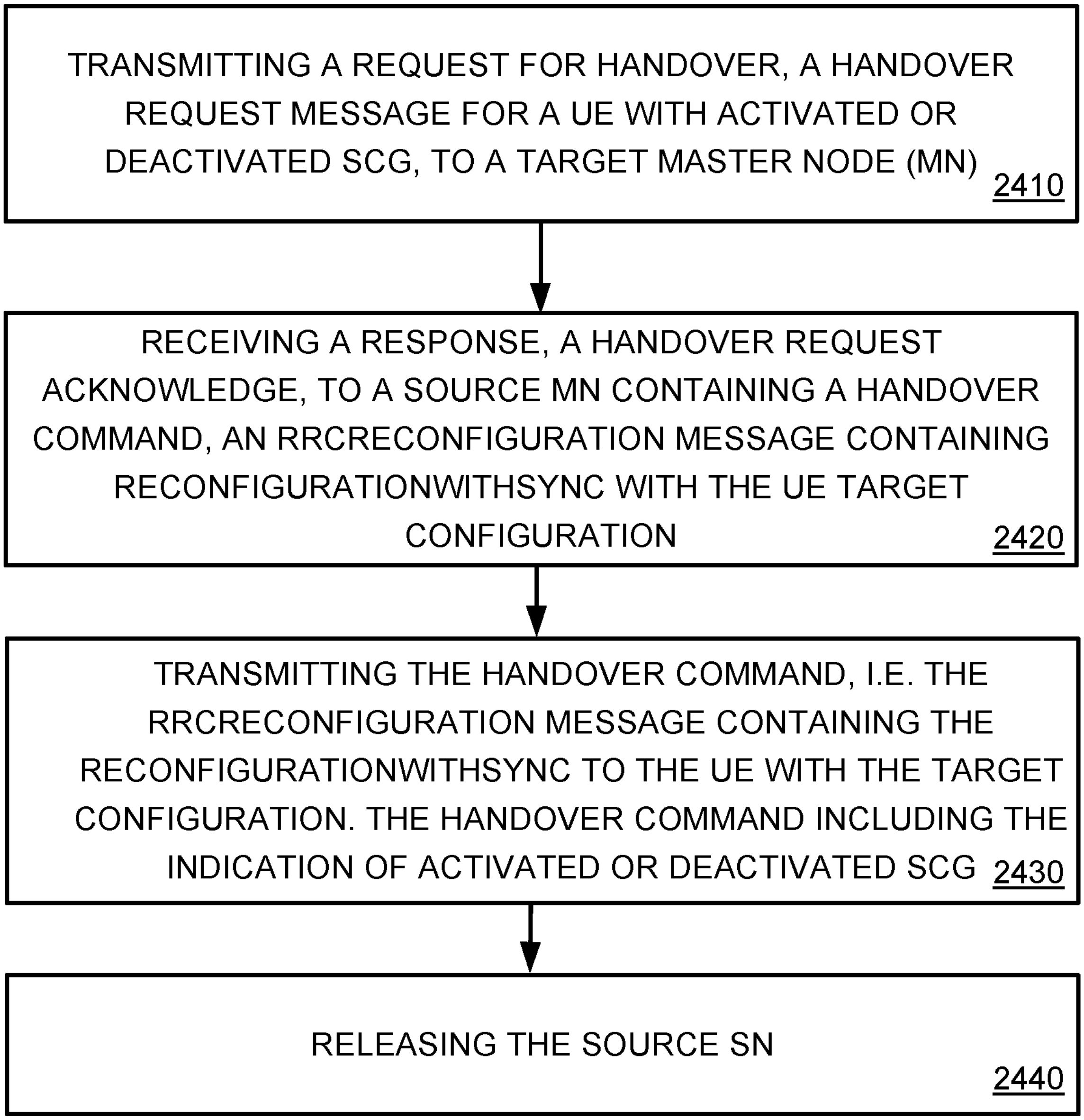
FIG. 24 is a flow chart illustrating operations of a secondary node according to some embodiments of inventive concepts.

FIG. 24 is a flow chart illustrating operations of a secondary node according to some embodiments of inventive concepts. Operations performed by a source Master Node (MN) include transmitting (2410) a request for handover, a HANDOVER REQUEST message for a UE with activated or deactivated SCG, to a target Master Node (MN), receiving (2420) a response, a HANDOVER REQUEST ACKNOWLEDGE, to a source MN containing a Handover Command, a reconfiguration message (e.g., an RRCReconfiguration message) containing reconfigurationWithSync with the UE target configuration, transmitting (2430) the Handover Command, e.g., the reconfiguration message containing the reconfigurationWithSync to the UE with the target configuration, the Handover Command including the indication of activated or deactivated SCG and releasing (2440) the source SN.

Figure 25:
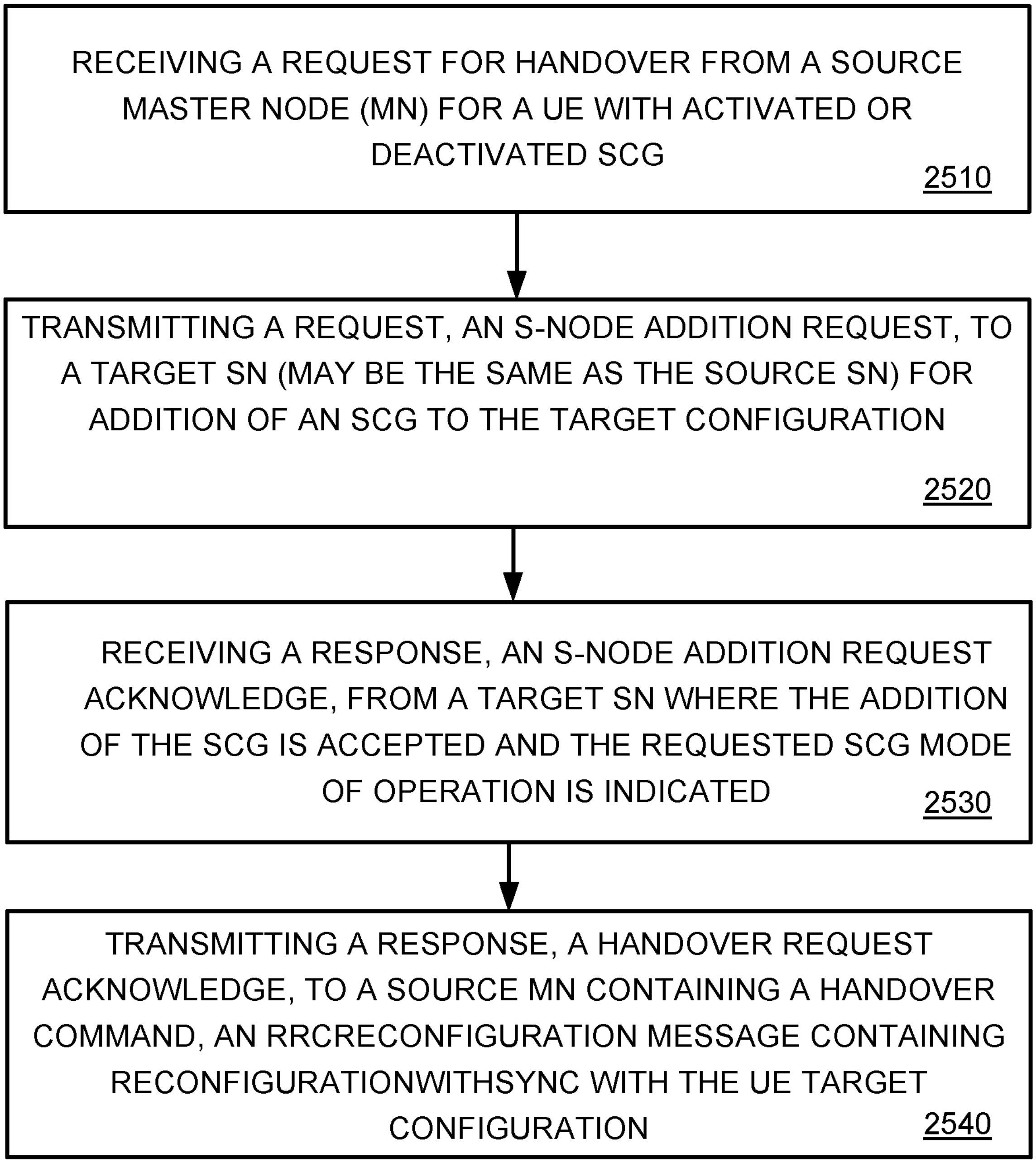
FIG. 25 is a flow chart illustrating operations of a user equipment according to some embodiments of inventive concepts.

FIG. 25 is a flow chart illustrating operations of a user equipment according to some embodiments of inventive concepts. Operations performed by a target Master Node (MN) include receiving (2510) a request for handover from a source Master Node (MN) for a UE with activated or deactivated SCG, transmitting (2520) a request, an S-NODE ADDITION REQUEST, to a target SN (may be the same as the source SN) for addition of an SCG to the target configuration, receiving (2530) a response, an S-NODE ADDITION REQUEST ACKNOWLEDGE, from a target SN where the addition of the SCG is accepted and the requested SCG mode of operation is indicated and transmitting (2540) a response, a HANDOVER REQUEST ACKNOWLEDGE, to a source MN containing a Handover Command, a reconfiguration message (e.g., an RRCReconfiguration message) containing reconfigurationWithSync with the UE target configuration.

Example embodiments are discussed below.

Embodiment 1. A method performed by a source Master Node (MN), comprising:

- transmitting a request for handover, a HANDOVER REQUEST message for a UE with activated or deactivated SCG, to a target Master Node (MN);
- receiving a response, a HANDOVER REQUEST ACKNOWLEDGE, to a source MN containing a Handover Command, an RRCReconfiguration message containing reconfigurationWithSync with the UE target configuration;
- transmitting the Handover Command containing the reconfigurationWithSync to the UE with the target configuration; and
- releasing the source SN.

Embodiment 2. The method of embodiment 1, wherein the Handover Command includes an indication of activated or deactivated SCG.

Embodiment 3. The method of any of embodiments 1-2, wherein the message contains an indication about whether the SCG is currently activated or deactivated.

Embodiment 4. The method of any of embodiments 1-3, wherein the message contains information about a current traffic load.

Embodiment 5. The method of any of embodiments 1-4, wherein the information about SCG mode of operation is included in a UE Context, wherein the information about the SCG mode of operation is included in an MN part of the UE context, in a SN part of the UE context or in both the MN and SN part of the UE context.

Embodiment 6. The method of any of embodiments 1-5, wherein the Handover Command includes an indication of activated or deactivated SCG, wherein the indication is included in the MN part of the RRCReconfiguration message, and wherein the indication may be included in the SN part of the RRCReconfiguration message, e.g. CellGroupConfig associated to the SCG.

Embodiment 7. The method of any of embodiments 1-6, wherein the indication is included in an XnAP message HANDOVER REQUEST ACKNOWLEDGE message.

Embodiment 8. A method performed by a target Master Node (MN), comprising:

- receiving a request for handover from a source Master Node (MN) for a UE with activated or deactivated SCG;
- determining whether the target SN should be activated or deactivated;
- transmitting a request, an S-NODE ADDITION REQUEST, to a target SN for addition of an SCG to the target configuration;
- receiving a response, an S-NODE ADDITION REQUEST ACKNOWLEDGE, from a target SN including an indication enabling the MN to determine whether the requested SCG's mode of operation was accepted; and
- transmitting a response, a HANDOVER REQUEST ACKNOWLEDGE, to a source MN containing a Handover Command, an RRCReconfiguration message containing reconfigurationWithSync with the UE target configuration.

Embodiment 9. The method of embodiment 8, wherein determining whether the target SN should be activated or deactivated is based on whether the target SN is activated or deactivated in the source SN.

Embodiment 10. The method of any of embodiments 8-9, wherein determining whether the target SN should be activated or deactivated is based on one of user plane traffic related information including a Downlink (DL) buffer status and/or an Uplink (UL) buffer status, the amount of data transmitted/received in the SCG in the last X time units (e.g. seconds or milliseconds), and the SCG's inactivity time for which there has been no data transmission on the SCG).

Embodiment 11. The method of any of embodiments 8-10, wherein the MN decides to have an activated SCG if at least the amount of user plane traffic is above a threshold based on the criterion being fulfilled for at least one direction to fulfill the criterion, based on both DL and UL fulfilling the criterion.

Embodiment 12. The method of any of embodiments 8-11, wherein the amount of user plane traffic compared to the threshold is averaged over time for amount of traffic within a period of time is compared to the threshold, wherein the SCG is de-activated and the MN decides to activate the SCG if the user plane traffic data increases, and wherein the SCG activated stays activated.

Embodiment 13. The method of any of embodiments 8-12, wherein the MN decides to have a deactivated SCG in the target SN if the amount of user plane traffic is below a threshold.

Embodiment 14. The method of any of embodiments 8-13, wherein the request includes an indication of the mode of operation determined by the MN for the SCG based on whether it is an activated or deactivated SCG, wherein the indication includes an Information Element (IE) within the message over the interface between MN and SN indicating the determined mode of operation, and wherein the indicating enables the target SN to determine the SCG's mode of operation requested by the MN to indicate that the MN wants the SCG to be deactivated, or absence of the IE to indicate that the MN wants the SCG to be activated.

Embodiment 15. The method of any of embodiments 8-14, wherein the request including traffic information of current SCG, wherein user plane traffic information includes downlink (DL) buffer status and/or the uplink (UL) buffer status, an amount of data transmitted/received in the SCG in the last X time units, or SCG's inactivity time, and wherein user plane traffic information comprises different granularity corresponding to per direction plane traffic information for DL, user plane traffic information for UL, and per bearer.

Embodiment 16. The method of any of embodiments 8-15, further comprising receiving a response from a target SN where the addition of the SCG is accepted, but the requested SCG mode of operation is rejected.

Embodiment 17. The method of any of embodiments 8-16, further comprising receiving a response from a target SN where the addition of the SCG is rejected.

Embodiment 18. A method performed by a target Secondary Node (SN), comprising:

receiving a request from an MN for addition of an SCG to the target configuration; and transmitting a response to a target MN including an indication enabling the MN to determine whether the requested SCG's mode of operation was accepted or not.

Embodiment 19. The method of embodiment 18, wherein the request includes an indication of the mode of operation determined by the MN for the SCG based on whether the SCG is activated or deactivated.

Embodiment 20. The method of any of embodiments 18-19, wherein the indication can be an information indicating enabling the target SN to determine the SCG's mode of operation requested by the MN to indicate that the MN wants the SCG to be deactivated, or absence of the IE to indicate that the MN wants the SCG to be activated.

Embodiment 21. The method of any of embodiments 18-20, wherein the request includes traffic information of current SCG.

Embodiment 22. The method of any of embodiments 18-21, further comprising transmitting a response to the MN where the addition of the SCG is accepted and the requested SCG mode of operation accepted.

Embodiment 23. The method of any of embodiments 18-22, further comprising transmitting a response to the MN where the addition of the SCG is accepted, but the requested SCG mode of operation is rejected.

Embodiment 24. The method of any of embodiments 18-23, further comprising transmitting a response, an S-NODE ADDITION REQUEST REJECT, from a target SN where the addition of the SCG is rejected.

Embodiment 25. The method of any of embodiments 18-24, wherein the target SN determines the acceptance of the mode of operation of the SCG based on the information the MN has included in the S-NODE ADDITION REQUEST.

Embodiment 26. The method of any of embodiments 18-25, wherein the SN decides to have an activated SCG if a least an amount of user plane traffic is above a threshold.

Embodiment 27. The method of any of embodiments 18-26, wherein the SN decides to have a deactivated SCG in the target SN if an amount of user plane traffic is below a threshold.

Embodiment 28. A method performed by a User Equipment (UE), comprising:

receiving, via a source MN, the Handover Command message containing the reconfigurationWithSync with the target configuration, wherein the Handover Command includes an indication of activated or deactivated SCG;

reconfiguring to a target MN with an activated or deactivated SCG; and transmitting an RRCReconfigurationComplete message to a target MN.

Embodiment 29. A method performed by a source Master Node (MN), comprising:

transmitting a request for handover, a HANDOVER REQUEST message for a UE with activated or deactivated SCG, to a target Master Node (MN);

receiving a response, a HANDOVER REQUEST ACKNOWLEDGE, to a source MN containing a Handover Command, an RRCReconfiguration message containing reconfigurationWithSync with the UE target configuration;

transmitting the Handover Command, i.e. the RRCReconfiguration message containing the reconfigurationWithSync to the UE with the target configuration, the Handover Command including the indication of activated or deactivated SCG; and releasing the source SN.

Embodiment 30. A method performed by a target Master Node (MN), comprising:

receiving a request for handover from a source Master Node (MN) for a UE with activated or deactivated SCG;

transmitting a request, an S-NODE ADDITION REQUEST, to a target SN (may be the same as the source SN) for addition of an SCG to the target configuration;

receiving a response, an S-NODE ADDITION REQUEST ACKNOWLEDGE, from a target SN where the addition of the SCG is accepted and the requested SCG mode of operation is indicated; and transmitting a response, a HANDOVER REQUEST ACKNOWLEDGE, to a source MN containing a Handover Command, an RRCReconfiguration message containing reconfigurationWithSync with the UE target configuration.

Embodiment 31. A method performed by a target Secondary Node (SN), comprising:

receiving a request, an S-NODE ADDITION REQUEST, from an MN for addition of an SCG to the target configuration, the request including an indication of activated or deactivated SCG;

transmitting a response, an S-NODE ADDITION REQUEST ACKNOWLEDGE, to a target MN where the addition of the SCG is accepted and the SCG mode of operation indicated; and transmitting a response, an S-NODE ADDITION REQUEST REJECT, from a target SN where the addition of the SCG is rejected.

Embodiment 32. A method performed by a target User Equipment (UE), comprising:

receiving, via a source MN, the Handover Command, i.e. the RRCReconfiguration message containing the reconfigurationWithSync with the target configuration, the Handover Command including an indication of activated or deactivated SCG;

reconfiguring to a target MN with an activated or deactivated SCG; and transmitting an RRCReconfigurationComplete message to a target MN.

Embodiment 33. A method performed by Master Node (MN), comprising:

determining that a change of SN is needed, for example, based on measurements received from the UE;

determining whether the target SN should be activated or deactivated based on if it is activated or deactivated in the source SN;

transmitting an S-NODE ADDITION REQUEST, to a target SN for addition of an SCG to the target configuration, the request including an indication of the mode of operation determined by the MN for the SCG;

receiving a response from a target SN including an indication enabling the MN to determine whether the requested SCG's mode of operation was accepted or not;

receiving a response from a target SN where the addition of the SCG is rejected;

transmitting to the UE, an RRCReconfiguration message for the SN addition; and releasing the source SN.

Embodiment 34. A method performed by target Secondary Node (SN), comprising:

receiving a request from an MN for addition of an SCG to the target configuration; and transmitting a response to a target MN including an indication enabling the MN to determine whether the requested SCG's mode of operation was accepted or not.

Embodiment 35. A method performed by a User Equipment (LIE), the method comprising:

receiving an RRCReconfiguration message containing the target configuration;

reconfiguring to a target SN with an activated or deactivated SCG; and transmitting an RRCReconfigurationComplete message to a target SN.

Embodiment 36. A method performed by source Secondary Node (SN), comprising:

determining that a change of SN is needed based on measurements received from the UE;

transmitting a message to an MN for change of SCG; and receiving a request for release from the MN.

Embodiment 37. A method performed by Master Node (MN), comprising:

receiving a request for change of SCG from a source Secondary Node (SN), for a UE with activated or deactivated SCG;

transmitting a request, an S-NODE ADDITION REQUEST, to a target SN for addition of an SCG to the target configuration;

receiving a response from a target SN where the addition of the SCG is accepted and the requested SCG mode of operation is indicated;

transmitting an RRCReconfiguration message for the SN addition; and releasing the source SN.

Embodiment 38. A method performed by target Secondary Node (SN), comprising:

receiving a request from an MN for addition of an SCG to the target configuration; and transmitting a response to a target MN where the addition of the SCG is accepted and the SCG mode of operation indicated.

Embodiment 39. A method performed by a User Equipment (LIE), the method comprising:

receiving an RRCReconfiguration message containing the target configuration, the message including an indication of activated or deactivated SCG;

reconfiguring to a target SN with an activated or deactivated SCG; and transmitting an RRCReconfigurationComplete message to the target SN.

Embodiment 40. A method performed by a source Master Node (MN), comprising:

determining to perform a handover to a target MN based on measurements in the UE; transmitting a request for handover, a HANDOVER REQUEST message for a LIE with activated or deactivated SCG, to a target Master Node (MN);

receiving a response, a HANDOVER REQUEST ACKNOWLEDGE, from a target MN, containing a Handover Command, an RRCReconfiguration message containing reconfigurationWithSync, containing fullConfig; and transmitting the Handover Command to the UE with the full target configuration; and releasing the source SN.

Embodiment 41. A method performed by a target Master Node (MN), comprising;

receiving a request for handover, a HANDOVER REQUEST, from a source Master Node (MN) for a UE with activated or deactivated SCG, not being able to understand the fields of activated or deactivated SCG;

triggering a full configuration;

transmitting a request to a target SN for addition of an SCG to the target configuration;

receiving a response from a target SN containing a full configuration of the SCG and the RRC Config Indicator set to full config OR receiving a response from a target SN where the addition of the SCG is rejected; and transmitting a response to a source MN containing a Handover Command, an RRCReconfiguration message containing reconfigurationWithSync, containing fullConfig.

Embodiment 42. A method performed by a target Secondary Node (MN), comprising;

receiving a request from an MN for addition of an SCG to the target configuration; and transmitting a response to a target MN, containing a full configuration of the SCG; or transmitting a response from a target SN where the addition of the SCG is rejected.

Embodiment 43. A method performed by a User Equipment (UE), comprising:

receiving, via a source MN a Handover Command;

reconfiguring to a target MN without activated or deactivated SCG; and transmitting an RRCReconfigurationComplete message to a target MN.

Embodiment 44. A method performed by a Master Node (MN), comprising:

deciding to initiate an S-NODE ADDITION procedure, the initiation being based on measurements from the UE, by receiving an S-NODE CHANGE REQUIRED message from a source SN or by receiving a HANDOVER REQUEST message;

determining whether the target SN should be activated or deactivated based on if it is activated or deactivated in the source SN, user plane traffic related information such as the Downlink (DL) buffer status and/or the Uplink (UL) buffer status, the amount of data transmitted/received in the SCG in the last X time units, and/or the SCG's inactivity time; and transmitting a request to a target SN for addition of an SCG to the target configuration;

receiving a response from a target SN where the addition of the SCG is accepted and no response to the requested SCG mode of operation accepted;

transmitting to the UE, the Handover Command message containing the reconfigurationWithSync containing fullConfig; and releasing the source SN.

Embodiment 45. A method performed by a target Secondary Node (SN), comprising:

receiving a request from an MN for addition of an SCG to the target configuration;

transmitting a response to a target MN where the addition of the SCG is accepted, but with no response to the requested SCG mode of operation.

Embodiment 46. A method performed by a User Equipment (UE), comprising:

receiving, via a source MN, the Handover Command containing the reconfigurationWithSync containing fullConfig, where the previous configuration is firstly deleted and then the new configuration added in the UE or receiving, via a source MN, the Handover Command, containing the reconfigurationWithSync containing no indication of activated or deactivated SCG;

reconfiguring to a target MN without activated or deactivated SCG; and transmitting an RRCReconfigurationComplete message to a target MN.

Embodiment 47. A master node comprising:

processing circuitry; and memory coupled with the processing circuitry, wherein the memory includes instructions that when executed by the processing circuitry causes the IN to perform operations according to any of Embodiments 1-17, 29, 30, 33, 37, 40, 41, and 44.

Embodiment 48. A master node adapted to perform according to any of Embodiments 1-17, 29, 30, 33, 37, 40, 41, and 44.

Embodiment 49. A computer program comprising program code to be executed by processing circuitry of a master node, MN, whereby execution of the program code causes the MN to perform operations according to any of embodiments 1-17, 29, 30, 33, 37, 40, 41, and 44.

Embodiment 50. A computer program product comprising a non-transitory storage medium including program code to be executed by processing circuitry of a master node, whereby execution of the program code causes the master node to perform operations according to any of embodiments 1-17, 29, 30, 33, 37, 40, 41, and 44.

Embodiment 51. A secondary node SN, comprising:

processing circuitry; and memory coupled with the processing circuitry, wherein the memory includes instructions that when executed by the processing circuitry causes the SN to perform operations according to any of Embodiments 18-27, 31, 34, 36, 38, 42, and 45.

Embodiment 52. A secondary node adapted to perform according to any of Embodiments 18-27, 31, 34, 36, 38, 42, and 45.

Embodiment 53. A computer program comprising program code to be executed by processing circuitry of a secondary node, SN, whereby execution of the program code causes the SN to perform operations according to any of embodiments 18-27, 31, 34, 36, 38, 42, and 45.

Embodiment 54. A computer program product comprising a non-transitory storage medium including program code to be executed by processing circuitry of a secondary node, whereby execution of the program code causes the SN to perform operations according to any of embodiments 18-27, 31, 34, 36, 38, 42, and 45.

Embodiment 55. A user equipment, UE, comprising:

processing circuitry; and memory coupled with the processing circuitry, wherein the memory includes instructions that when executed by the processing circuitry causes the UE to perform operations according to any of Embodiments 28, 32, 35, 39, 43, and 46.

Embodiment 56. A user equipment, UE, adapted to perform according to any of Embodiments 28, 32, 35, 39, 43, and 46.

Embodiment 57. A computer program comprising program code to be executed by processing circuitry of a user equipment, UE, whereby execution of the program code causes the UE to perform operations according to any of embodiments 28, 32, 35, 39, 43, and 46.

Embodiment 58. A computer program product comprising a non-transitory storage medium including program code to be executed by processing circuitry of a user equipment, UE, whereby execution of the program code causes the UE to perform operations according to any of embodiments 28, 32, 35, 39, 43, and 46.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 26:
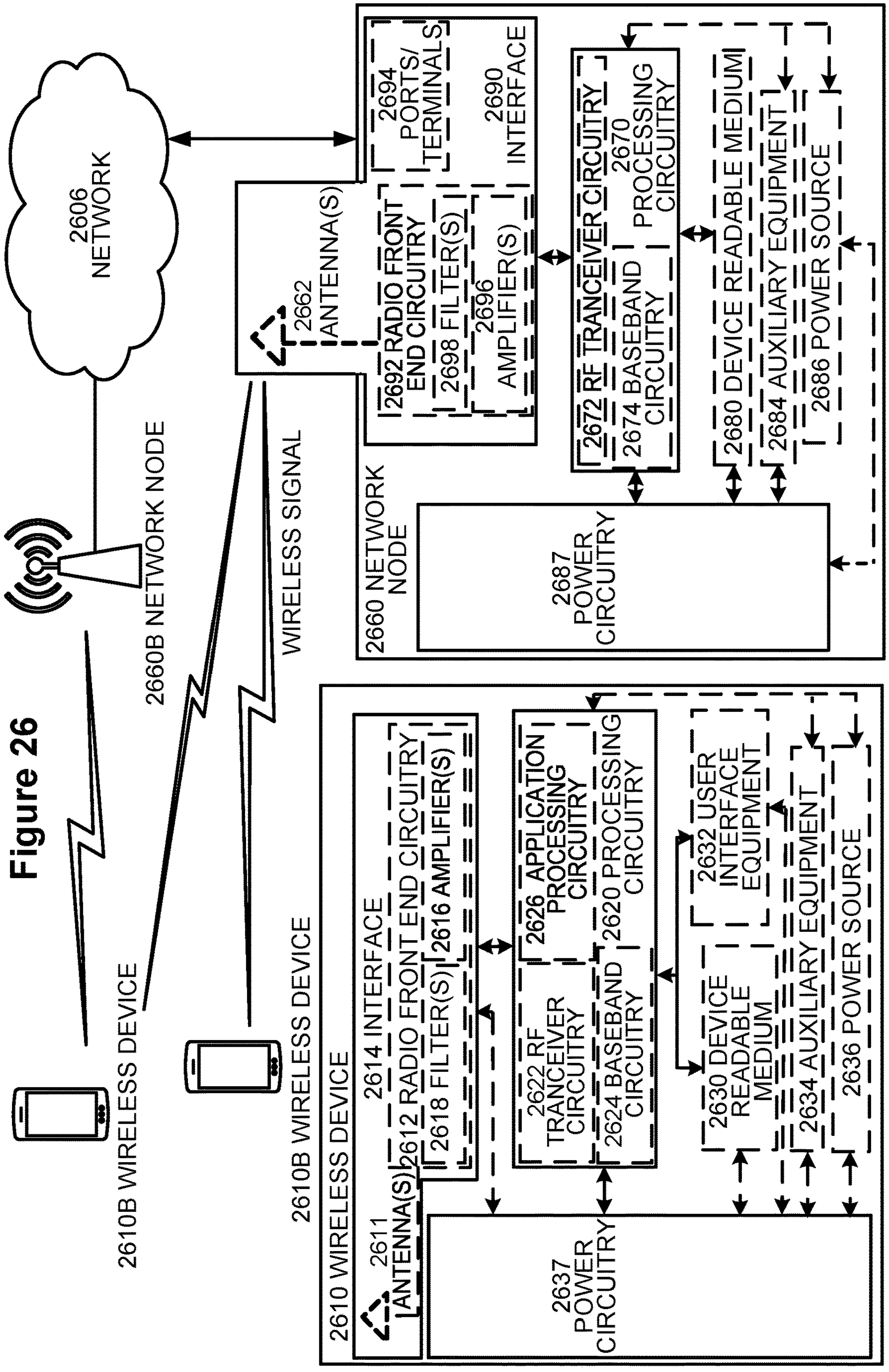
FIG. 26 is a block diagram of a wireless network in accordance with some embodiments.

FIG. 26 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 26. For simplicity, the wireless network of FIG. 26 only depicts network 2606, network nodes 2660 and 2660*b*, and WDs 2610A, 2610B, and 2610C (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2660 and wireless device (WD) 2610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2660 and WD 2610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobility management entities (MMEs)), operation and maintenance (O&M) nodes, operations support system (OSS) nodes, self optimized network (SON) nodes, positioning nodes (e.g., Evolved-Serving Mobile Location Centers E-SMLCs), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 26, network node 2660 includes processing circuitry 2670, device readable medium 2680, interface 2690, auxiliary equipment 2684, power source 2686, power circuitry 2687, and antenna 2662. Although network node 2660 illustrated in the example wireless network of FIG. 26 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 2660 are depicted as single boxes located within a larger box, or nested within multiple boxes, in practice, a network node may comprise multiple different physical components that make up a single illustrated component (e.g., device readable medium 2680 may comprise multiple separate hard drives as well as multiple RAM modules).

Similarly, network node 2660 may be composed of multiple physically separate components (e.g., a NodeB component and a RNC component, or a BTS component and a BSC component, etc.), which may each have their own respective components. In certain scenarios in which network node 2660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2660 may be configured to support multiple radio access technologies (RATs). In such embodiments, some components may be duplicated (e.g., separate device readable medium 2680 for the different RATs) and some components may be reused (e.g., the same antenna 2662 may be shared by the RATs). Network node 2660 may also include multiple sets of the various illustrated components for different wireless technologies integrated into network node 2660, such as, for example, GSM, WCDMA, LTE, NR, WiFi, or Bluetooth wireless technologies. These wireless technologies may be integrated into the same or different chip or set of chips and other components within network node 2660.

Processing circuitry 2670 is configured to perform any determining, calculating, or similar operations (e.g., certain obtaining operations) described herein as being provided by a network node. These operations performed by processing circuitry 2670 may include processing information obtained by processing circuitry 2670 by, for example, converting the obtained information into other information, comparing the obtained information or converted information to information stored in the network node, and/or performing one or more operations based on the obtained information or converted information, and as a result of said processing making a determination.

Processing circuitry 2670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2660 components, such as device readable medium 2680, network node 2660 functionality. For example, processing circuitry 2670 may execute instructions stored in device readable medium 2680 or in memory within processing circuitry 2670. Such functionality may include providing any of the various wireless features, functions, or benefits discussed herein. In some embodiments, processing circuitry 2670 may include a system on a chip (SOC).

In some embodiments, processing circuitry 2670 may include one or more of radio frequency (RF) transceiver circuitry 2672 and baseband processing circuitry 2674. In some embodiments, radio frequency (RF) transceiver circuitry 2672 and baseband processing circuitry 2674 may be on separate chips (or sets of chips), boards, or units, such as radio units and digital units. In alternative embodiments, part or all of RF transceiver circuitry 2672 and baseband processing circuitry 2674 may be on the same chip or set of chips, boards, or units In certain embodiments, some or all of the functionality described herein as being provided by a network node, base station, eNB or other such network device may be performed by processing circuitry 2670 executing instructions stored on device readable medium 2680 or memory within processing circuitry 2670. In alternative embodiments, some or all of the functionality may be provided by processing circuitry 2670 without executing instructions stored on a separate or discrete device readable medium, such as in a hard-wired manner. In any of those embodiments, whether executing instructions stored on a device readable storage medium or not, processing circuitry 2670 can be configured to perform the described functionality. The benefits provided by such functionality are not limited to processing circuitry 2670 alone or to other components of network node 2660, but are enjoyed by network node 2660 as a whole, and/or by end users and the wireless network generally.

Device readable medium 2680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2670. Device readable medium 2680 may store any suitable instructions, data or information, including a computer program, software, an application including one or more of logic, rules, code, tables, etc. and/or other instructions capable of being executed by processing circuitry 2670 and, utilized by network node 2660. Device readable medium 2680 may be used to store any calculations made by processing circuitry 2670 and/or any data received via interface 2690. In some embodiments, processing circuitry 2670 and device readable medium 2680 may be considered to be integrated.

Interface 2690 is used in the wired or wireless communication of signalling and/or data between network node 2660, network 2606, and/or WDs 2610. As illustrated, interface 2690 comprises port(s)/terminal(s) 2694 to send and receive data, for example to and from network 2606 over a wired connection. Interface 2690 also includes radio front end circuitry 2692 that may be coupled to, or in certain embodiments a part of, antenna 2662. Radio front end circuitry 2692 comprises filters 2698 and amplifiers 2696. Radio front end circuitry 2692 may be connected to antenna 2662 and processing circuitry 2670. Radio front end circuitry may be configured to condition signals communicated between antenna 2662 and processing circuitry 2670. Radio front end circuitry 2692 may receive digital data that is to be sent out to other network nodes or WDs via a wireless connection. Radio front end circuitry 2692 may convert the digital data into a radio signal having the appropriate channel and bandwidth parameters using a combination of filters 2698 and/or amplifiers 2696. The radio signal may then be transmitted via antenna 2662. Similarly, when receiving data, antenna 2662 may collect radio signals which are then converted into digital data by radio front end circuitry 2692. The digital data may be passed to processing circuitry 2670. In other embodiments, the interface may comprise different components and/or different combinations of components.

In certain alternative embodiments, network node 2660 may not include separate radio front end circuitry 2692, instead, processing circuitry 2670 may comprise radio front end circuitry and may be connected to antenna 2662 without separate radio front end circuitry 2692. Similarly, in some embodiments, all or some of RF transceiver circuitry 2672 may be considered a part of interface 2690. In still other embodiments, interface 2690 may include one or more ports or terminals 2694, radio front end circuitry 2692, and RF transceiver circuitry 2672, as part of a radio unit (not shown), and interface 2690 may communicate with baseband processing circuitry 2674, which is part of a digital unit (not shown).

Antenna 2662 may include one or more antennas, or antenna arrays, configured to send and/or receive wireless signals. Antenna 2662 may be coupled to radio front end circuitry 2692 and may be any type of antenna capable of transmitting and receiving data and/or signals wirelessly. In some embodiments, antenna 2662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2662 may be separate from network node 2660 and may be connectable to network node 2660 through an interface or port.

Antenna 2662, interface 2690, and/or processing circuitry 2670 may be configured to perform any receiving operations and/or certain obtaining operations described herein as being performed by a network node. Any information, data and/or signals may be received from a wireless device, another network node and/or any other network equipment. Similarly, antenna 2662, interface 2690, and/or processing circuitry 2670 may be configured to perform any transmitting operations described herein as being performed by a network node. Any information, data and/or signals may be transmitted to a wireless device, another network node and/or any other network equipment.

Power circuitry 2687 may comprise, or be coupled to, power management circuitry and is configured to supply the components of network node 2660 with power for performing the functionality described herein. Power circuitry 2687 may receive power from power source 2686. Power source 2686 and/or power circuitry 2687 may be configured to provide power to the various components of network node 2660 in a form suitable for the respective components (e.g., at a voltage and current level needed for each respective component). Power source 2686 may either be included in, or external to, power circuitry 2687 and/or network node 2660. For example, network node 2660 may be connectable to an external power source (e.g., an electricity outlet) via an input circuitry or interface such as an electrical cable, whereby the external power source supplies power to power circuitry 2687. As a further example, power source 2686 may comprise a source of power in the form of a battery or battery pack which is connected to, or integrated in, power circuitry 2687. The battery may provide backup power should the external power source fail. Other types of power sources, such as photovoltaic devices, may also be used.

Alternative embodiments of network node 2660 may include additional components beyond those shown in FIG. 26 that may be responsible for providing certain aspects of the network node's functionality, including any of the functionality described herein and/or any functionality necessary to support the subject matter described herein. For example, network node 2660 may include user interface equipment to allow input of information into network node 2660 and to allow output of information from network node 2660. This may allow a user to perform diagnostic, maintenance, repair, and other administrative functions for network node 2660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2610 includes antenna 2611, interface 2614, processing circuitry 2626, device readable medium 2630, user interface equipment 2632, auxiliary equipment 2634, power source 2636 and power circuitry 2637. WD 2610 may include multiple sets of one or more of the illustrated components for different wireless technologies supported by WD 2610, such as, for example, GSM, WCDMA, LTE, NR, WiFi, WiMAX, or Bluetooth wireless technologies, just to mention a few. These wireless technologies may be integrated into the same or different chips or set of chips as other components within WD 2610.

Antenna 2611 may include one or more antennas or antenna arrays, configured to send and/or receive wireless signals, and is connected to interface 2614. In certain alternative embodiments, antenna 2611 may be separate from WD 2610 and be connectable to WD 2610 through an interface or port. Antenna 2611, interface 2614, and/or processing circuitry 2626 may be configured to perform any receiving or transmitting operations described herein as being performed by a WD. Any information, data and/or signals may be received from a network node and/or another WD. In some embodiments, radio front end circuitry and/or antenna 2611 may be considered an interface.

As illustrated, interface 2614 comprises radio front end circuitry 2612 and antenna 2611. Radio front end circuitry 2612 comprise one or more filters 2618 and amplifiers 2616. Radio front end circuitry 2612 is connected to antenna 2611 and processing circuitry 2626, and is configured to condition signals communicated between antenna 2611 and processing circuitry 2626. Radio front end circuitry 2612 may be coupled to or a part of antenna 2611. In some embodiments, WD 2610 may not include separate radio front end circuitry 2612; rather, processing circuitry 2626 may comprise radio front end circuitry and may be connected to antenna 2611. Similarly, in some embodiments, some or all of RF transceiver circuitry 2622 may be considered a part of interface 2614. Radio front end circuitry 2612 may receive digital data that is to be sent out to other network nodes or WDs via a wireless connection. Radio front end circuitry 2612 may convert the digital data into a radio signal having the appropriate channel and bandwidth parameters using a combination of filters 2618 and/or amplifiers 2616. The radio signal may then be transmitted via antenna 2611. Similarly, when receiving data, antenna 2611 may collect radio signals which are then converted into digital data by radio front end circuitry 2612. The digital data may be passed to processing circuitry 2626. In other embodiments, the interface may comprise different components and/or different combinations of components.

Processing circuitry 2626 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2610 components, such as device readable medium 2630, WD 2610 functionality. Such functionality may include providing any of the various wireless features or benefits discussed herein. For example, processing circuitry 2620 may execute instructions stored in device readable medium 2630 or in memory within processing circuitry 2620 to provide the functionality disclosed herein.

As illustrated, processing circuitry 2620 includes one or more of RF transceiver circuitry 2622, baseband processing circuitry 2624, and application processing circuitry 2626. In other embodiments, the processing circuitry may comprise different components and/or different combinations of components. In certain embodiments processing circuitry 2620 of WD 2610 may comprise a SOC. In some embodiments, RF transceiver circuitry 2622, baseband processing circuitry 2624, and application processing circuitry 2626 may be on separate chips or sets of chips. In alternative embodiments, part or all of baseband processing circuitry 2624 and application processing circuitry 2626 may be combined into one chip or set of chips, and RF transceiver circuitry 2622 may be on a separate chip or set of chips. In still alternative embodiments, part or all of RF transceiver circuitry 2622 and baseband processing circuitry 2624 may be on the same chip or set of chips, and application processing circuitry 2626 may be on a separate chip or set of chips. In yet other alternative embodiments, part or all of RF transceiver circuitry 2622, baseband processing circuitry 2624, and application processing circuitry 2626 may be combined in the same chip or set of chips. In some embodiments, RF transceiver circuitry 2622 may be a part of interface 2614. RF transceiver circuitry 2622 may condition RF signals for processing circuitry 2620.

In certain embodiments, some or all of the functionality described herein as being performed by a WD may be provided by processing circuitry 2620 executing instructions stored on device readable medium 2630, which in certain embodiments may be a computer-readable storage medium. In alternative embodiments, some or all of the functionality may be provided by processing circuitry 2620 without executing instructions stored on a separate or discrete device readable storage medium, such as in a hard-wired manner. In any of those particular embodiments, whether executing instructions stored on a device readable storage medium or not, processing circuitry 2620 can be configured to perform the described functionality. The benefits provided by such functionality are not limited to processing circuitry 2620 alone or to other components of WD 2610, but are enjoyed by WD 2610 as a whole, and/or by end users and the wireless network generally.

Processing circuitry 2620 may be configured to perform any determining, calculating, or similar operations (e.g., certain obtaining operations) described herein as being performed by a WD. These operations, as performed by processing circuitry 2620, may include processing information obtained by processing circuitry 2620 by, for example, converting the obtained information into other information, comparing the obtained information or converted information to information stored by WD 2610, and/or performing one or more operations based on the obtained information or converted information, and as a result of said processing making a determination.

Device readable medium 2630 may be operable to store a computer program, software, an application including one or more of logic, rules, code, tables, etc. and/or other instructions capable of being executed by processing circuitry 2620. Device readable medium 2630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2620. In some embodiments, processing circuitry 2620 and device readable medium 2630 may be considered to be integrated.

User interface equipment 2632 may provide components that allow for a human user to interact with WD 2610. Such interaction may be of many forms, such as visual, audial, tactile, etc. User interface equipment 2632 may be operable to produce output to the user and to allow the user to provide input to WD 2610. The type of interaction may vary depending on the type of user interface equipment 2632 installed in WD 2610. For example, if WD 2610 is a smart phone, the interaction may be via a touch screen; if WD 2610 is a smart meter, the interaction may be through a screen that provides usage (e.g., the number of gallons used) or a speaker that provides an audible alert (e.g., if smoke is detected). User interface equipment 2632 may include input interfaces, devices and circuits, and output interfaces, devices and circuits. User interface equipment 2632 is configured to allow input of information into WD 2610, and is connected to processing circuitry 2620 to allow processing circuitry 2620 to process the input information. User interface equipment 2632 may include, for example, a microphone, a proximity or other sensor, keys/buttons, a touch display, one or more cameras, a USB port, or other input circuitry. User interface equipment 2632 is also configured to allow output of information from WD 2610, and to allow processing circuitry 2620 to output information from WD 2610. User interface equipment 2632 may include, for example, a speaker, a display, vibrating circuitry, a USB port, a headphone interface, or other output circuitry. Using one or more input and output interfaces, devices, and circuits, of user interface equipment 2632, WD 2610 may communicate with end users and/or the wireless network, and allow them to benefit from the functionality described herein.

Auxiliary equipment 2634 is operable to provide more specific functionality which may not be generally performed by WDs. This may comprise specialized sensors for doing measurements for various purposes, interfaces for additional types of communication such as wired communications etc. The inclusion and type of components of auxiliary equipment 2634 may vary depending on the embodiment and/or scenario.

Power source 2636 may, in some embodiments, be in the form of a battery or battery pack. Other types of power sources, such as an external power source (e.g., an electricity outlet), photovoltaic devices or power cells, may also be used. WD 2610 may further comprise power circuitry 2637 for delivering power from power source 2636 to the various parts of WD 2610 which need power from power source 2636 to carry out any functionality described or indicated herein. Power circuitry 2637 may in certain embodiments comprise power management circuitry. Power circuitry 2637 may additionally or alternatively be operable to receive power from an external power source; in which case WD 2610 may be connectable to the external power source (such as an electricity outlet) via input circuitry or an interface such as an electrical power cable. Power circuitry 2637 may also in certain embodiments be operable to deliver power from an external power source to power source 2636. This may be, for example, for the charging of power source 2636. Power circuitry 2637 may perform any formatting, converting, or other modification to the power from power source 2636 to make the power suitable for the respective components of WD 2610 to which power is supplied.

Figure 27:
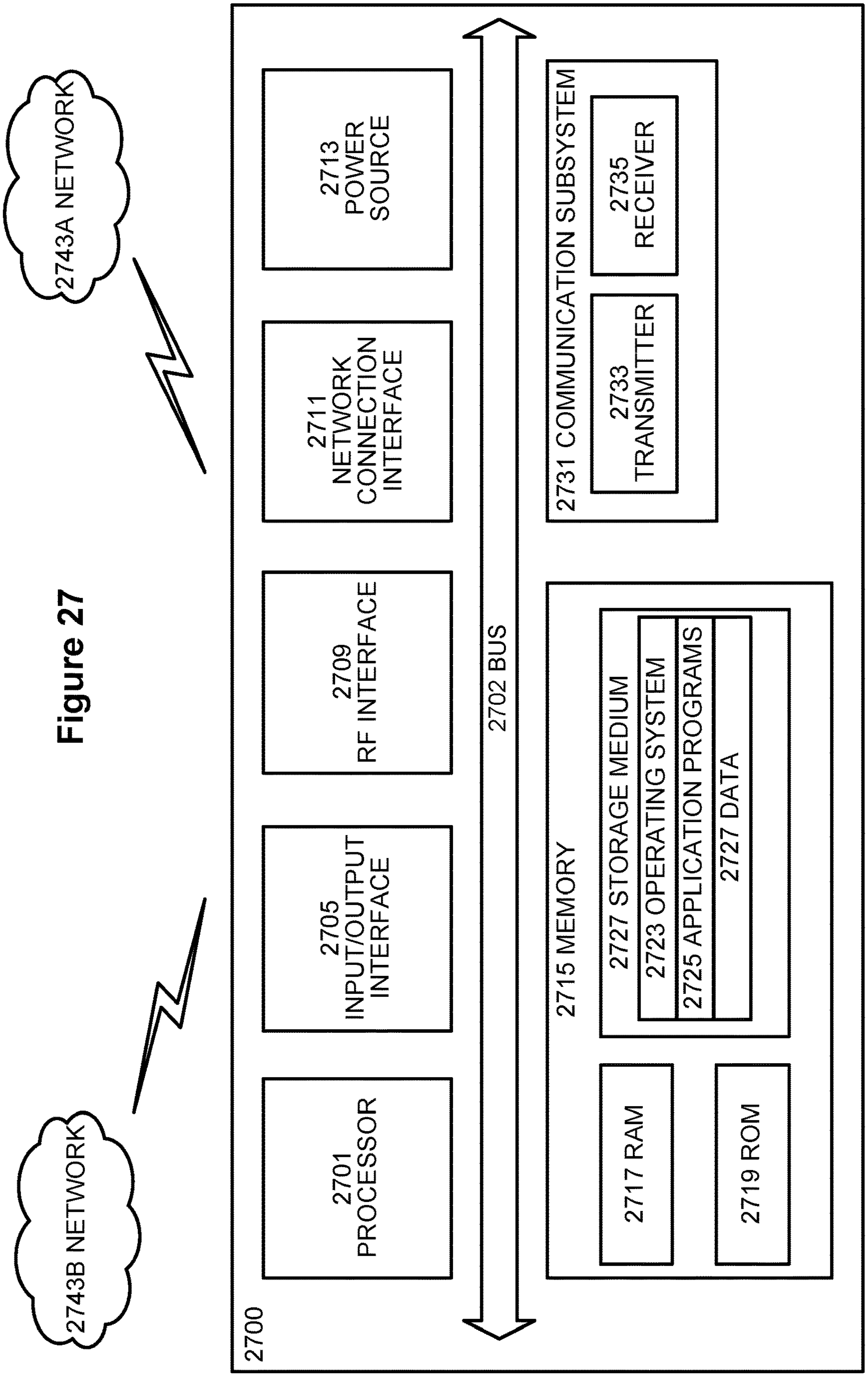
FIG. 27 is a block diagram of a user equipment in accordance with some embodiments

FIG. 27 illustrates a user Equipment in accordance with some embodiments.

FIG. 27 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2700 may be any UE identified by the 3rd Generation Partnership Project (3GPP), including a NB-IoT UE, a machine type communication (MTC) UE, and/or an enhanced MTC (eMTC) UE. UE 2700, as illustrated in FIG. 27, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 27 is a UE, the components discussed herein are equally applicable to a WD, and vice-versa.

In FIG. 27, UE 2700 includes processing circuitry 2701 that is operatively coupled to input/output interface 2705, radio frequency (RF) interface 2709, network connection interface 2711, memory 2715 including random access memory (RAM) 2717, read-only memory (ROM) 2719, and storage medium 2727 or the like, communication subsystem 2731, power source 2713, and/or any other component, or any combination thereof. Storage medium 2727 includes operating system 2723, application program 2725, and data 2727. In other embodiments, storage medium 2727 may include other similar types of information. Certain UEs may utilize all of the components shown in FIG. 27, or only a subset of the components. The level of integration between the components may vary from one UE to another UE. Further, certain UEs may contain multiple instances of a component, such as multiple processors, memories, transceivers, transmitters, receivers, etc.

In FIG. 27, processing circuitry 2701 may be configured to process computer instructions and data. Processing circuitry 2701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2701 may include two central processing units (CPUs). Data may be information in a form suitable for use by a computer.

In the depicted embodiment, input/output interface 2705 may be configured to provide a communication interface to an input device, output device, or input and output device. UE 2700 may be configured to use an output device via input/output interface 2705. An output device may use the same type of interface port as an input device. For example, a USB port may be used to provide input to and output from UE 2700. The output device may be a speaker, a sound card, a video card, a display, a monitor, a printer, an actuator, an emitter, a smartcard, another output device, or any combination thereof. UE 2700 may be configured to use an input device via input/output interface 2705 to allow a user to capture information into UE 2700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 27, RF interface 2709 may be configured to provide a communication interface to RF components such as a transmitter, a receiver, and an antenna. Network connection interface 2711 may be configured to provide a communication interface to network 2743A. Network 2143A may encompass wired and/or wireless networks such as a local-area network (LAN), a wide-area network (WAN), a computer network, a wireless network, a telecommunications network, another like network or any combination thereof. For example, network 2743A may comprise a Wi-Fi network. Network connection interface 2711 may be configured to include a receiver and a transmitter interface used to communicate with one or more other devices over a communication network according to one or more communication protocols, such as Ethernet, TCP/IP, SONET, ATM, or the like. Network connection interface 2711 may implement receiver and transmitter functionality appropriate to the communication network links (e.g., optical, electrical, and the like). The transmitter and receiver functions may share circuit components, software or firmware, or alternatively may be implemented separately.

RAM 2717 may be configured to interface via bus 2702 to processing circuitry 2701 to provide storage or caching of data or computer instructions during the execution of software programs such as the operating system, application programs, and device drivers. ROM 2719 may be configured to provide computer instructions or data to processing circuitry 2701. For example, ROM 2719 may be configured to store invariant low-level system code or data for basic system functions such as basic input and output (I/O), startup, or reception of keystrokes from a keyboard that are stored in a non-volatile memory. Storage medium 2721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2721 may be configured to include operating system 2723, application program 2725 such as a web browser application, a widget or gadget engine or another application, and data file 2727. Storage medium 2721 may store, for use by UE 2700, any of a variety of various operating systems or combinations of operating systems.

Storage medium 2721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2721 may allow UE 2700 to access computer-executable instructions, application programs or the like, stored on transitory or non-transitory memory media, to off-load data, or to upload data. An article of manufacture, such as one utilizing a communication system may be tangibly embodied in storage medium 2721, which may comprise a device readable medium.

In FIG. 27, processing circuitry 2701 may be configured to communicate with network 2743B using communication subsystem 2731. Network 2743A and network 2743B may be the same network or networks or different network or networks. Communication subsystem 2731 may be configured to include one or more transceivers used to communicate with network 2743B. For example, communication subsystem 2731 may be configured to include one or more transceivers used to communicate with one or more remote transceivers of another device capable of wireless communication such as another WD, UE, or base station of a radio access network (RAN) according to one or more communication protocols, such as IEEE 802.11, Code Division Multiplexing Access (CDMA), Wide CDMA (WCDMA), Global System for Mobile communication (GSM), LTE, Universal Terrestrial Radio Access Network (UTRAN), WiMax, or the like. Each transceiver may include transmitter 2733 and/or receiver 2735 to implement transmitter or receiver functionality, respectively, appropriate to the RAN links (e.g., frequency allocations and the like). Further, transmitter 2733 and receiver 2735 of each transceiver may share circuit components, software or firmware, or alternatively may be implemented separately.

In the illustrated embodiment, the communication functions of communication subsystem 2731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2731 may include cellular communication, Wi-Fi communication, Bluetooth communication, and GPS communication. Network 2743B may encompass wired and/or wireless networks such as a local-area network (LAN), a wide-area network (WAN), a computer network, a wireless network, a telecommunications network, another like network or any combination thereof. For example, network 2743B may be a cellular network, a Wi-Fi network, and/or a near-field network. Power source 2713 may be configured to provide alternating current (AC) or direct current (DC) power to components of UE 2700.

The features, benefits and/or functions described herein may be implemented in one of the components of UE 2700 or partitioned across multiple components of UE 2700. Further, the features, benefits, and/or functions described herein may be implemented in any combination of hardware, software or firmware. In one example, communication subsystem 2731 may be configured to include any of the components described herein. Further, processing circuitry 2701 may be configured to communicate with any of such components over bus 2702. In another example, any of such components may be represented by program instructions stored in memory that when executed by processing circuitry 2701 perform the corresponding functions described herein. In another example, the functionality of any of such components may be partitioned between processing circuitry 2701 and communication subsystem 2731. In another example, the non-computationally intensive functions of any of such components may be implemented in software or firmware and the computationally intensive functions may be implemented in hardware.

Figure 28:
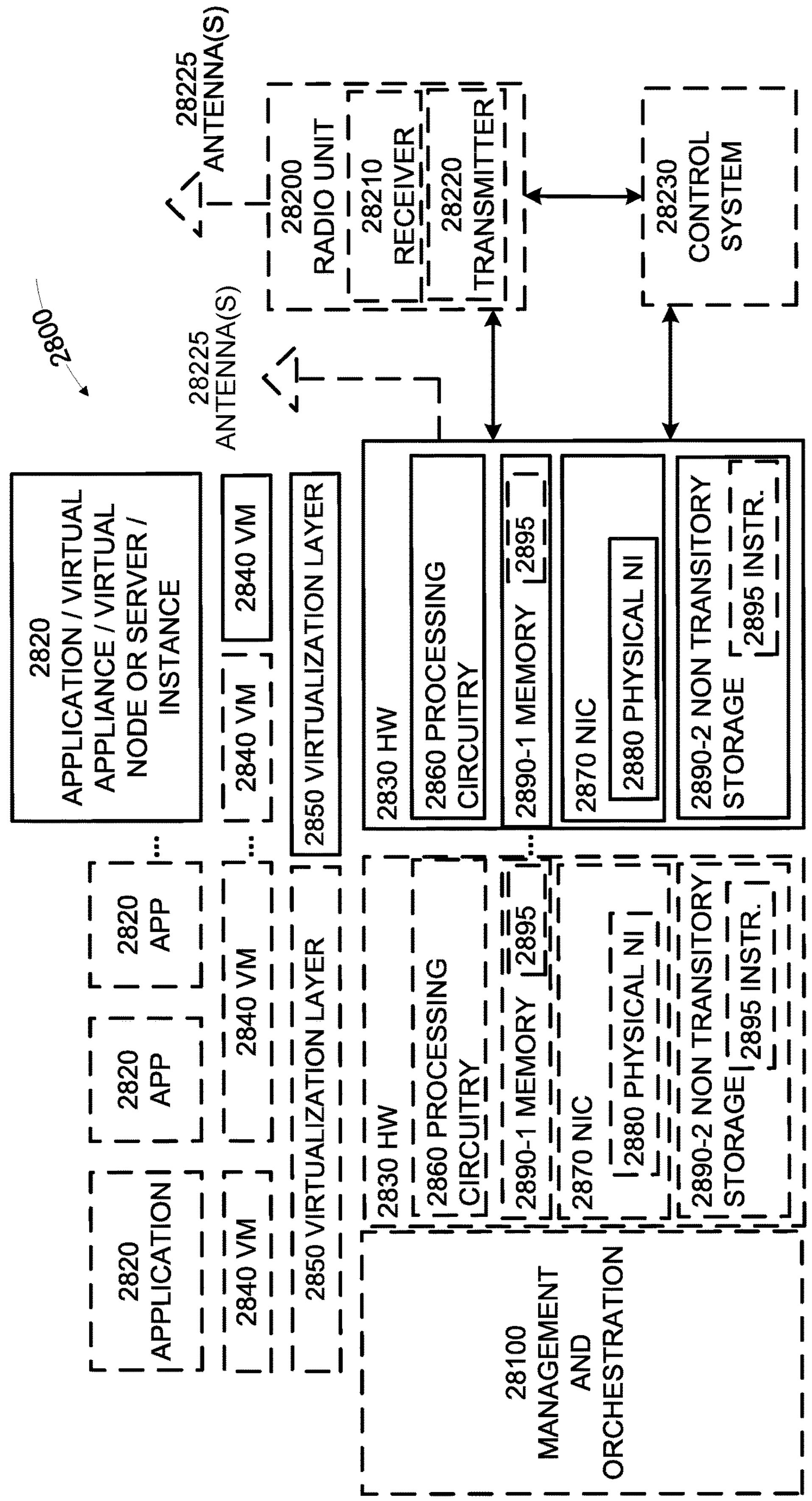
FIG. 28 is a block diagram of a virtualization environment in accordance with some embodiments.

FIG. 28 illustrates a virtualization environment in accordance with some embodiments.

FIG. 28 is a schematic block diagram illustrating a virtualization environment 2800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2800 hosted by one or more of hardware nodes 2830. Further, in embodiments in which the virtual node is not a radio access node or does not require radio connectivity (e.g., a core network node), then the network node may be entirely virtualized.

The functions may be implemented by one or more applications 2820 (which may alternatively be called software instances, virtual appliances, network functions, virtual nodes, virtual network functions, etc.) operative to implement some of the features, functions, and/or benefits of some of the embodiments disclosed herein. Applications 2820 are run in virtualization environment 2800 which provides hardware 2830 comprising processing circuitry 2860 and memory 2890. Memory 2890 contains instructions 2895 executable by processing circuitry 2860 whereby application 2820 is operative to provide one or more of the features, benefits, and/or functions disclosed herein.

Virtualization environment 2800, comprises general-purpose or special-purpose network hardware devices 2830 comprising a set of one or more processors or processing circuitry 2860, which may be commercial off-the-shelf (COTS) processors, dedicated Application Specific Integrated Circuits (ASICs), or any other type of processing circuitry including digital or analog hardware components or special purpose processors. Each hardware device may comprise memory 2890-1 which may be non-persistent memory for temporarily storing instructions 2895 or software executed by processing circuitry 2860. Each hardware device may comprise one or more network interface controllers (NICs) 2870, also known as network interface cards, which include physical network interface 2880. Each hardware device may also include non-transitory, persistent, machine-readable storage media 2890-2 having stored therein software 2895 and/or instructions executable by processing circuitry 2860. Software 2895 may include any type of software including software for instantiating one or more virtualization layers 2850 (also referred to as hypervisors), software to execute virtual machines 2840 as well as software allowing it to execute functions, features and/or benefits described in relation with some embodiments described herein.

Virtual machines 2840 comprise virtual processing, virtual memory, virtual networking or interface and virtual storage, and may be run by a corresponding virtualization layer 2850 or hypervisor. Different embodiments of the instance of virtual appliance 2820 may be implemented on one or more of virtual machines 2840, and the implementations may be made in different ways.

During operation, processing circuitry 2860 executes software 2895 to instantiate the hypervisor or virtualization layer 2850, which may sometimes be referred to as a virtual machine monitor (VMM). Virtualization layer 2850 may present a virtual operating platform that appears like networking hardware to virtual machine 2840.

As shown in FIG. 28, hardware 2830 may be a standalone network node with generic or specific components. Hardware 2830 may comprise antenna 28225 and may implement some functions via virtualization. Alternatively, hardware 2830 may be part of a larger cluster of hardware (e.g. such as in a data center or customer premise equipment (CPE)) where many hardware nodes work together and are managed via management and orchestration (MANO) 28100, which, among others, oversees lifecycle management of applications 2820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2840 may be a software implementation of a physical machine that runs programs as if they were executing on a physical, non-virtualized machine. Each of virtual machines 2840, and that part of hardware 2830 that executes that virtual machine, be it hardware dedicated to that virtual machine and/or hardware shared by that virtual machine with others of the virtual machines 2840, forms a separate virtual network elements (VNE).

Still in the context of NFV, Virtual Network Function (VNF) is responsible for handling specific network functions that run in one or more virtual machines 2840 on top of hardware networking infrastructure 2830 and corresponds to application 2820 in FIG. 28.

In some embodiments, one or more radio units 28200 that each include one or more transmitters 28220 and one or more receivers 28210 may be coupled to one or more antennas 28225. Radio units 28200 may communicate directly with hardware nodes 2830 via one or more appropriate network interfaces and may be used in combination with the virtual components to provide a virtual node with radio capabilities, such as a radio access node or a base station.

In some embodiments, some signalling can be effected with the use of control system 28230 which may alternatively be used for communication between the hardware nodes 2830 and radio units 28200.

Figure 29:
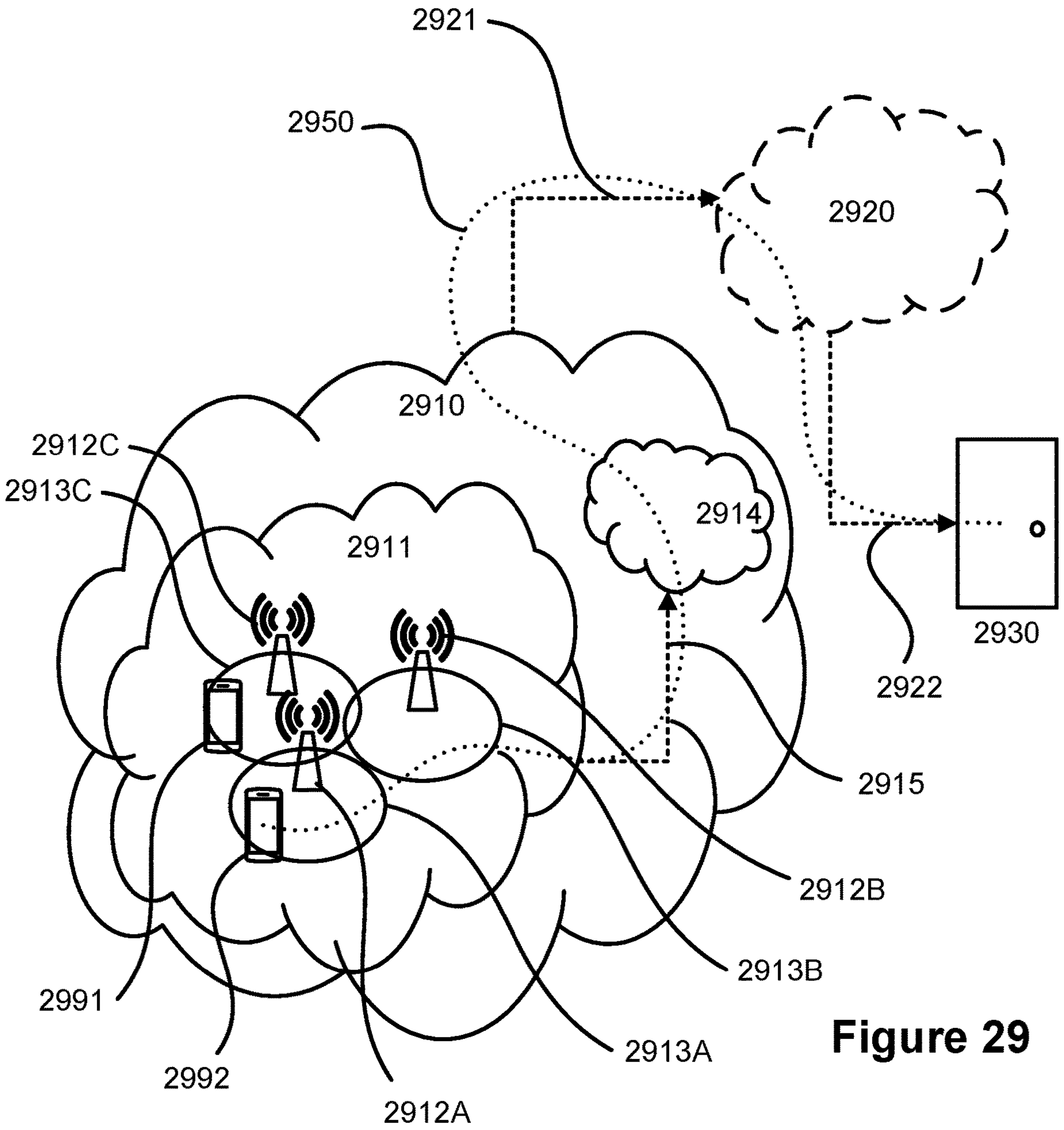
FIG. 29 is a block diagram of a telecommunication network connected via an intermediate network to a host computer in accordance with some embodiments.

FIG. 29 illustrates a telecommunication network connected via an intermediate network to a host computer in accordance with some embodiments.

With reference to FIG. 29, in accordance with an embodiment, a communication system includes telecommunication network 2910, such as a 3GPP-type cellular network, which comprises access network 2911, such as a radio access network, and core network 2914. Access network 2911 comprises a plurality of base stations 2912A, 2912B, 2912C, such as NBs, eNBs, gNBs or other types of wireless access points, each defining a corresponding coverage area 2913A, 2913B, 2913C. Each base station 2912A, 2912B, 2912C is connectable to core network 2914 over a wired or wireless connection 2915. A first UE 2991 located in coverage area 2913C is configured to wirelessly connect to, or be paged by, the corresponding base station 2912C. A second UE 2992 in coverage area 2913A is wirelessly connectable to the corresponding base station 2912A. While a plurality of UEs 2991, 2992 are illustrated in this example, the disclosed embodiments are equally applicable to a situation where a sole UE is in the coverage area or where a sole UE is connecting to the corresponding base station 2912.

Telecommunication network 2910 is itself connected to host computer 2930, which may be embodied in the hardware and/or software of a standalone server, a cloud-implemented server, a distributed server or as processing resources in a server farm. Host computer 2930 may be under the ownership or control of a service provider, or may be operated by the service provider or on behalf of the service provider. Connections 2921 and 2922 between telecommunication network 2910 and host computer 2930 may extend directly from core network 2914 to host computer 2930 or may go via an optional intermediate network 2920. Intermediate network 2920 may be one of, or a combination of more than one of, a public, private or hosted network; intermediate network 2920, if any, may be a backbone network or the Internet; in particular, intermediate network 2920 may comprise two or more sub-networks (not shown).

The communication system of FIG. 29 as a whole enables connectivity between the connected UEs 2991, 2992 and host computer 2930. The connectivity may be described as an over-the-top (OTT) connection 2950. Host computer 2930 and the connected UEs 2991, 2992 are configured to communicate data and/or signaling via OTT connection 2950, using access network 2911, core network 2914, any intermediate network 2920 and possible further infrastructure (not shown) as intermediaries. OTT connection 2950 may be transparent in the sense that the participating communication devices through which OTT connection 2950 passes are unaware of routing of uplink and downlink communications. For example, base station 2912 may not or need not be informed about the past routing of an incoming downlink communication with data originating from host computer 2930 to be forwarded (e.g., handed over) to a connected UE 2991. Similarly, base station 2912 need not be aware of the future routing of an outgoing uplink communication originating from the UE 2991 towards the host computer 2930.

Figure 30:
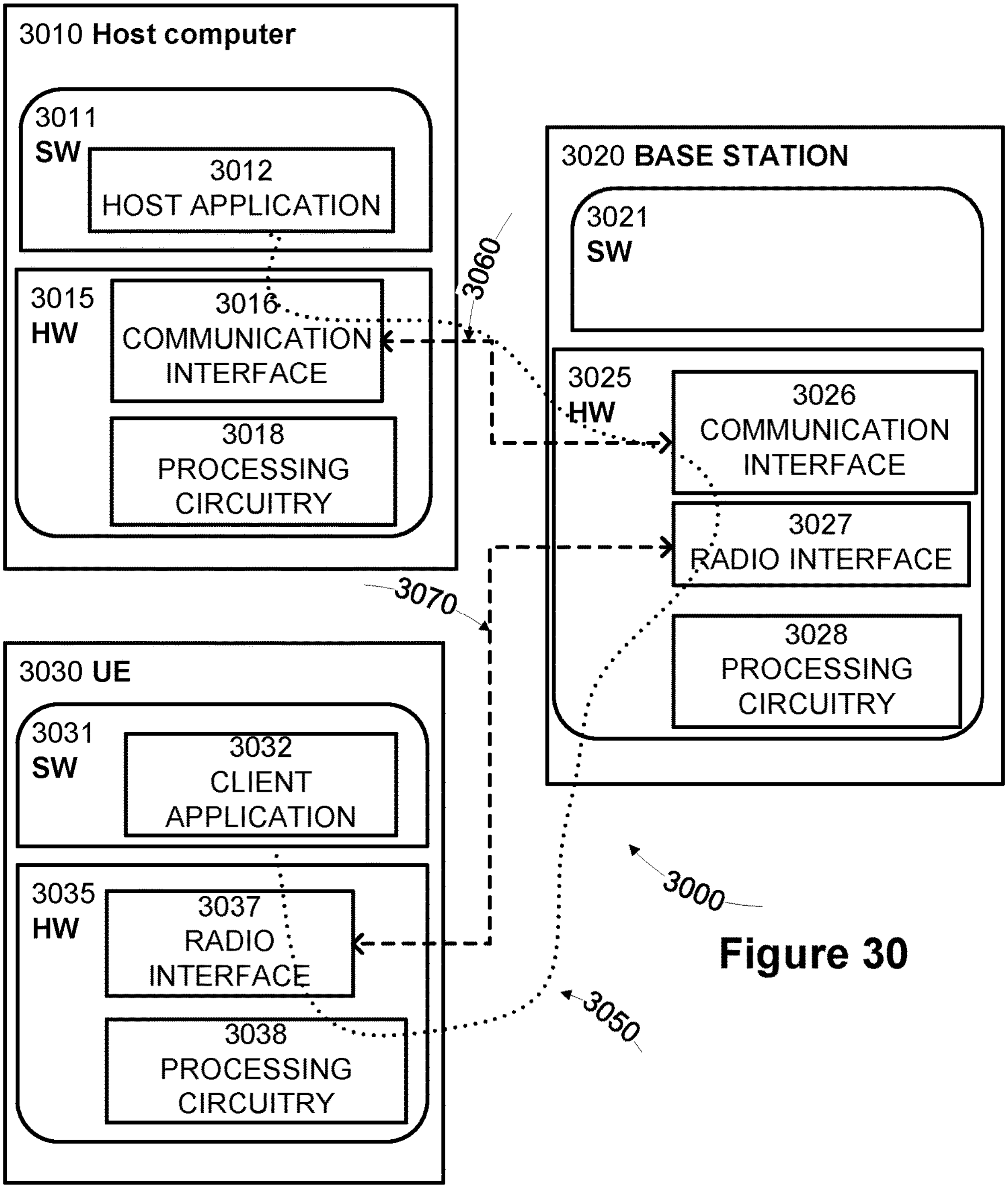
FIG. 30 is a block diagram of a host computer communicating via a base station with a user equipment over a partially wireless connection in accordance with some embodiments.

FIG. 30 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 30. In communication system 3000, host computer 3010 comprises hardware 3015 including communication interface 3016 configured to set up and maintain a wired or wireless connection with an interface of a different communication device of communication system 3000. Host computer 3010 further comprises processing circuitry 3018, which may have storage and/or processing capabilities. In particular, processing circuitry 3018 may comprise one or more programmable processors, application-specific integrated circuits, field programmable gate arrays or combinations of these (not shown) adapted to execute instructions. Host computer 3010 further comprises software 3011, which is stored in or accessible by host computer 3010 and executable by processing circuitry 3018. Software 3011 includes host application 3012. Host application 3012 may be operable to provide a service to a remote user, such as UE 3030 connecting via OTT connection 3050 terminating at UE 3030 and host computer 3010. In providing the service to the remote user, host application 3012 may provide user data which is transmitted using OTT connection 3050.

Communication system 3000 further includes base station 3020 provided in a telecommunication system and comprising hardware 3025 enabling it to communicate with host computer 3010 and with UE 3030. Hardware 3025 may include communication interface 3026 for setting up and maintaining a wired or wireless connection with an interface of a different communication device of communication system 3000, as well as radio interface 3027 for setting up and maintaining at least wireless connection 3070 with UE 3030 located in a coverage area (not shown in FIG. 30) served by base station 3020. Communication interface 3026 may be configured to facilitate connection 3060 to host computer 3010. Connection 3060 may be direct or it may pass through a core network (not shown in FIG. 30) of the telecommunication system and/or through one or more intermediate networks outside the telecommunication system. In the embodiment shown, hardware 3025 of base station 3020 further includes processing circuitry 3028, which may comprise one or more programmable processors, application-specific integrated circuits, field programmable gate arrays or combinations of these (not shown) adapted to execute instructions. Base station 3020 further has software 3021 stored internally or accessible via an external connection.

Communication system 3000 further includes UE 3030 already referred to. Its hardware 3035 may include radio interface 3037 configured to set up and maintain wireless connection 3070 with a base station serving a coverage area in which UE 3030 is currently located. Hardware 3035 of UE 3030 further includes processing circuitry 3038, which may comprise one or more programmable processors, application-specific integrated circuits, field programmable gate arrays or combinations of these (not shown) adapted to execute instructions. UE 3030 further comprises software 3031, which is stored in or accessible by UE 3030 and executable by processing circuitry 3038. Software 3031 includes client application 3032. Client application 3032 may be operable to provide a service to a human or non-human user via UE 3030, with the support of host computer 3010. In host computer 3010, an executing host application 3012 may communicate with the executing client application 3032 via OTT connection 3050 terminating at UE 3030 and host computer 3010. In providing the service to the user, client application 3032 may receive request data from host application 3012 and provide user data in response to the request data. OTT connection 3050 may transfer both the request data and the user data. Client application 3032 may interact with the user to generate the user data that it provides.

It is noted that host computer 3010, base station 3020 and UE 3030 illustrated in FIG. 30 may be similar or identical to host computer 2930, one of base stations 2912A, 2912B, 2912B and one of UEs 2991, 2992 of FIG. 29, respectively. This is to say, the inner workings of these entities may be as shown in FIG. 30 and independently, the surrounding network topology may be that of FIG. 29.

In FIG. 30, OTT connection 3050 has been drawn abstractly to illustrate the communication between host computer 3010 and UE 3030 via base station 3020, without explicit reference to any intermediary devices and the precise routing of messages via these devices. Network infrastructure may determine the routing, which it may be configured to hide from UE 3030 or from the service provider operating host computer 3010, or both. While OTT connection 3050 is active, the network infrastructure may further take decisions by which it dynamically changes the routing (e.g., on the basis of load balancing consideration or reconfiguration of the network).

Wireless connection 3070 between UE 3030 and base station 3020 is in accordance with the teachings of the embodiments described throughout this disclosure. One or more of the various embodiments may improve the performance of OTT services provided to UE 3030 using OTT connection 3050, in which wireless connection 3070 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 3050 between host computer 3010 and UE 3030, in response to variations in the measurement results. The measurement procedure and/or the network functionality for reconfiguring OTT connection 3050 may be implemented in software 3011 and hardware 3015 of host computer 3010 or in software 3031 and hardware 3035 of UE 3030, or both. In embodiments, sensors (not shown) may be deployed in or in association with communication devices through which OTT connection 3050 passes; the sensors may participate in the measurement procedure by supplying values of the monitored quantities exemplified above, or supplying values of other physical quantities from which software 3011, 3031 may compute or estimate the monitored quantities. The reconfiguring of OTT connection 3050 may include message format, retransmission settings, preferred routing etc.; the reconfiguring need not affect base station 3020, and it may be unknown or imperceptible to base station 3020. Such procedures and functionalities may be known and practiced in the art. In certain embodiments, measurements may involve proprietary UE signaling facilitating host computer 3010's measurements of throughput, propagation times, latency and the like. The measurements may be implemented in that software 3011 and 3031 causes messages to be transmitted, in particular empty or 'dummy' messages, using OTT connection 3050 while it monitors propagation times, errors etc.

Figure 31:
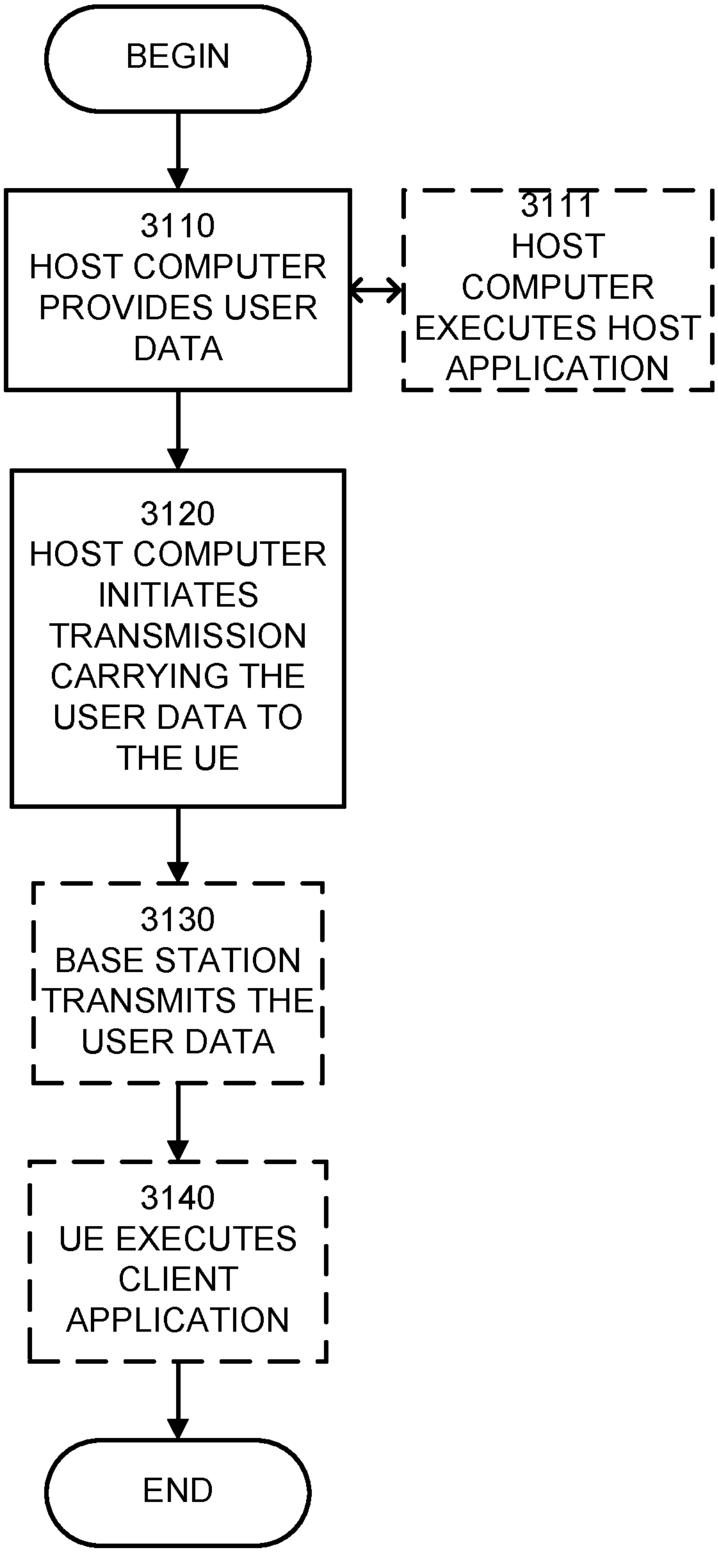
FIG. 31 is a block diagram of methods implemented in a communication system including a host computer, a base station and a user equipment in accordance with some embodiments.

FIG. 31 illustrates methods implemented in a communication system including a host computer, a base station and a user equipment in accordance with some embodiments.

FIG. 31 is a flowchart illustrating a method implemented in a communication system, in accordance with one embodiment. The communication system includes a host computer, a base station and a UE which may be those described with reference to FIGS. 29 and 30. For simplicity of the present disclosure, only drawing references to FIG. 31 will be included in this section. In step 3110, the host computer provides user data. In substep 2511 (which may be optional) of step 3110, the host computer provides the user data by executing a host application. In step 3120, the host computer initiates a transmission carrying the user data to the UE. In step 3130 (which may be optional), the base station transmits to the UE the user data which was carried in the transmission that the host computer initiated, in accordance with the teachings of the embodiments described throughout this disclosure. In step 3140 (which may also be optional), the UE executes a client application associated with the host application executed by the host computer.

Figure 32:
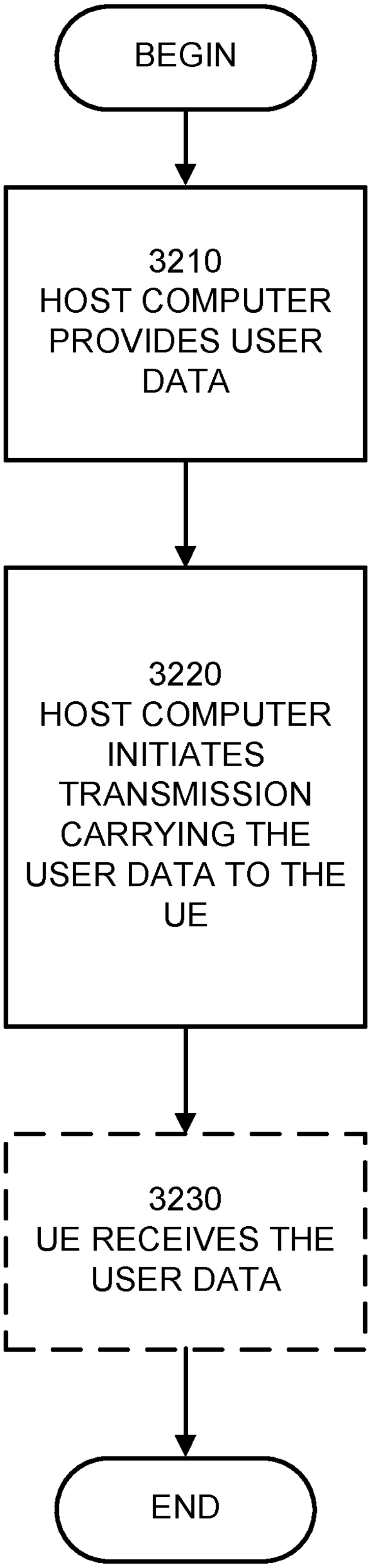
FIG. 32 is a block diagram of methods implemented in a communication system including a host computer, a base station and a user equipment in accordance with some embodiments.

FIG. 32 illustrates methods implemented in a communication system including a host computer, a base station and a user equipment in accordance with some embodiments.

FIG. 32 is a flowchart illustrating a method implemented in a communication system, in accordance with one embodiment. The communication system includes a host computer, a base station and a UE which may be those described with reference to FIGS. 29 and 30. For simplicity of the present disclosure, only drawing references to FIG. 32 will be included in this section. In step 3210 of the method, the host computer provides user data. In an optional substep (not shown) the host computer provides the user data by executing a host application. In step 3220, the host computer initiates a transmission carrying the user data to the UE. The transmission may pass via the base station, in accordance with the teachings of the embodiments described throughout this disclosure. In step 3230 (which may be optional), the UE receives the user data carried in the transmission.

Figure 33:
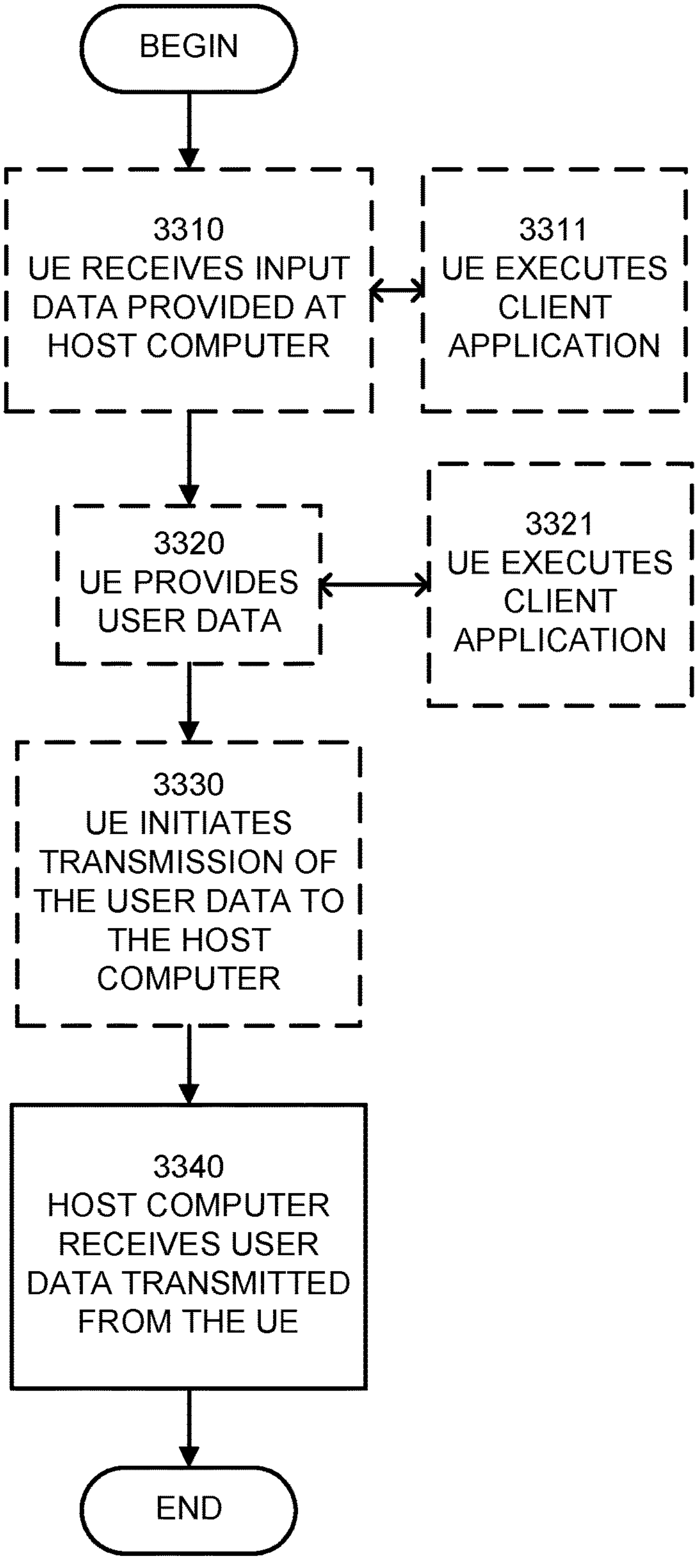
FIG. 33 is a block diagram of methods implemented in a communication system including a host computer, a base station and a user equipment in accordance with some embodiments.

FIG. 33 illustrates methods implemented in a communication system including a host computer, a base station and a user equipment in accordance with some embodiments FIG. 33 is a flowchart illustrating a method implemented in a communication system, in accordance with one embodiment. The communication system includes a host computer, a base station and a UE which may be those described with reference to FIGS. 29 and 30. For simplicity of the present disclosure, only drawing references to FIG. 33 will be included in this section. In step 3310 (which may be optional), the UE receives input data provided by the host computer. Additionally or alternatively, in step 3320, the UE provides user data. In substep 3321 (which may be optional) of step 3320, the UE provides the user data by executing a client application. In substep 3311 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 3330 (which may be optional), transmission of the user data to the host computer. In step 3340 of the method, the host computer receives the user data transmitted from the UE, in accordance with the teachings of the embodiments described throughout this disclosure.

Figure 34:
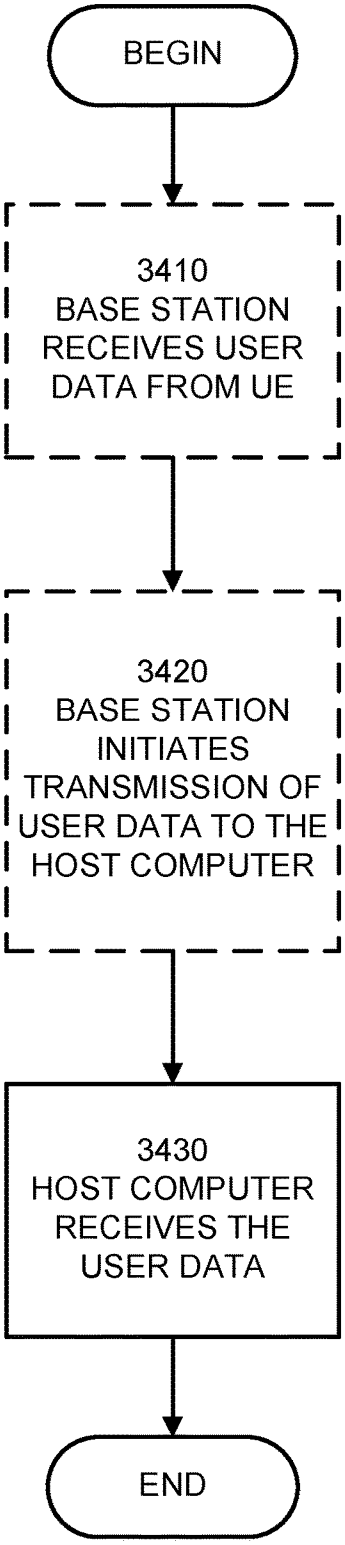
FIG. 34 is a block diagram of methods implemented in a communication system including a host computer, a base station and a user equipment in accordance with some embodiments.

FIG. 34 illustrates methods implemented in a communication system including a host computer, a base station and a user equipment in accordance with some embodiments FIG. 34 is a flowchart illustrating a method implemented in a communication system, in accordance with one embodiment. The communication system includes a host computer, a base station and a UE which may be those described with reference to FIGS. 29 and 30. For simplicity of the present disclosure, only drawing references to FIG. 34 will be included in this section. In step 3410 (which may be optional), in accordance with the teachings of the embodiments described throughout this disclosure, the base station receives user data from the UE. In step 3420 (which may be optional), the base station initiates transmission of the received user data to the host computer. In step 3430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms)

used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a source Master Node (MN) comprising:

transmitting a request for handover for a user equipment (UE) with deactivated secondary cell group (SCG) to a target MN, wherein the request is transmitted with user plane traffic load information;

receiving, from the target MN, a response including a Handover Command comprising a reconfiguration message containing reconfigurationWithSync with a UE target configuration and an indication of activated or deactivated SCG; and transmitting the reconfiguration message containing the reconfiguration WithSync to the UE with the UE target configuration.

2. The method of claim 1, wherein the response contains an indication about whether the SCG is currently activated or deactivated.

3. The method of claim 1, wherein the user plane traffic load information includes a traffic load.

4. The method of claim 1, wherein the user plane traffic load information comprises at least one of buffer status of a current master cell group (MCG) and a buffer status of a current SCG.

5. The method of claim 1, wherein information about SCG mode of operation is included in a UE Context, and wherein the information about the SCG mode of operation is included in one of the following: an MN part of the UE context, a SN part of the UE context, or both the MN and SN part of the UE context.

6. The method of claim 1, wherein the indication of activated or deactivated SCG is included in an XnAP message.

7. A method performed by a target Master Node (MN) comprising:

receiving a request for handover from a source MN for a user equipment (UE) with activated or deactivated secondary cell group (SCG) wherein the request is received with user plane traffic load information;

determining whether the SCG should be activated or deactivated based on the user plane traffic load information;

transmitting a request to a target secondary node (SN) for addition of an SCG to a UE target configuration, wherein the request to the target SN includes the received user plane traffic load information;

receiving a response from the target SN including an indication enabling the target MN to determine whether a SCG's mode of operation was accepted or not; and transmitting a response to the source MN, wherein the response includes a Handover Command comprising a reconfiguration message having a reconfigurationWithSync with the UE target configuration.

8. The method of claim 7, wherein determining whether the target SN should be activated or deactivated is further based on whether the target SN is activated or deactivated in a source SN.

9. The method of claim 7, wherein determining whether the target SN should be activated or deactivated is based on one of the user plane traffic load information including a Downlink (DL) buffer status and/or an Uplink (UL) buffer status, and further information including an amount of data transmitted, or received, or transmitted and received in the SCG in a last X time units, and a SCG's inactivity time for which there has been no data transmission on the SCG.

10. The method of claim 7, wherein the target MN decides to deactivate the SCG in the target SN if an amount of user plane traffic load is below a threshold.

11. The method of claim 7, wherein the transmitted request to the target SN includes the user plane traffic load information of current SCG, wherein the user plane traffic load information includes downlink (DL) buffer status and/or the uplink (UL) buffer status, an amount of data transmitted/received in the SCG in a last X time units, or SCG's inactivity time, and wherein the user plane traffic load information comprises different granularity corresponding to per user plane traffic load information for DL, user plane traffic load information for UL, and per bearer.

12. A method performed by a target Secondary Node (SN) comprising:

receiving a request from a source master node (MN) for addition of a secondary cell group (SCG) to a user equipment (UE) target configuration, wherein the request is received with user plane traffic load information; and transmitting a response to the source MN including an indication enabling the source MN to determine whether a SCG's mode of operation was accepted or not.

13. The method of claim 12, wherein the request includes an indication of the SCG's mode of operation determined by the source MN for the SCG based on whether the SCG is activated or deactivated.

14. The method of claim 12, further comprising transmitting a response to the source MN whether the addition of the SCG is accepted and the requested SCG mode of operation accepted.

15. A source master node (MN) comprising:

processing circuitry; and memory coupled with the processing circuitry, wherein the memory includes instructions that when executed by the processing circuitry causes the MN to perform operations comprising:

transmitting a request for handover for a user equipment (UE) with deactivated secondary cell group (SCG) to a target MN, the request transmitted with user plane traffic load information;

receiving, from the target MN, a response including a Handover Command comprising a reconfiguration message containing reconfiguration WithSync with a UE target configuration and an indication of activated or deactivated SCG; and transmitting the reconfiguration message containing the reconfiguration WithSync to the UE with the UE target configuration.

16. The source MN of claim 15, wherein the response contains an indication about whether the SCG is currently activated or deactivated.

17. A target master node (MN) comprising:

processing circuitry; and memory coupled with the processing circuitry, wherein the memory includes instructions that when executed by the processing circuitry causes the target MN to perform operations comprising:

receiving a request for handover from a source MN for a user equipment (UE) with activated or deactivated secondary cell group, (SCG) wherein the request is received with user plane traffic load information;

determining whether the SCG should be activated or deactivated based on the user plane traffic load information;

transmitting a request to a target secondary node (SN) for addition of an SCG to a UE target configuration, wherein the request to the target SN includes the received user plane traffic load information;

receiving a response from the target SN including an indication enabling the target MN to determine whether a SCG's mode of operation was accepted or not; and transmitting a response to the source MN, wherein the response includes a Handover Command comprising a reconfiguration message having a reconfigurationWithSync with the UE target configuration.

18. The target MN of claim 17, wherein determining whether the target SN should be activated or deactivated is further based on whether the target SN is activated or deactivated in a source SN.

19. A target secondary node (SN) comprising:

processing circuitry; and memory coupled with the processing circuitry, wherein the memory includes instructions that when executed by the processing circuitry causes the SN to perform operations comprising:

receiving a request from a source master node (MN) for addition of a secondary cell group (SCG) to a user equipment (UE) target configuration, wherein the request is received with user plane traffic load information of a current SCG; and transmitting a response to the source MN including an indication enabling the source MN to determine whether a SCG's mode of operation was accepted or not.

20. The target SN of claim 19, wherein the request includes an indication of the SCG's mode of operation determined by the source MN for the SCG based on whether the SCG is activated or deactivated.

* * * * *